United States Patent
Hashimoto et al.

(10) Patent No.: US 7,446,967 B2
(45) Date of Patent: Nov. 4, 2008

(54) METHOD OF MEASURING HEAD CHARACTERISTICS OF A DATA STORAGE DEVICE, AND DATA STORAGE DEVICE

(75) Inventors: Minoru Hashimoto, Kanagawa (JP); Kenji Okada, Kanagawa (JP); Fuminori Sai, Kanagawa (JP); Chikako Sasaki, Kanagawa (JP); Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 188 days.

(21) Appl. No.: 11/222,913

(22) Filed: Sep. 8, 2005

(65) Prior Publication Data

US 2006/0056097 A1   Mar. 16, 2006

(30) Foreign Application Priority Data

Sep. 14, 2004   (JP)   ............................. 2004-267531

(51) Int. Cl.
*G11B 21/02* (2006.01)
(52) U.S. Cl. .......................................... 360/31; 360/75
(58) Field of Classification Search ........................ None
See application file for complete search history.

(56) References Cited

U.S. PATENT DOCUMENTS

| | | | |
|---|---|---|---|
| 5,485,322 A | 1/1996 | Chainer et al. | |
| 5,926,336 A * | 7/1999 | Le et al. | 360/75 |
| 5,949,603 A | 9/1999 | Brown et al. | |
| 6,469,859 B1 * | 10/2002 | Chainer et al. | 360/75 |
| 6,519,107 B1 | 2/2003 | Ehrlich et al. | |
| 2002/0105751 A1 | 8/2002 | Yasuna et al. | |
| 2002/0186494 A1 | 12/2002 | Sugiyama et al. | |
| 2004/0075935 A1 | 4/2004 | Yatsu et al. | |
| 2004/0125491 A1 * | 7/2004 | Iseri et al. | 360/75 |
| 2005/0280916 A1 * | 12/2005 | Calfee et al. | 360/75 |

FOREIGN PATENT DOCUMENTS

| | | |
|---|---|---|
| JP | 2003-141835 | 5/2003 |
| JP | 2004-963043 A | 2/2004 |

* cited by examiner

*Primary Examiner*—Andrea Wellington
*Assistant Examiner*—Varsha A Kapadia
(74) *Attorney, Agent, or Firm*—Townsend and Townsend and Crew LLP; Patrick Duncan

(57) ABSTRACT

Embodiments of the invention relate to measuring characteristics of a head with an actuator put in a state of being pushed against a crush stop. In one embodiment, with a head placed on an innermost ID side or with the current of a VCM sustained at a magnitude I_mid, a burst pattern is written onto a recording disk. At this stage, the gain of a VGA is equal to its maximum value Gmax. Then, while the current of the VCM is being changed gradually, the gain of the VCA is measured. As the current of the VCM becomes equal to a magnitude I_center, a read element of the head is positioned right above the burst pattern. At that time, the gain of a VGA is equal to its minimum value Gmin. As the read element is further moved to the OD side, the gain of the VGA again becomes equal to the maximum value Gmax. A read/write offset of the head is identified by the magnitudes I_center and I_mid.

14 Claims, 34 Drawing Sheets

Pre-Servo Pattern

Fig. 1 2

| Position of read element | Time intervals between patterns (n = Number of patterns) | Tracks of patterns |
|---|---|---|
| Center point of s_trk-01 | T0_0, T0_1, T0_2, ..., T0_n-1 | Pattern(1) – Pattern(1) |
| Center point of s_trk-02 | T1_0, T1_1, T1_2, ..., T1_n-1 | Pattern(1) – Pattern(2) |
| Center point of s_trk-03 | T2_0, T2_1, T2_2, ..., T2_n-1 | Pattern(2) – Pattern(3) |
| Center point of s_trk-04 | T3_0, T3_1, T3_2, ..., T3_n-1 | Pattern(3) – Pattern(4) |
| Center point of s_trk-05 | T4_0, T4_1, T4_2, ..., T4_n-1 | Pattern(4) – Pattern(5) |
| Center point of s_trk-06 | T5_0, T5_1, T5_2, ..., T5_n-1 | Pattern(5) – Pattern(6) |
| Center point of s_trk-07 | T6_0, T6_1, T6_2, ..., T6_n-1 | Pattern(6) – Pattern(7) |
| Center point of s_trk-08 | T7_0, T7_1, T7_2, ..., T7_n-1 | Pattern(7) – Pattern(8) |
| Center point of s_trk-09 | T8_0, T8_1, T8_2, ..., T8_n-1 | Pattern(8) – Pattern(9) |
| Center point of s_trk-10 | T9_0, T9_1, T9_2, ..., T9_n-1 | Pattern(9) – Pattern(10) |
| Center point of s_trk-11 | T10_0, T10_1, T10_2, ..., T10_n-1 | Pattern(10) – Pattern(11) |
| Center point of s_trk-12 | T11_0, T11_1, T11_2, ..., T11_n-1 | Pattern(11) – Pattern(12) |
| Center point of s_trk-13 | T12_0, T12_1, T12_2, ..., T12_n-1 | Pattern(12) – Pattern(13) |
| Center point of s_trk-14 | T13_0, T13_1, T13_2, ..., T13_n-1 | Pattern(13) – Pattern(14) |
| Center point of s_trk-15 | T14_0, T14_1, T14_2, ..., T14_n-1 | Pattern(14) – Pattern(15) |
| Center point of s_trk-16 | T15_0, T15_1, T15_2, ..., T15_n-1 | Pattern(15) – Pattern(16) |

Fig. 14

| | t0_0=1.125*Ts−Tsd | t0_1=1.125*Ts−(T0_0−Ts)−Tsd | t0_2=1.125*Ts−(T0_0−T0_1−2*Ts)−Tsd | t0_3=1.125*Ts−(T0_0+T0_1+T0_2−3*Ts)−Tsd | ... | t0_n-1=1.125*Ts−(T0_0+T0_1+...+T0_n-1−(n-1)*Ts)−Tsd |
|---|---|---|---|---|---|---|
| Pattern(1) | | | | | | |
| Pattern(2) | t1_0=t0_0−T1_0 | t1_1=t0_1−T1_1 | t1_2=t0_2−T1_2 | t1_3=t0_3−T1_3 | ... | t1_n-1=t0_n-1−T1_n-1 |
| Pattern(3) | t2_0=t1_0−T2_0 | t2_1=t1_1−T2_1 | t2_2=t1_2−T2_2 | t2_3=t1_3−T2_3 | ... | t2_n-1=t1_n-1−T2_n-1 |
| Pattern(4) | t3_0=t2_0−T3_0 | t3_1=t2_1−T3_1 | t3_2=t2_2−T3_2 | t3_3=t2_3−T3_3 | ... | t3_n-1=t2_n-1−T3_n-1 |
| Pattern(5) | t4_0=t3_0+T4_0 | t4_1=t3_1+T4_1 | t4_2=t3_2+T4_2 | t4_3=t3_3+T4_3 | ... | t4_n-1=t3_n-1+T4_n-1 |
| Pattern(6) | t5_0=t4_0−T5_0 | t5_1=t4_1−T5_1 | t5_2=t4_2−T5_2 | t5_3=t4_3−T5_3 | ... | t5_n-1=t4_n-1−T5_n-1 |
| Pattern(7) | t6_0=t5_0−T6_0 | t6_1=t5_1−T6_1 | t6_2=t5_2−T6_2 | t6_3=t5_3−T6_3 | ... | t6_n-1=t5_n-1−T6_n-1 |
| Pattern(8) | t7_0=t6_0−T7_0 | t7_1=t6_1−T7_1 | t7_2=t6_2−T7_2 | t7_3=t6_3−T7_3 | ... | t7_n-1=t6_n-1−T7_n-1 |
| Pattern(9) | t8_0=t7_0+T8_0 | t8_1=t7_1+T8_1 | t8_2=t7_2+T8_2 | t8_3=t7_3+T8_3 | ... | t8_n-1=t7_n-1+T8_n-1 |
| Pattern(10) | t9_0=t8_0−T9_0 | t9_1=t8_1−T9_1 | t9_2=t8_2−T9_2 | t9_3=t8_3−T9_3 | ... | t9_n-1=t8_n-1−T9_n-1 |
| Pattern(11) | t10_0=t9_0−T10_0 | t10_1=t9_1−T10_1 | t10_2=t9_2−T10_2 | t10_3=t9_3−T10_3 | ... | t10_n-1=t9_n-1−T10_n-1 |
| Pattern(12) | t11_0=t10_0−T11_0 | t11_1=t10_1−T11_1 | t11_2=t10_2−T11_2 | t11_3=t10_3−T11_3 | ... | t11_n-1=t10_n-1−T11_n-1 |
| Pattern(13) | t12_0=t11_0+T12_0 | t12_1=t11_1+T12_1 | t12_2=t11_2+T12_2 | t12_3=t11_3+T12_3 | ... | t12_n-1=t11_n-1+T12_n-1 |
| Pattern(14) | t13_0=t12_0−T13_0 | t13_1=t12_1−T13_1 | t13_2=t12_2−T13_2 | t13_3=t12_3−T13_3 | ... | t13_n-1=t12_n-1−T13_n-1 |
| Pattern(15) | t14_0=t13_0−T14_0 | t14_1=t13_1−T14_1 | t14_2=t13_2−T14_2 | t14_3=t13_3−T14_3 | ... | t14_n-1=t13_n-1−T14_n-1 |
| Pattern(16) | t15_0=t14_0−T15_0 | t15_1=t14_1−T15_1 | t15_2=t14_2−T15_2 | t15_3=t14_3−T15_3 | ... | t15_n-1=t14_n-1−T15_n-1 |

Fig. 2 4

| Written product servo patterns | Write-target track | Position (track number) of read element | Position (PES) of read element | Position (second PES) of read element |
|---|---|---|---|---|
| (16) | 49993 | 49996 | 228 | -0.4 |
| (17) | 49993 | 49996 | 100 | -0.4 |
| (18) | 49992 | 49995 | 228 | -0.4 |
| (19) | 49992 | 49995 | 100 | -0.4 |
| (20) | 49991 | 49994 | 228 | -0.4 |
| ... | ... | ... | ... | ... |

Fig. 2 6

| Reference pattern | Time interval between patterns | Period between detection of sync mark of preceding pattern and start of pattern writing |
|---|---|---|
| [0] | [0]-[1]:Tp_00 | tp_00=Tp_00-Sp-Tsd |
| [1] | [1]-[2]:Tp_01 | tp_01=Tp_01-Sp-Tsd |
| [2] | [2]-[3]:Tp_02 | tp_02=Tp_02-Sp-Tsd |
| ... | ... | ... |
| [2*Ns-1] | [2*Ns-1]-[1]:Tp_2*Ns-1 | tp_2*Ns-1=Tp_2*Ns-1 -Sp-Tsd |

Fig. 3 3
(a)
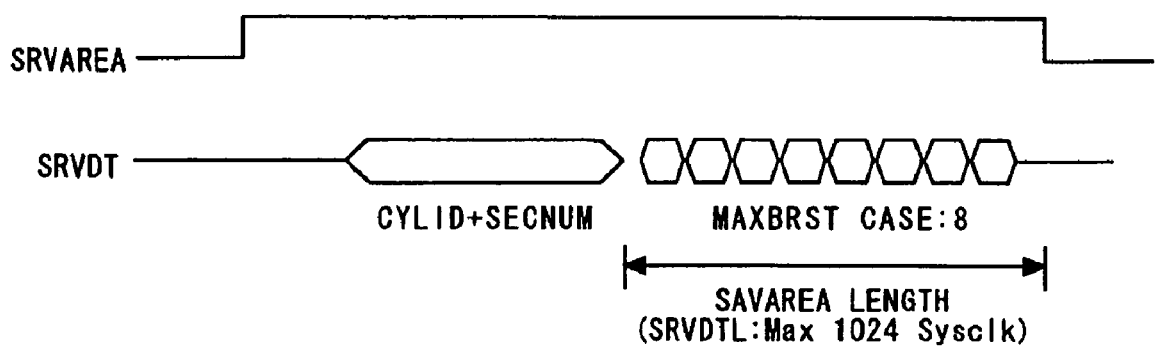
(b)
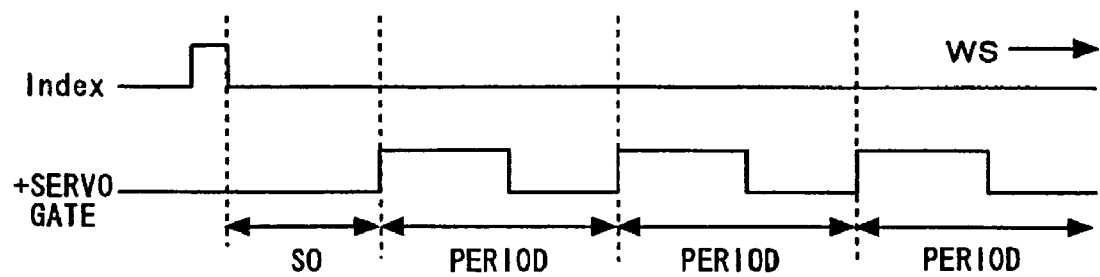

METHOD OF MEASURING HEAD CHARACTERISTICS OF A DATA STORAGE DEVICE, AND DATA STORAGE DEVICE

CROSS-REFERENCES TO RELATED APPLICATIONS

This application claims priority from Japanese Patent Application No. JP 2004-267531, filed Sep. 14, 2004, the entire disclosure of which is incorporated herein by reference.

BACKGROUND OF THE INVENTION

The present invention relates to a method of measuring characteristics of a head employed in a data storage device and relates to the data storage device itself.

As data storage devices, devices employing various kinds of media such as an optical disk and a magnetic tape are known. One of the data storage devices is a hard disk drive (HDD), which is widely used and popular as a device for storing computer data. As a matter of fact, the HDD is one of storage devices indispensable to the contemporary computer systems. In addition, the number of HDD applications has been increasing more and more by virtue of its excellent characteristics. Examples of the HDD applications include not only computer systems, but also moving-picture recording/reproduction devices, car navigation systems, and digital cameras. These examples each employ a removable memory.

A magnetic disk employed in an HDD has a plurality of tracks formed as concentric circles. Each of the tracks is used for recording servo patterns and user data. A magnetic head made of a thin-film device makes an access to a desired area (or to be more specific, a desired address) in accordance with the servo patterns in order to write data into the area or read out data from the area. In an operation to read out data from the magnetic disk, a signal read out by the magnetic head from the disk is subjected to predetermined processing such as a wave-reshaping process and a decoding process in a signal-processing circuit before being supplied to a host. By the same token, data received from the host as data to be stored onto the magnetic disk is also subjected to predetermined processing in the signal-processing circuit before being stored onto the magnetic disk.

As described above, each of the tracks comprises a user-data area for storing user data and a servo area for storing the servo patterns. The servo area has servo data such as a cylinder ID (Gray Code) and a burst pattern. A cylinder ID is the address of the track. The burst pattern includes relative-position information in the magnetic head as information with respect to the track. The servo patterns are created in a plurality of sectors on a track. Sectors on a track are separated from each other in the circular-circumferential direction of the track. In the circular-circumferential direction, the positions (or the phases, so to speak) of servo patterns in sectors are uniform over all the tracks. With the magnetic disk put in a rotating state, operations to read out data from the disk and write data onto the disk are carried out while verifying the position of the magnetic head on the basis of the servo patterns.

Servo patterns are written onto the magnetic disk at the factory before an HDD employing the magnetic disk is shipped to the customer as a product. A typical conventional operation to write servo patterns onto a magnetic disk is carried out by a servo writer serving as an external apparatus. With a top cover of the HDD removed from the HDD, the HDD is set on the servo writer. The servo writer then uses a positioner also referred to as an external positioning mechanism to determine the position of the magnetic head in the HDD before writing servo patterns generated by a servo-pattern generation circuit onto the magnetic disk.

At the present time, the cost of carrying out a servo-track write (STW) process is a big portion of the cost to manufacture an HDD. Particularly in recent years, competition to increase the storage capacity of an HDD has been becoming fierce and, accompanying the competition, a TPI (Tracks Per Inch) has been increasing. As the TPI increases, the number of tracks rises and the track width decreases. The increased TPI and the decreased track width raise the STW process time and require high precision of the servo writer. The rising STW process time and the high precision of the servo writer in turn increase the cost of the STW process. In order to lower the cost of the STW process, the cost of the servo writer and the time of the STW process must be reduced to mention a few. As an example, unlike the conventional STW process, typically, an SSW (Self Servo Write) process is carried out to write servo patterns onto the magnetic disk with the top cover placed on the HDD as it is. In the SSW process, as the mechanical portion, only the main body of the HDD is used, and an external circuit is used as a circuit for controlling a spindle motor (SPM) and a voice coil motor (VCM), which are employed in the HDD as motors for writing servo patterns onto the magnetic disk. In this way, the cost of the servo writer can be lowered.

A typical SSW process is disclosed in documents such as patent document 1 (Japanese Patent Laid-Open No. 2004-963043). In this SSW process, position detection patterns for detecting a position in the rotational direction are recorded onto one face of the magnetic disk in advance. The position detection patterns are clock patterns recorded at predetermined intervals in the circumferential direction. A servo writer carries out an operation to pre-write the clock patterns for each magnetic disk. Then, a magnetic disk completing a pre-write process is mounted on an HDD.

The STW process disclosed in patent document 1 is carried out to write servo patterns onto a magnetic disk completing a pre-write process to record clock patterns on the disk in advance. In an initial sequence, the head is positioned on the innermost circumference of the magnetic disk to write servo patterns onto the disk as reference patterns. Then, sequentially, a recorded servo pattern is used to determine the position of a write element. In an operation to write servo patterns onto the magnetic disk, the clock patterns recorded on the entire face of the disk are used as references to carry out an operation to set timings to write the servo patterns. Thus, it is possible to prevent clocking precision from deteriorating due to effects of an increased frequency of the servo patterns and rotation jitters of the magnetic disk. By the clocking precision, the precision of an operation to set write timings is implied.

BRIEF SUMMARY OF THE INVENTION

It is important to write servo patterns onto the disk with accurate timings as described in patent document 1. In addition, one of the important points in the STW process is that head characteristics required in a process to write patterns onto a magnetic disk must be measured with a high degree of accuracy. In particular, in an initial sequence of the STW process, the patterns are written in a state in which an actuator is pressed against a crush stop. The crush stop prescribes a rotation range of the actuator. It is important for the HDD itself to measure characteristics of the head employed therein in advance with an actuator pressed against a crush stop. The characteristics of the head include a read/write offset and a write width. The read/write offset is defined as a distance between a read element and write element of the head. On the other hand, the write width is defined as the width of the write element.

With the above situation serving as a background, it is a feature of the present invention to provide a capability of measuring the characteristics of the head with a high degree of accuracy. This and other objects of the present invention as well as new characteristics thereof will probably become more apparent from descriptions given in the specification with reference to accompanying diagrams.

Techniques for solving the problems described above are explained as follows. In this chapter, some configuration elements specified in claims are associated with configuration elements to be explained as configuration elements of embodiment. However, the description to associate some configuration elements specified in claims with the elements of embodiment is given to make the present invention easy to understand and the description is not intended to limit the configuration elements to the configuration elements of embodiment.

In accordance with an aspect of the present invention, there is provided a method adopted by a data storage device to measure characteristics of a head employed in the data storage device, which comprises: a recording disk used for recording data; the head employing a read element and a write element at positions separated away from each other in both the radial and circumference directions of the recording disk; a movement mechanism (such as an actuator 14) for moving the head; and a stop unit (such as an inner crush stop 18) for prescribing a movement range of the movement mechanism in a state of being in contact with the movement mechanism.

With the movement mechanism pushed against the stop unit, patterns are written onto the rotating recording disk. With the movement mechanism pushed against the stop unit, while the read element is being moved in a direction toward the patterns, a read signal representing the magnitude of a signal read out by the read element from the recording disk and a driving signal for driving the movement mechanism are measured. The magnitude of the driving signal representing a characteristic of the head is determined on the basis of the read signal. In this way, with the movement mechanism pushed against the stop unit, the characteristic of the head may be identified on the basis of the driving signal.

As the read signal, it is possible to use the gain of a VGA for amplifying the signal read out by the read element. The driving signal may corresponds to a current supplied to a voice coil motor for driving the movement mechanism.

On the basis of the read signal, a driving signal representing a read/write offset of the head may be determined. In addition, the read/write offset of the head may be represented by using the value of a driving signal at a position to write the pattern and using the value of a driving signal at a position at which the read element coincides with the pattern. On the top of that, an extremum (minimum) value of the read signal is used to determine a position at which the read element coincides with the pattern. Thus, the value of the driving signal may represent the read/write offset of the head with a higher degree of accuracy.

A direction of departing from the stop unit may be taken as the direction in which the read element moves toward the pattern. Thus, the movement mechanism ensures the movement.

The value of the driving signal representing the write width of the head may be determined on the basis of the read signal. The write width of the head may be represented by using the value of the driving signal at a position showing half the read signal read out at a position at which the read element coincides with the pattern. As an alternative, first of all, a maximum value of the read signal is measured. Then, a minimum value of the read signal is measured. Subsequently, a middle value between the minimum and maximum values is determined and used for determining a value of the driving signal. Finally, the write width of the head may be represented by using the determined value of the driving signal. As another alternative, first of all, a minimum value of the read signal is measured. Then, a maximum value of the read signal is measured. Subsequently, a middle value between the minimum and maximum values is determined and used for determining a value of the driving signal. Finally, the write width of the head may be represented by using the determined value of the driving signal. Thus, the driving signal may represent the write width of the head with a higher degree of accuracy.

In accordance with another aspect of the present invention, there is provided a data storage device to measure characteristics of a head. The data storage device comprises: a recording disk used for recording data; a head employing a read element and a write element at positions separated away from each other in both radial and circumference directions of the recording disk; a movement mechanism for moving the head; a stop unit for prescribing a movement range of the movement mechanism in a state of being in contact with the movement mechanism; and a control unit for controlling movements of the movement mechanism.

With the movement mechanism pushed against the stop unit, the write element write patterns onto the rotating recording disk. With the movement mechanism pushed against the stop unit, while the movement mechanism is moving the read element in a direction toward the patterns, the control unit measures a read signal representing the magnitude of a signal read out by the read element from the recording disk as well as a driving signal for driving the movement mechanism, and determines the magnitude of the driving signal representing a characteristic of the head on the basis of the read signal. In this way, with the movement mechanism pushed against the stop unit, the characteristic of the head may be identified on the basis of the magnitude of the driving signal.

On the basis of the read signal, the control unit determines a magnitude of the driving signal representing the read/write offset of the head. In addition, on the basis of the read signal, the control unit also determines a magnitude of the driving signal representing the write width of the head.

In accordance with the present invention, with the movement mechanism pushed against the stop unit, the characteristics of the head may be measured.

BRIEF DESCRIPTION OF THE DRAWINGS

FIG. 12 shows a table of base-pattern time intervals measured in processes provided by the embodiment as processing to write time aligned patterns onto a magnetic disk;

FIG. 14 shows a table of timings to write time aligned patterns onto a magnetic disk in processes provided by the embodiment as processing to write the time aligned patterns onto the magnetic disk;

FIG. 24 shows a table listing values measured in processes provided by the embodiment as processing to write product servo patterns onto a magnetic disk on the basis of already written product servo patterns and values measured in processes to position the read element;

FIG. 26 shows a table of relations between measured time intervals between patterns and timings to write patterns in processes provided by the embodiment as processing to write product servo patterns onto a magnetic disk on the basis of already written product servo patterns;

FIG. 31 shows timing charts of an indexed phased aligned mode-2 provided by the embodiment;

FIG. 32 shows timing charts of an indexed read mode provided by the embodiment;

FIG. 33 shows timing charts of a servo/propagation control provided by the embodiment;

DETAILED DESCRIPTION OF THE INVENTION

Figure 1:
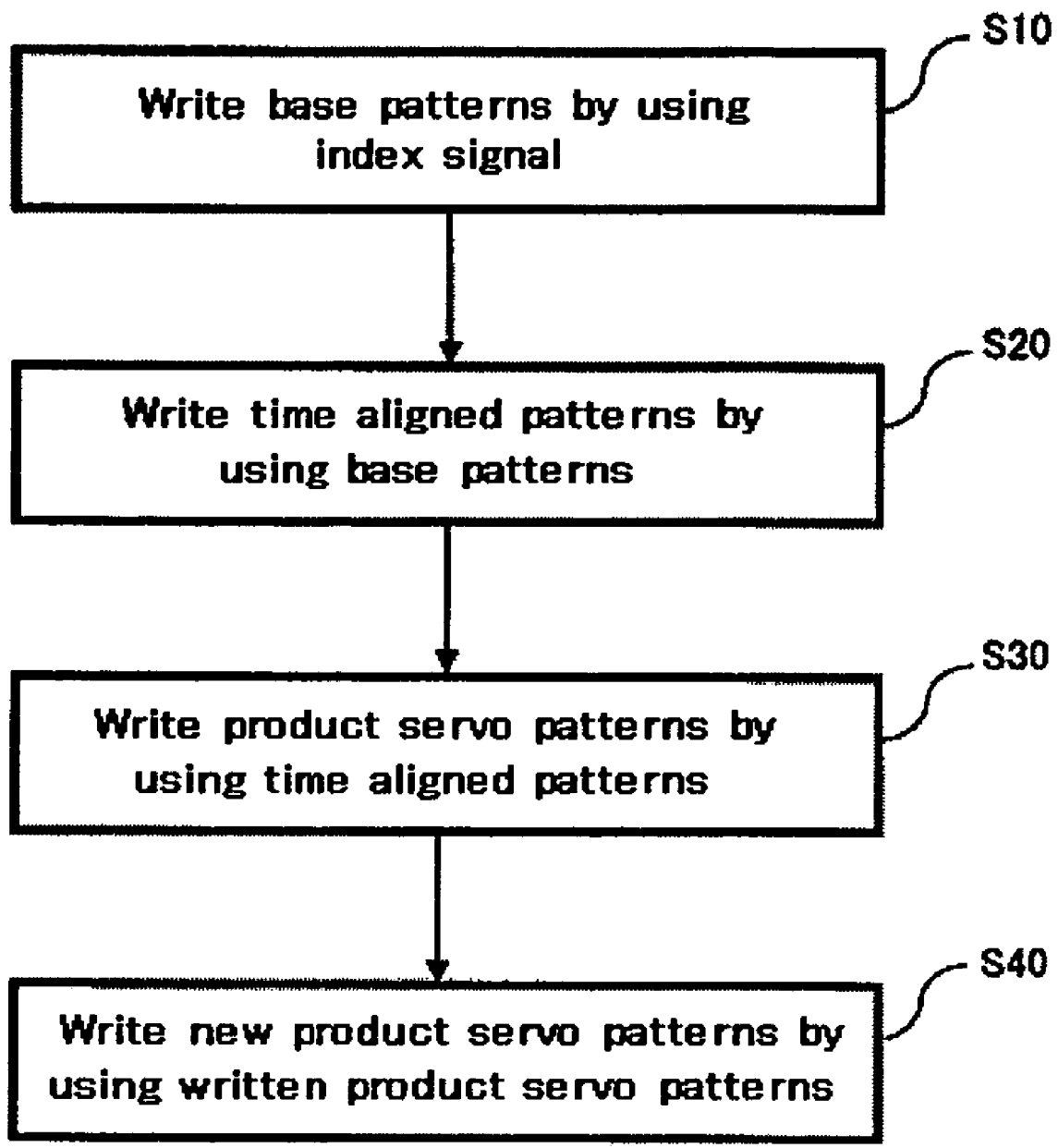
FIG. 1 shows an explanatory flowchart referred to in describing all processes of processing provided by an embodiment as processing to write servo patterns onto a magnetic disk.

An embodiment of the present invention is explained as follows. The embodiment of the present invention, which is described in the following description, does not limit the scope of the present invention. In order to make the explanation clear, some descriptions and diagrams are properly omitted or simplified. In addition, a person skilled in the art is capable of changing, adding, and/or converting elements of the embodiment within the scope of the present invention with ease. It is to be noted that, throughout the diagrams, identical elements are denoted by the same reference numeral and, in order to make the explanation obvious, explanation of identical elements is given only once as necessary to avoid duplications.

In a hard disk drive (HDD) implemented by the embodiment, a function executed by an external circuit in the conventional self servo write (SSW) process is embedded in an internal circuit itself on a product card. The product card is a board on which ICs of the HDD as a complete product are mounted. Thus, the HDD is capable of carrying out processing to write servo patterns onto a magnetic disk by using virtually the product card only without directly relying on a servo writer operating as an external apparatus. In response to a start signal generated by an external control apparatus, the HDD writes servo patterns onto the magnetic disk by execution of the function embedded in the internal circuit. In the following description, the SSW process of the embodiment is referred to as an In-Drive SSW (or TSSW (True Self Servo Write)) process in order to differentiate the process of the embodiment from the SSW process.

As shown in FIG. 1, the In-Drive SSW (TSSW) process of the embodiment comprises: a sequence S10 of writing base patterns with an index signal taken as a reference; a sequence S20 of writing time aligned patterns on the basis of the base patterns; a sequence S30 of writing product servo patterns on the basis of the time aligned patterns; and a sequence S40 of writing other product servo patterns on the basis of the product servo patterns. The sequences are executed sequentially. A product servo pattern is a pattern including a servo pattern used in an access to user data.

In the sequence of writing time aligned patterns on the basis of base patterns, the time align patterns are written on a track for time aligned patterns at predetermined intervals in the circumferential direction on the basis of a time interval between adjacent ones of the base patterns on the same track for base patterns. In addition, on the basis of a time interval between adjacent base patterns on adjacent tracks, a plurality of time aligned patterns with positions aligned in the circumferential direction position are each written in every sector on the track for time aligned patterns. The circumferential-direction positions of the base patterns are not always accurate. Since timings are determined from time intervals of the base patterns, the time aligned patterns with positions aligned in the circumferential direction may be written onto the magnetic disk. By the time aligned patterns with positions aligned in the circumferential direction, time aligned patterns having a uniform timing are meant.

In addition, in processing to write time aligned patterns onto a magnetic disk or processing to write product servo patterns onto the disk, a time interval between patterns written on a track on an ID (inner circumference) side, that is, a time interval between time aligned patterns or between product servo patterns, is measured and a timing to write patterns, that is, time aligned patterns or product servo patterns, onto a track on an OD (outer circumference) side is determined. That is to say, with the detection of patterns on the track on the ID side used as a reference, patterns are written onto the track on an OD side with the determined write timing. This processing is repeated, and write timings or write positions of patterns in the circumferential direction may be controlled. In particular, circumferential-direction positions or write timings may be made uniform between patterns on adjacent tracks.

In the following description, first of all, an outline of the entire configuration of the HDD structure is explained. Then, processing to write time aligned patterns onto a magnetic disk and processes related to the processing are described. Subsequently, processing to write product servo patterns onto the magnetic disk on the basis of the time aligned patterns and processes related to the processing are described. After that, functions incorporated in the hardware configuration of the HDD and used for carrying out the In-Drive SSW (TSSW) process as well as measurement of head characteristics are explained. In the first sequence, the characteristics of the magnetic head are measured in a state in which an actuator is pressed against a crush stop. The characteristics of the magnetic head are measured by detecting the value of a current driving a VCM (Voice Coil Motor). The head characteristics to be measured include a read/write offset and a write width (a length of a write element in the radial direction).

Entire Configuration of the HDD

Figure 2:
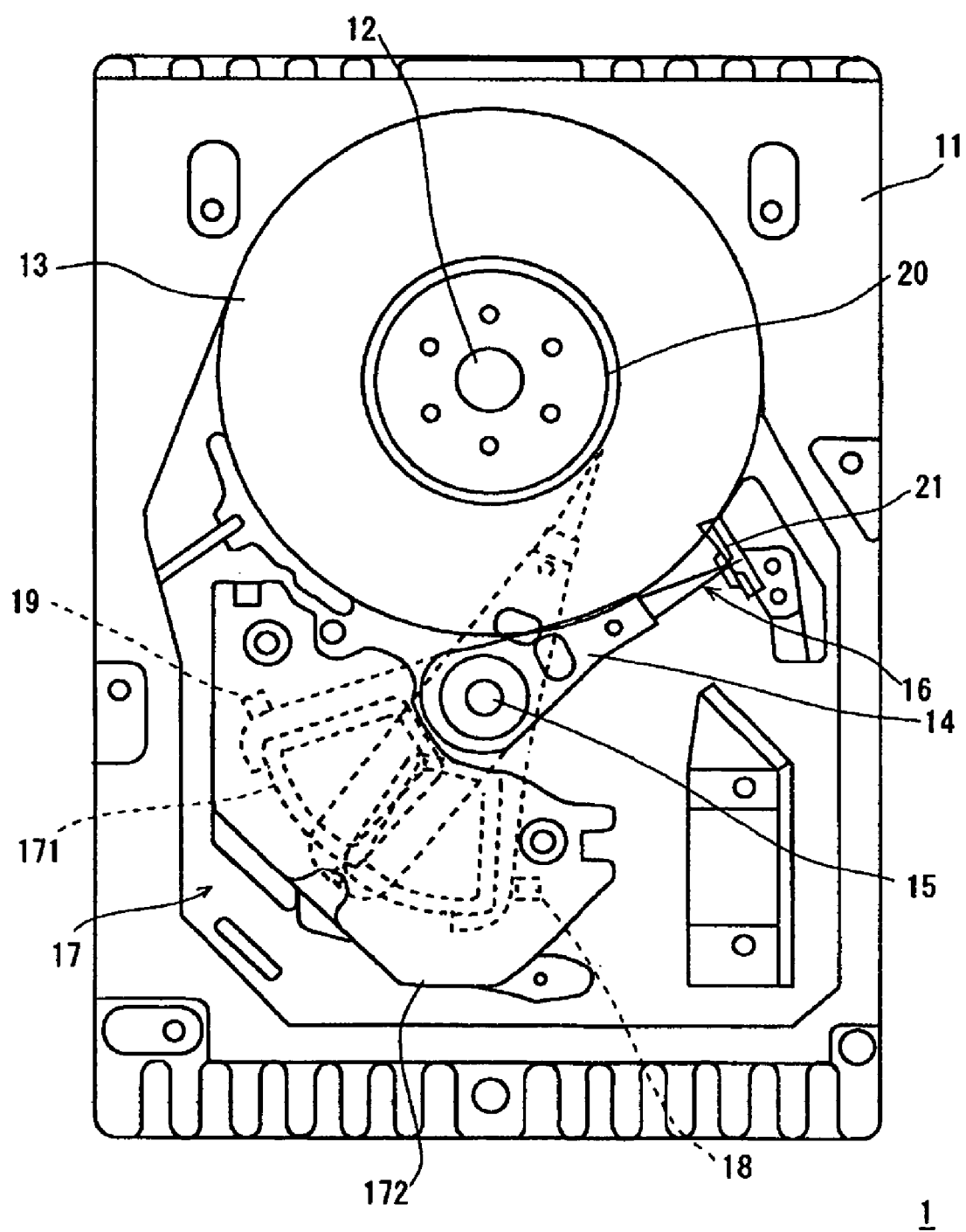
FIG. 2 is a diagram showing a top view of a model of the entire configuration of an HDD provided by the embodiment.

In order to explain the In-Drive SSW (TSSW) of the embodiment, it is necessary to describe the entire configuration of the HDD. FIG. 2 is a diagram roughly showing a top view of the structure of the HDD 1 provided by the present invention. The HDD 1 accommodates components in a disk enclosure. The disk enclosure comprises a box-like base 11 having an open top and a cover for covering the opening on the top of the base 11. The cover is not shown in the figure. A spindle motor (SPM) 12 is located in the base 11. The spindle shaft of the SPM 12 supports one magnetic disk 13 or a plurality of magnetic disks 13. The SPM 12 drives the magnetic disk 13 into rotation at a predetermined rotational speed.

An actuator 14 is attached to the base 11 through a pivot 15 in such a way that the actuator 14 may be rotated. The actuator 14 has a head element unit 16 at the edge of the actuator 14 as a unit for writing data onto the magnetic disk 13 and reading out data from the magnetic disk 13. The head element unit 16 is referred to hereafter merely as the head 16. The head 16 comprises a write element 162 for converting an electrical signal representing data to be stored into the magnetic disk 13 into a magnetic field applied to the magnetic disk 13, and a read element 161 for converting a magnetic field from the magnetic disk 13 into an electrical signal.

The head 16 is provided on a side face of a slider fixed on the edge of the actuator 14. A voice coil 171 is provided on the rear edge of the actuator 14. A stator 172 has a magnet and a yoke. A voice coil motor (VCM) 17 comprises the voice coil 171 and the stator 172 facing the voice coil 171. The VCM 17 rotates the actuator 14 around the pivot 15.

An inner crush stop 18 and an outer crush stop 19 are provided on the base 11. The inner crush stop 18 prescribes a rotation range (or a rotation angle) of the actuator 14 on the inner-circumference side of the magnetic disk 13. On the other hand, the outer crush stop 19 prescribes the rotation range of the actuator 14 on the outer-circumference side of the magnetic disk 13. The inner crush stop 18 has a function to prevent the actuator 14 from being brought into contact with a top clamp 20 for fixing the magnetic disk 13 on the SPM 12. The inner crush stop 18 also contributes to determination of the position of the actuator 14 in a process to write a servo pattern onto the magnetic disk 13. On the other hand, the outer crush stop 19 for prescribing the rotation toward the outer-circumference side of the magnetic disk 13 prevents the head 16 from passing through and going beyond a ramp 21 for saving the head 16 at an unload time.

Figure 3:
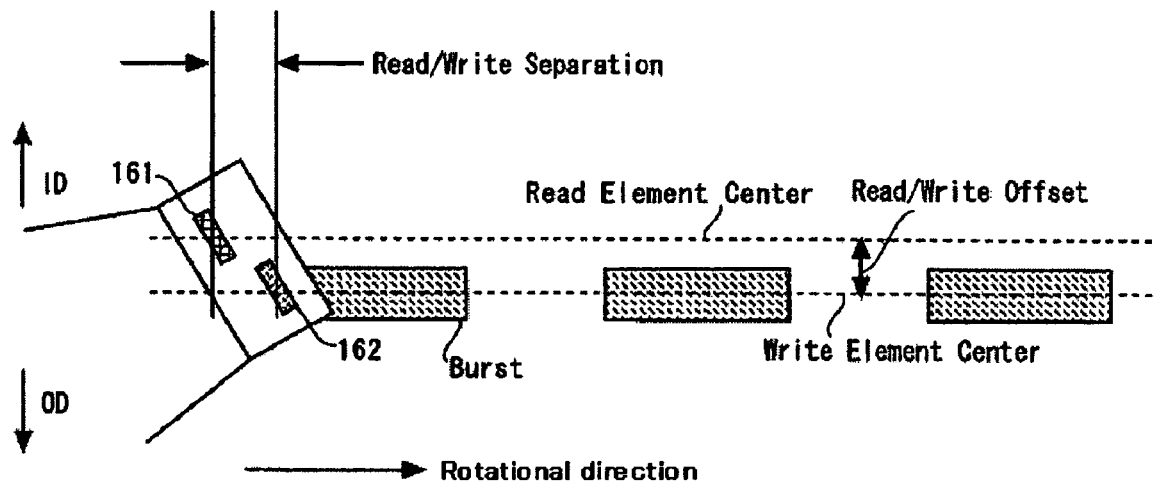
FIG. 3 is a diagram showing a top view of a model of a rough configuration of a head provided by the embodiment.

FIG. 3 is a diagram showing a relation between the position of the read element 161 and the position of the write element 162 in the head 16 provided by the embodiment. Since the In-Drive SSW (TSSW) process starts from a track on the inner-circumference (ID) side of the magnetic disk 13, the read element 161 is placed on a more inner-circumference side of the magnetic disk 13 than the write element 162 is. Since the operation to write patterns onto the magnetic disk 13 is started from the inner-circumference side, the read element 161 is capable of reading out the patterns written earlier by the write element 162. Thus, while the position of the head 16 is being adjusted on the basis of the patterns read out by the read element 161, the write element 162 is capable of writing new patterns onto the magnetic disk 13. It is to be noted that, by swapping the positions of the read element 161 and the write element 162, the In-Drive SSW (TSSW) process may be started from the outer-circumference (OD) side of the magnetic disk 13. It is also worth noting that, even though the read element 161 is positioned closer to the VCM 17 than the write element 162 is, in the In-Drive SSW (TSSW) process provided by the embodiment, their positions in the circumferential direction are not specially prescribed.

FIG. 3 shows some illustrated quantities representing differences in position between the read element 161 and the write element 162. One of the quantities is a head read/write separation. The head read/write separation is a difference in time in the circumferential direction of the magnetic disk 13 between the read element 161 and the write element 162. Consider for example a state in which data has been written on a certain track and the read element 161 is positioned at the center of this track, and also consider a line connecting the rotational center of the magnetic disk 13 to the front edge of the data. In this case, the head read/write separation time is defined as a period of time between the arrival of the data at the position of the read element 161 and the arrival of the line at the circumferential-direction position of the write element 162 where the position of the write element 162 is a position in the circumferential direction.

Another quantity is a read/write offset. The read/write offset is the radial-direction distance between the read element 161 and the write element 162. To put it accurately, the read/write offset is the radial-direction distance between the center of the read element 161 and the center of the write element 162. The center of the read element 161 and the center of the write element 162 are also referred to as a read-element center and a write-element center respectively. The read/write offset changes in dependence on the radial-direction position of the head 16. To be more specific, the closer the radial-direction position of the head 16 in the direction toward the OD side, the smaller is the read/write offset. In the case of this embodiment, the read/write offset exists even if the head 16 is positioned on a track closest to the OD side. Thus, product servo patterns may be written into a track on an outer-circumference side by aligning the position of the head 16 on the basis of already written product servo patterns read out from an inner-side track. This processing is carried out repeatedly till product servo patterns are written onto a track on the outermost circumference on the most OD side.

Next, every sequence of the embodiment is explained. Every sequence is executed by utilizing a function of a R/W channel shown in FIG. 27 under control of an HDC/MPU included in a control circuit of the HDD 1. The explanation does not include a detailed description of the control circuit itself in order to make the explanation clear. Details of the control circuit will be described later. First of all, processing to write time aligned patterns onto the magnetic disk 13 is explained.

Processing to Write Time Aligned Patterns

Figure 4:
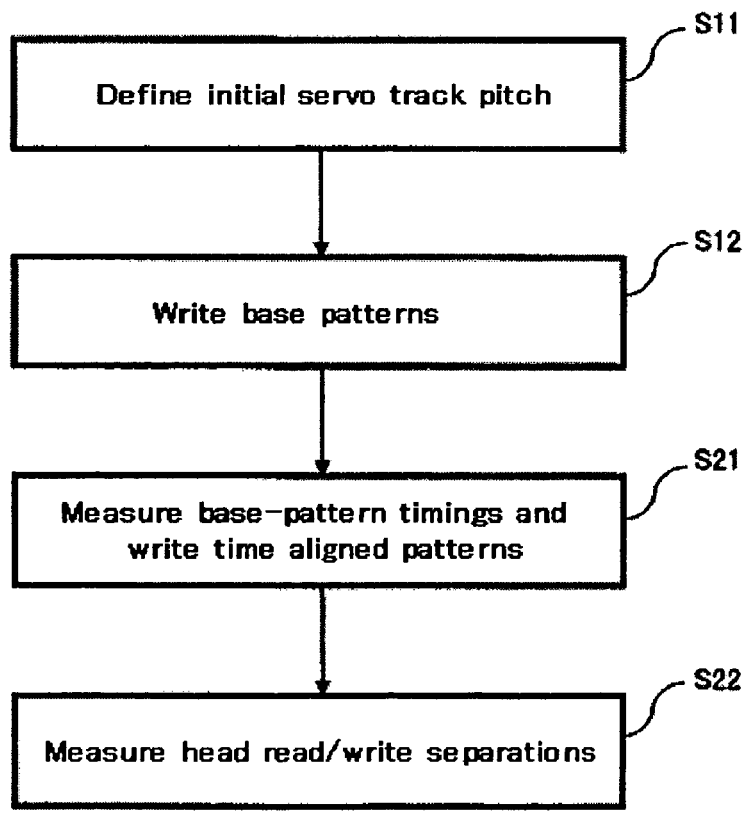
FIG. 4 shows an explanatory flowchart referred to in describing processes provided by the embodiment as processing to write base patterns onto a magnetic disk.

The following description explains an initial sequence of the In-Drive SSW (TSSW (True Self Servo Write)) process, processing to write base patterns onto the magnetic disk 13, processing to write time aligned patterns onto the magnetic disk 13 on the basis of the base patterns and measurement of the head read/write separation time of the head 16 on the basis of the time aligned patterns. As shown in FIG. 4, what is explained below includes:

(1) a sequence S11 of defining an initial servo track pitch;

(2) a sequence S12 of writing base patterns onto the magnetic disk 13;

(3) a sequence S21 of measuring timings of the base patterns and writing time aligned patterns onto the magnetic disk 13; and (4) a sequence S22 of measuring head read/write separations.

The above sequences S11, S12, S21, and S22 are executed sequentially. These sequences may be executed by using functions included in a control configuration to be described later. The sequences are described as follows.

(1) Sequence S11 of Defining an Initial Servo Track Pitch

In this sequence, a VCM current for moving the head 16 by an accurate track pitch to a location at which patterns are to be written is determined. To put it more concretely, a VCM current placing the head 16 on each track at a radial-direction position agreeing with a servo track pitch set or designed in advance is found by repeatedly carrying out an operation on a cut-and-try basis. A VCM current determined in this way is used in a sequence of forming base patterns. This sequence is the aforementioned initial sequence of the In-Drive SSW (TSSW) process. All operations are carried out with the actuator 14 pressed against the inner crush stop 18. It is to be noted that every sequence described in this specification is carried out with a repulsive force of elasticity of the inner crush stop 18 put in a state of equilibrium with a force generated by a VCM current as a force to push the actuator 14 against the inner crush stop 18 as is the case with this initial sequence.

Figure 5:
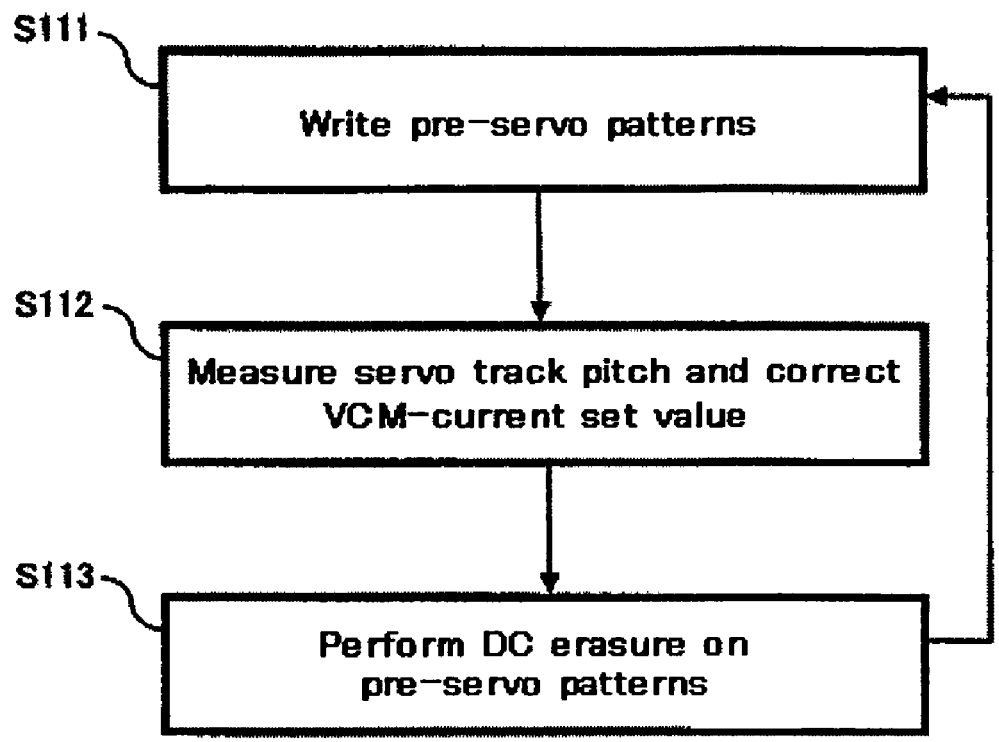
FIG. 5 shows an explanatory flowchart referred to in describing processes provided by the embodiment as processing to define a track pitch.

As described above, the radial-direction position of the head 16 is adjusted with the repulsive force of elasticity of the inner crush stop 18 put in a state of equilibrium with the pressing force generated by a constant current flowing through the VCM 17 as a force pressing the actuator 14 against the inner crush stop 18. That is to say, the (transfer function of) control of the radial-direction position of the head 16 is an open loop. As shown in FIG. 5, this sequence comprises:

(i) a sequence S111 of writing pre-servo patterns onto the magnetic disk 13;

(ii) a sequence S112 of measuring a servo track pitch and correcting a set value of the VCM current; and (iii) a sequence S113 of carrying out a DC-erasure process on the pre-servo patterns.

The above sequences S111, S112, and S113 are carried out sequentially. This series of sequences S111, S112, and S113 is executed repeatedly till a VCM current for a predetermined track pitch is determined. The sequences S111, S112, and S113 are explained in detail as follows.

(i) Sequence of Writing Pre-servo Patterns

Figure 6:
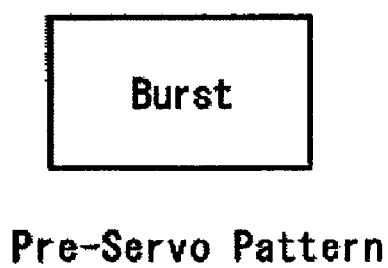
FIG. 6 is a diagram showing the data format of a pre-servo pattern provided by the embodiment.

FIG. 6 is a diagram showing the data format of a pre-servo pattern of a single burst as a pattern to be written on the magnetic disk 13 in this sequence. Since a track does not exist yet, as shown in FIG. 7, pre-servo patterns are written onto the magnetic disk 13 by moving the head from a position to serve as the innermost servo track toward an outermost circumference over a distance of 16 servo tracks.

Figure 7:
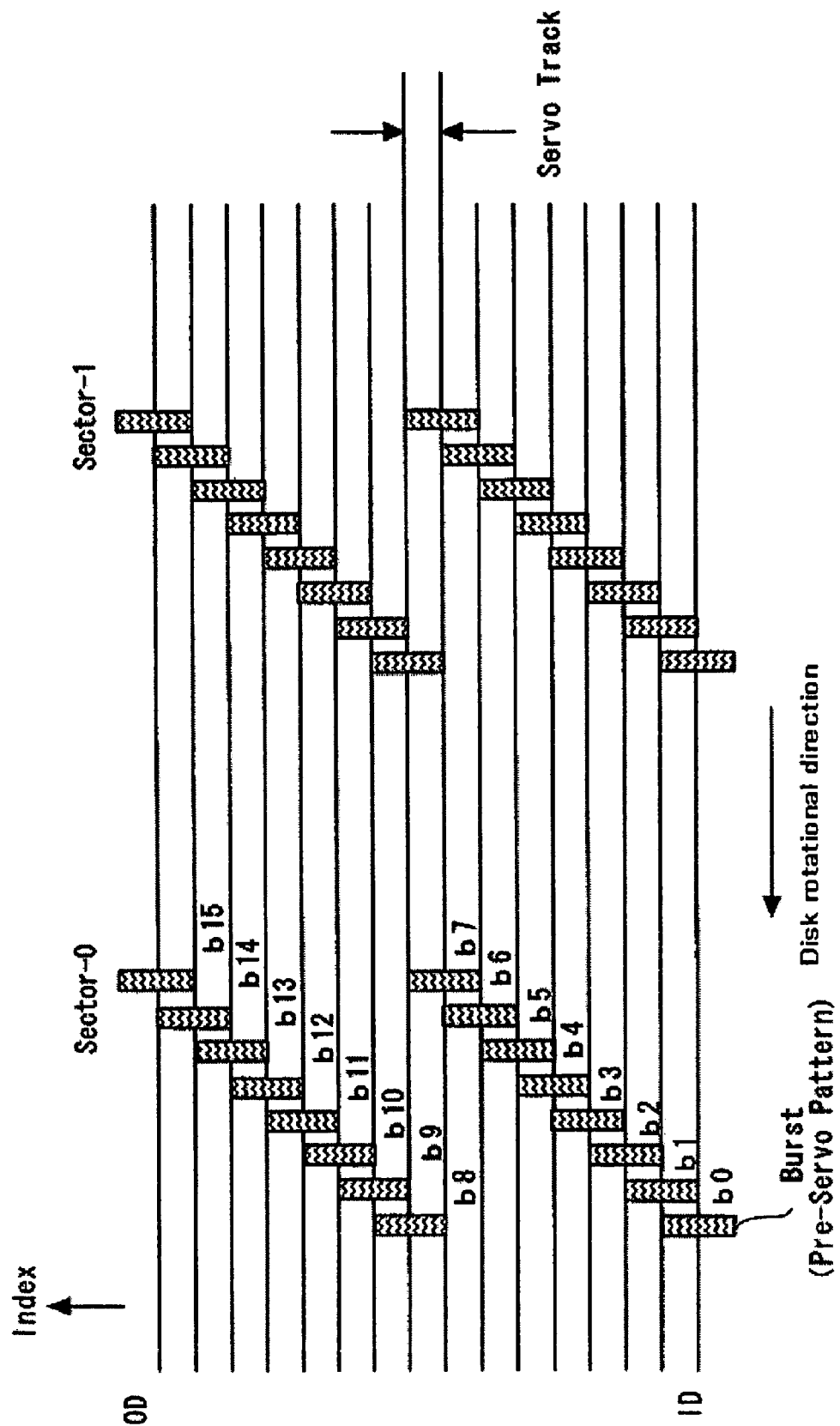
FIG. 7 is a diagram showing a state in which pre-servo patterns provided by the embodiment are recorded on a magnetic disk.

With an index signal taken as a reference, as shown in FIG. 7, bursts each serving as a pre-servo pattern are written onto the magnetic disk 13 by shifting the patterns from each other along the time axis. FIG. 7 shows a case for two sectors. This index signal is a signal generated by a driver for driving the SPM 12 and prescribed by the rotational period of the SPM 12. The driver itself is not shown in the figure. In some cases, it is necessary to increase the number of servo tracks, onto which pre-servo patterns are to be written, in accordance with the magnitude of the read/write offset shown in FIG. 16. In the configuration of the present HDD, the number of target servo tracks is 16.

A constant current set in advance is flown to the VCM 17 to establish a state in which the actuator 14 is being pressed against the inner crush stop 18. In this state, the HDD 1 writes a burst b0 into as many target sectors as required. The number of target sectors is not specially limited. Since an average amplitude of bursts is computed later, however, a large number of target sectors are desirable. Next, the magnitude of the VCM current is reduced to a value a little bit smaller than the value set for writing the burst b0 and (the write element 162 of) the head 16 is moved slightly in the direction toward the OD side. At this new position, the HDD 1 writes a burst b1 onto as many target sectors as required in the same way as the burst b0. At that time, a timing relative to the index signal to write the burst b1 into the sectors is shifted a little bit from the timing of the burst b0 along the time axis, that is, the position at which the burst b1 is to be written is shifted in the circumferential direction, so as to prevent adjacent bursts b0 and b1 from overlapping each other at a position in the same sector.

The above processing is carried out repeatedly in the same way for the subsequent bursts b2 to b15 while the VCM current is being reduced. In the example shown in FIG. 7, the position of the burst b8 is returned to the same circumferential position as the burst b0. However, the bursts b0 to b15 may also be written onto the sectors without returning the positions of the bursts b8 to b15 to the positions of the bursts b0 to b7 respectively. In the processing, all the magnitudes of the VCM current are each set at a value putting the pressing force generated by the constant current as a force pressing the actuator 14 against the inner crush stop 18 in a state of equilibrium with the repulsive force of elasticity of the inner crush stop 18.

(ii) Measurement of a Servo Track Pitch and Correction of a Set Value of the VCM Current Then, the HDD 1 uses the amplitude of every burst to measure the servo track pitch of the pre-servo patterns. First of all, the VCM current is set at a value used for writing the burst b0. Subsequently, the VCM current is reduced a little bit at a time, the head 16 is moved in the OD direction and the VCM current is set at such a value that the center of the read element 161 coincides with the center of the burst b1.

The center point of the burst b1 coincides with a position at which the amplitude of the burst b0 is equal to the amplitude of the burst b2. The amplitude of a burst is an average value of amplitudes of the burst in all sectors spread in the circumferential direction. Next, a ratio of the sum of the amplitude B0 of the burst b0 and the amplitude B2 of the burst b2 to the amplitude B1 of the burst b1 is computed in accordance with the following equation:

$$\text{Ratio} = (B0+B2)/B1$$

where Bk (k=1, 2 and so on) is the amplitude of the burst bk. This ratio is referred to as a pattern overlap. Then, the VCM current is reduced a little bit at a time and the head 16 is moved so that the center of the read element 161 coincides with the center of the burst b2. By the same token, the center point of the burst b2 coincides with a position at which the amplitude of the burst b1 is equal to the amplitude of the burst b3. For this position, a pattern overlap is computed in the same way. In this case, the pattern overlap is expressed by the ratio of the sum of the amplitude B1 of the burst b1 and the amplitude B3 of the burst b3 to the amplitude B2 of the burst b2 as follows:

$$\text{Ratio} = (B1+B3)/B2.$$

Thereafter, the center of the read element 161 employed in the head 16 is moved to the centers of the bursts b3, b4, b5 to b14 sequentially and the overlap pattern is computed for each position.

After a pattern overlap is computed, the HDD 1 compares the computed pattern overlap with a target value set in advance. A typical target value is 0.9. From a difference between the target value and the pattern overlap computed on the basis of measurement results of burst amplitudes, the set VCM current is corrected to a new value for a next step. Basically, if a computed pattern overlap is greater than the target value, the intervals of the VCM currents are increased. If a computed pattern overlap is smaller than the target value, on the other hand, the intervals of the VCM currents are decreased.

To be more specific, if a computed pattern overlap is greater than the target value, the VCM current used for writing the burst b0 into the sectors is sustained at the set value and the intervals between VCM currents used for writing the bursts b2, b3, - - - and b15 into the sectors are increased. That is to say, differences between VCM currents for writing their respective patterns are increased. If a computed pattern overlap is smaller than the target value, on the other hand, the intervals between VCM currents used for writing the bursts b2, b3, - - - and b15 into the sectors are conversely decreased. Assume for example that the pattern overlaps at the positions of the head 16 are po1 (corresponding to the center of the burst b1), po2, - - - and po14. First of all, the VCM current for writing the burst b0 into the sectors is not changed. A new VCM current NVCM for writing the burst b1 into the sectors is computed as follows:

$$NVCM1 = SVCM1 + a1(\text{Target} - po1)$$

That is to say, the new VCM current NVCM1 is found as a sum of SVCM1 and a1 (Target−po1) where SVCM1 is the VCM current for writing the burst b1 previously into the sectors whereas a1 (Target−po1) is a correction value obtained as a product of a proportion multiplier a1 and a difference resulting from subtraction of the pattern overlap po1 from the target value Target.

For a new VCM current for writing the burst b2 into the sectors, the same correction value as the burst b1 is used. The correction value is added to the VCM current SVCM2 used for writing the previous burst b2 previously into the sectors. That is to say, a new VCM current NVCM2 used for writing a new burst b2 is computed in accordance with the following equation:

$$NVCM2 = SVCM2 + a(\text{Target} - po1)$$

A new VCM current NVCM3 used for writing a new burst b3 is computed in accordance with the following equation:

$$NVCM3 = SVCM3 + a(\text{Target} - po2) + \text{delta}2$$

where notation a denotes the proportion multiplier, notation Target denotes the target value, notation po2 denotes a pattern overlap and notation delta2 denotes the correction value found for the computation of the VCM current for the burst b2 in accordance with the following equation:

$$\text{delta}2 = a(\text{Target}1 - po1)$$

New VCM currents used for writing the bursts b4 to b15 are computed by adoption of the same method as the burst b3. That is to say, in the case of the burst b4, for example, a new VCM current NVCM3 used for writing the burst b4 is computed in accordance with the following equation:

$$NVCM4 = SVCM4 + a(\text{Target} - po3) + \text{delta}3$$

where notation a denotes the proportion multiplier, notation Target denotes the target value, notation po3 denotes a pattern overlap and notation delta3 denotes the correction value found for the computation of the VCM current for the burst b3 in accordance with the following equation:

$$\text{delta}3 = a(\text{Target} - po3) + \text{delta}2$$

By the same token, a new VCM current NVCM(n) used for writing the burst bn is computed in accordance with the following equation:

$$NVCM(n) = SVCM(n) + a(\text{Target} - po(n-1)) + \text{delta}(n-1)$$
where n=4 to 15.

(iii) DC Erasure

At the next step, the HDD 1 carries out a DC-erasure process to erase the pre-servo patterns written onto the magnetic disk 13. In the DC-erasure process, with the write current of the head 16 kept at a constant value, the magnetic disk 13 is rotated one revolution to erase the pre-servo patterns written onto the magnetic disk 13. To put it concretely, the VCM current is set at a constant value for writing the burst b0 to carry out a DC-erasure process to erase the burst b0 from its positions. This process is then repeated for the bursts b1 to b15.

(iv) Repetition of the Above Operations

The HDD 1 uses the VCM currents newly computed in the sequence to repeat the sequences (i) to (iii). The repetition of these sequences (i) to (iii) is continued till differences each computed in the sequence (ii) as the difference between a pattern overlap and the target value has a value in a criterion range or a reference range. A typical criterion range is 2%. After final VCM currents are determined, a DC-erasure process is carried out to erase all pre-servo patterns in order to make a preparation for the next sequences. The final VCM currents are currents for which errors have values in the criterion range. By the errors, the differences pattern overlaps and the target value are meant. At a point of time the above sequences are completed, the final VCM currents for writing the pre-servo patterns (burst patterns) b0 to b15 suitable for the target pattern overlaps are determined. These final VCM currents are referred to as i0, i1, i2, - - - and i15.

Notations and symbols to be used in later descriptions are defined as follows:

Ts [S]: Ideal servo sector time of the product (Circumferential-direction time interval of product servo patterns)

Ns: The number of sectors per track for a servo pattern in the product n=Ns: The number of sectors per track for a base pattern or a time aligned pattern Ms [rpm]: Motor speed Ts [S]: 60/Ms/Ns (2) Sequence S12 of Writing Pre-servo Patterns This sequence is executed to write base patterns laid out at radial-direction intervals equal to the servo track pitch by using the VCM currents determined in the previous sequences. The base patterns are used in later sequences of writing time aligned patterns onto tracks. The base patterns are written on tracks at the same periods as product-servo patterns. The positions (the write timings) of base patterns on any particular track are shifted slightly in the circumferential direction from the corresponding positions (the corresponding write timings) of base patterns on an adjacent track so that the base patterns written on the particular track do not overlap the base patterns written on the adjacent track. A base pattern comprises a sync field and a sync mark, which are used for measuring the time interval of base patterns, and a burst pattern used for detecting the position in the radial direction.

Figure 8:
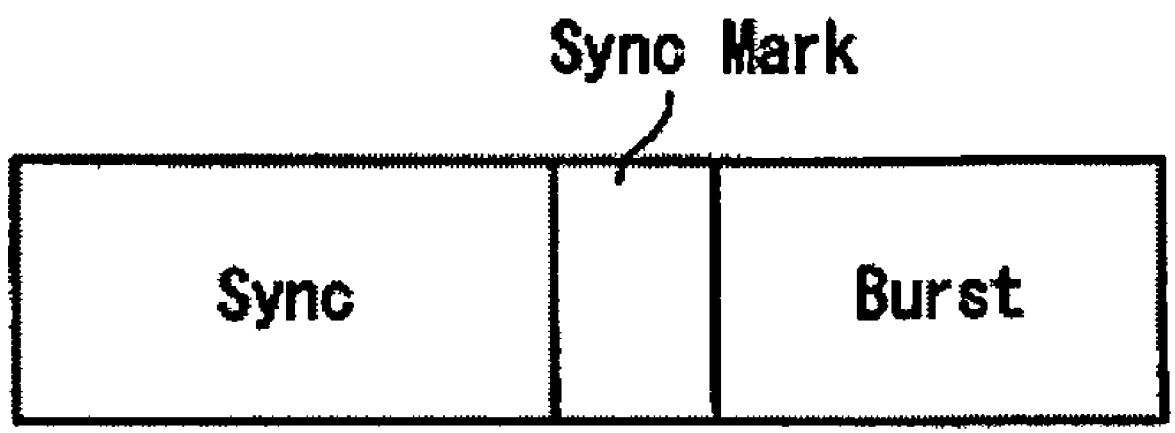
FIG. 8 is a diagram showing the data format of a base pattern provided by the embodiment.
Figure 9:
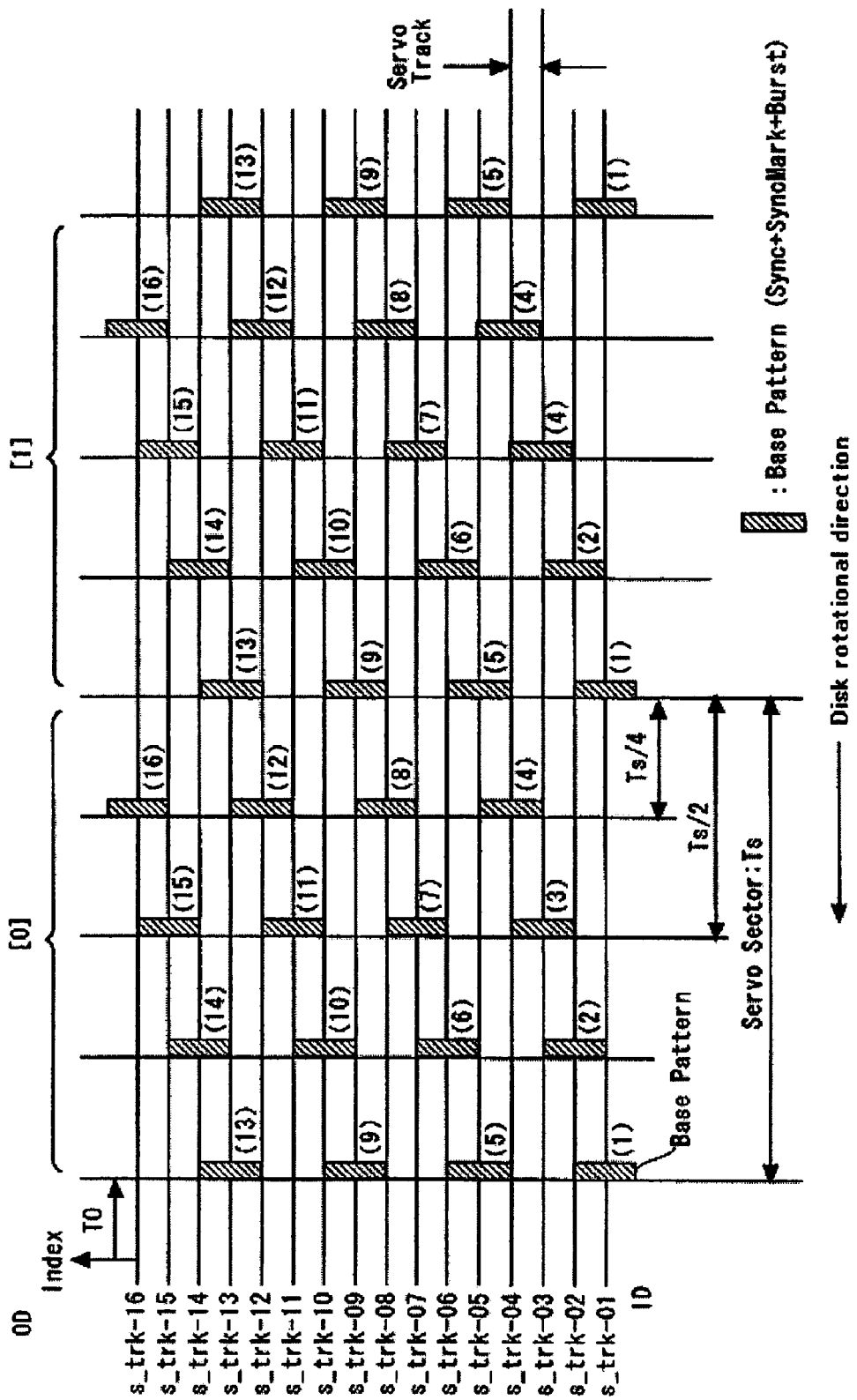
FIG. 9 is a diagram showing a state in which base patterns provided by the embodiment are recorded on a magnetic disk.

FIG. 8 is a diagram showing the data format of a base pattern. The sync field is a magnetization pattern laid out at a constant frequency. The sync mark is a special magnetization pattern that may be detected by a read/write channel IC (refer to FIG. 17). The burst pattern is a magnetization pattern also laid out at a constant frequency. As shown in FIG. 9, the HDD 1 uses final VCM currents i0 to i15 determined at the preceding step to move the write element 162 to tracks each denoted by notation s_trk in the figure and write base patterns into a plurality of sectors on each of the tracks on the magnetic disk 13. The number of sectors included in a track as sectors into which the base pattern is written on a track is the same as the number of sectors for a product servo pattern. The HDD 1 writes a pattern into Ns (n) sectors on every track at time intervals Ts between servo sectors of the product. FIG. 9 is a diagram showing typical processing to write base patterns onto 16 tracks.

The typical processing to write base patterns as shown in FIG. 9 is explained as follows. First of all, the HDD 1 sets the VCM current at i0 for writing a base pattern (1) at time intervals Ts onto the innermost track s_trk-01 with an index signal taken as a reference. As a result, the base pattern (1) is written into sectors on the innermost sector. Then, the HDD 1 sets the VCM current at i1 to move the write element 162 to an adjacent track on the outer-circumferential side of the present track and write a base pattern (2) at time intervals Ts in the same way. At that time, the base pattern (2) is written onto the new track at locations shifted from the corresponding positions of the base pattern (1) in the circumferential direction. That is to say, a period of time between the index signal and the start of the write processing is changed. In the typical processing shown in FIG. 9, the locations of the base pattern (2) are shifted from the corresponding positions of the base pattern (1) by Ts/4. The shift between base patterns is set at such a value that the sum of shifts between base patterns on adjacent tracks does not exceed Ts/4.

Thereafter, by the same token, a final VCM current determined at the preceding step is used to move the write element 162 to an adjacent track on the outer-circumferential side of the present track and write a base pattern (3) into the adjacent track. This processing is carried out repeatedly to write base patterns (4) to (16) on outer-circumferential tracks by shifting the locations of a base pattern on a new track in the circumferential direction from those of a base pattern on the adjacent track. In the typical processing shown in FIG. 9, the circumferential-direction locations of a base pattern on a new track are returned to the circumferential-direction locations of a base pattern on a previous track preceding the new track by four tracks. However, the scheme to set the circumferential-direction locations of a base pattern is not necessarily limited to this format. For example, the circumferential-direction locations of a base pattern on a new track may also be returned to the circumferential-direction locations of a base pattern on a previous track preceding the new track by eight tracks.

As described above, a base pattern is written into n sectors of every track of the product at a value of the VCM current by shifting the location of the pattern in each sector in the circumferential direction with the index signal taken as a reference. The base pattern is called the base pattern (k)_m where notation k is the number of the base-pattern pattern and is also the number of a track on which the base pattern is written, and notation m is the number of a sector on the track. For example, base patterns on the innermost-circumferential track having a number of 1 are called a base pattern (1)_0, a base pattern (1)_1, - - - and a base pattern (1)_n−1. In this case, the base pattern (1)_0 is the first base pattern closest to the index signal, the base pattern (1)_1 is a pattern following the base pattern (1)_0 in the circumferential direction and so on.

Ideally, circumferential-direction intervals between base patterns are set at values with a high degree of precision as follows. The circumferential-direction interval between adjacent base patterns (k) on the same track is set at Ts with a high degree of accuracy where k=1 to 16. The circumferential-direction interval between base patterns (k)_m and (k+1)_m on the corresponding sectors of adjacent tracks is set at Ts/4 with a high degree of accuracy where m=0 to n−1. The circumferential-direction interval between base patterns (k)_m and (k+2)_m on the corresponding sectors of tracks separated away from each other by a track is set at Ts/2 with a high degree of accuracy. In actuality, however, the base patterns are not written into corresponding sectors at such intervals uniformly due to effects of rotation irregularities. For this reason, in a later sequence, a time aligned pattern is written onto every track uniformly at the time intervals Ts. The centers of the base patterns written in the processing described above onto tracks are defined as s_trk-01, s_trk-02, - - - and s_trk-16, which are each used as the name of a track. For example, the center of the base pattern (1) written by flowing the VCM current i0 is the track s_trk-01.

Figure 10:
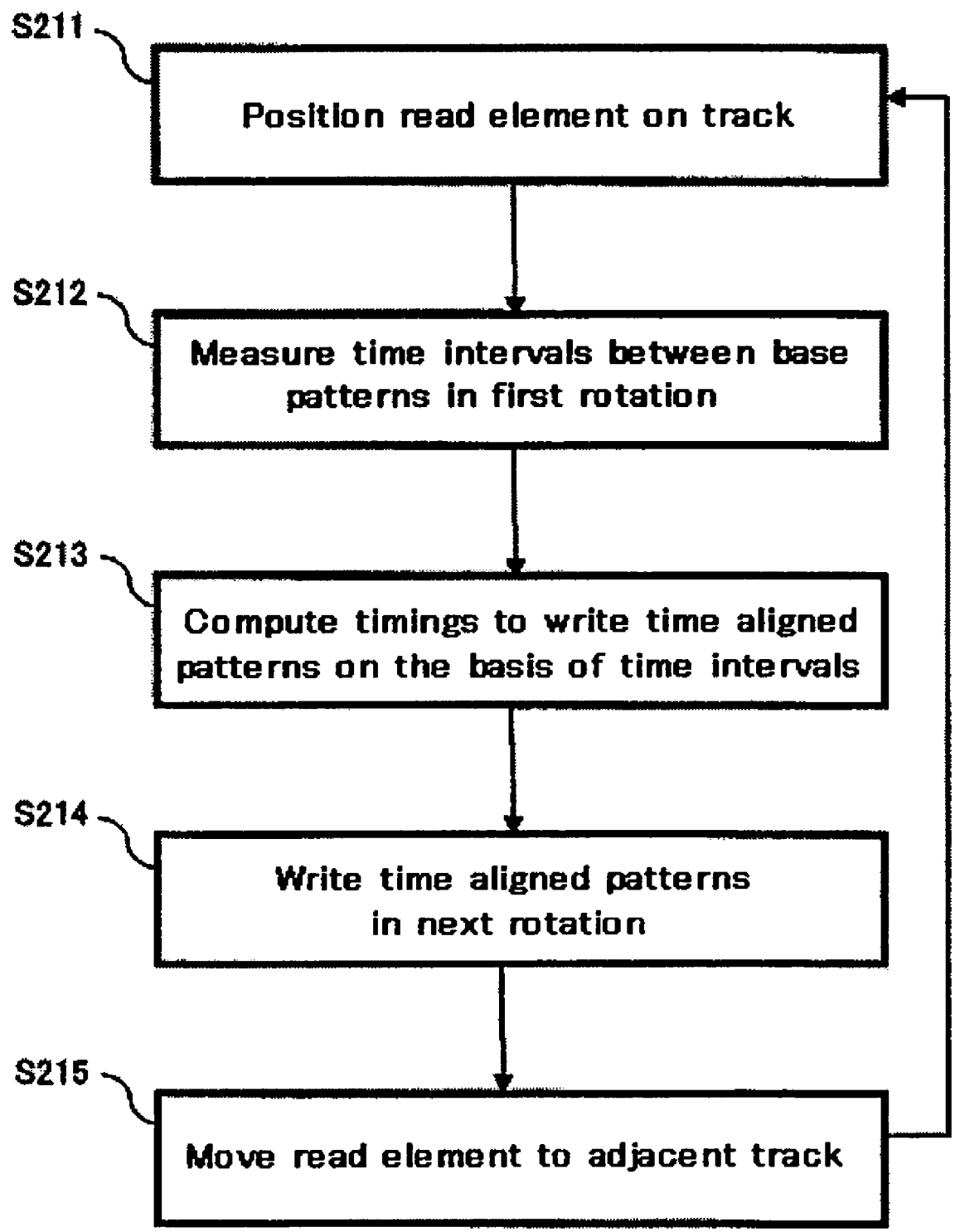
FIG. 10 shows an explanatory flowchart referred to in describing processes provided by the embodiment as processing to write time aligned patterns onto a magnetic disk.

(3) Sequence S21 of Measuring Timings of the Base Patterns and Writing Time Aligned Patterns Next, processing to write time aligned patterns onto the magnetic disk 13 on the basis of base patterns is explained. Timings to write time aligned patterns are determined by measuring timings of base patterns. Thus, for each servo track, timings of base patterns are measured and time aligned patterns are written onto the track. As shown in FIG. 10, in this sequence S211, the read element 161 is positioned at the center of a track. Then, in the following sequence S212, the time interval between adjacent base patterns on a track is measured in the first one rotation. Subsequently, in the next sequence S213, timings to write a time aligned pattern onto the track on the basis of the time interval measured in the first one rotation as the time interval between adjacent base patterns are computed. Usually, this sequence S213 is done during S212 sequence in the first rotation. Then, in the next sequence S214, the write element 162 writes the time aligned pattern onto the same track in the next rotation. After the write element 162 writes the time aligned pattern onto the same track in the next rotation, the read element 161 is moved to the adjacent track in the next sequence S215. Then, the processing is repeated from the step S211 to align the position of the read element 161.

Assume for example that, in the HDD 1, the read element 161 has been positioned on a base pattern written on the servo track s_trk-01, which is the track on the innermost-circumferential ID side. In this case, in the first one rotation of the magnetic disk 13, the interval of the base patterns is measured. If possible, also in the first one rotation, write timings of time aligned patterns are computed on the basis of the measured interval of the base patterns. In the next rotation, the HDD 1 writes the time aligned pattern onto another track for time aligned patterns. As the operation to write the time aligned pattern onto the track is completed, the read element 161 of the head 16 is moved to the servo track s_trk-02, which is the adjacent track on the outer-circumferential OD side and the same operations are repeated. In this embodiment, the same operations are carried out repeatedly for all 16 servo tracks including the last track s_trk-16.

It is to be noted that the number of tracks is related to the read/write offset of the head 16. In this embodiment, the number of tracks is 16. The read/write offset of the head 16 is shown in FIG. 3. That is to say, the number of tracks and the read/write offset are set at values satisfying the following equation:

(Servo-track pitch)×(The number of base-pattern tracks)>(Read/write offset)

In the case of the contemporary ordinary head, the read/write offset may be set at a sufficiently large value for a servo-track count of 16. In the future, the number of servo tracks may be increased if necessary. In this case, the read/write offset is an offset value for a state in which the read element 161 is positioned on the track on the innermost-circumferential ID side.

First of all, measurement of the timings of the base patterns is explained. In this sequence, the time interval between adjacent base patterns written on the same track in the preceding sequence is measured for each track. In order to measure the timing of a base pattern on the same track, it is necessary to position the read element 161 on the track. For this reason, first of all, a method to position the read element 161 on the track is explained. While changing the VCM current from the magnitude i0 to move the actuator in the OD direction a little bit at a time, the HDD 1 observes the amplitude of a read-back signal of the burst patterns.

The width (or the length in the radial direction) of the read element 161 is smaller than that of the write element 162. Thus, the width of the read element 161 is smaller than the width of the base pattern. For this reason, the center of the servo track s_trk-01 is defined as the position of the read element 161 for a state in which the burst amplitude of the base pattern (1) reaches a maximum value. By the same token, the center of the servo track s_trk-16 is defined as the position of the read element 161 for a state in which the burst amplitude of the base pattern (16) reaches a maximum value. In addition, the center of any other specific servo track is defined as the position of the read element 161 for a state in which the amplitudes of burst patterns written on both tracks adjacent to the specific track become equal to each other. For example, the center of the servo track s_trk-02 is defined as the position of the read element 161 for a state in which the amplitudes of burst patterns (1)_k and (3)_k written respectively on the servo tracks s_trk-01 and s_trk-03 adjacent to the track s_trk-02 become equal to each other.

Figure 11:
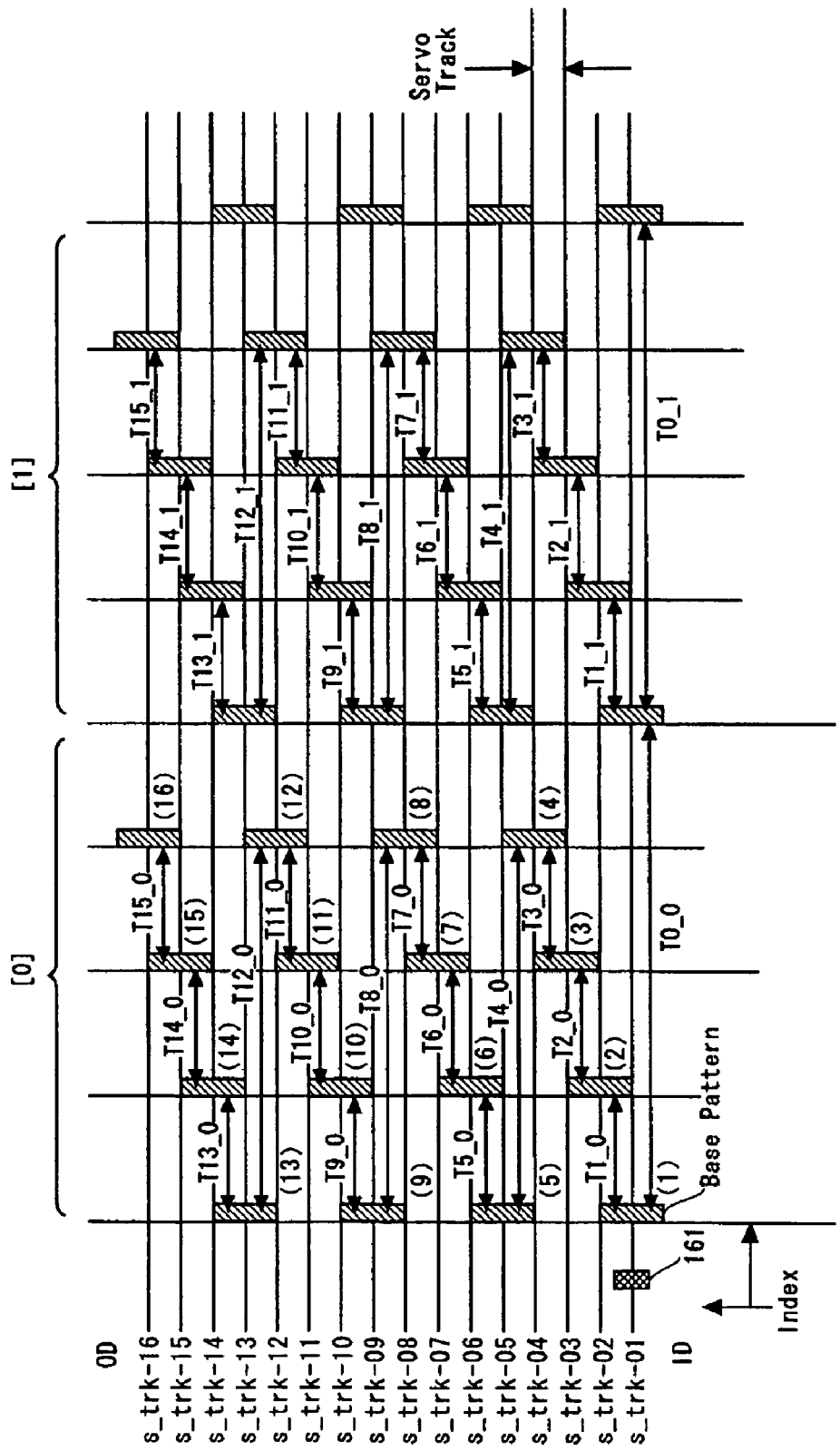
FIG. 11 is an explanatory diagram referred to in describing processes provided by the embodiment as processing to measure time intervals between base patterns.

Next, a concrete method of measuring the timings of the base pattern on every track is explained by referring to FIG. 11. First of all, the HDD 1 moves the read element 161 to the center of the servo track s_trk-01. In this process, the VCM current is reduced a little bit at a time from the magnitude i0 and, at a point of time the amplitude of the base pattern (1)_k is seen to reach a maximum value for the first time, the VCM current is sustained at a constant magnitude. In this way, the read element 161 may be positioned at the center of the servo track s_trk-01. Time intervals T0_0, T0_1, T0_2, - - - and T0_n−1 between synch marks of the base patterns (1)_k on the servo track s_trk-01 are measured, where n is the number of base patterns written on one servo track s_trk. Thus, n is also the number of sectors on a servo track s_trk. The suffixes 0, 1 - - - n−1 respectively appended to the names T0_0, T0_1, T0_2, - - - and T0_n−1 of the time intervals are each a sector number.

Then, the read element 161 is moved, being positioned at the center of the servo track s_trk-02. Time intervals T1_0, T1_, T1_2, - - - and T1_n−1 between synch marks of the base patterns (1)_k and (2)_k are measured. The read element 161 may be positioned at the center of the servo track s_trk-02 by adjusting the VCM current to a magnitude corresponding to a location at which the burst amplitude of a base pattern (1)_k is equal to the burst amplitude of a base pattern (3)_k.

Subsequently, the read element 161 is moved, being positioned at the center of the servo track s_trk-03 and time intervals T2_0, T2_1, T2_2, - - - and T2_n−1 between synch marks of the base patterns (2)_k and (3)_k are measured. The read element 161 may be positioned at the center of the servo track s_trk-03 by adjusting the VCM current to a magnitude corresponding to a location at which the burst amplitude of a base pattern (2)_k is equal to the burst amplitude of a base pattern (4)_k. By the same token, the read element 161 is moved, being positioned at the center of the servo track s_trk-04 and time intervals T3_0, T3_1, T3_2, - - - and T3_n−1 between synch marks of the base patterns (3)_k and (4)_k are measured. The read element 161 is further moved, being positioned at the center of the servo track s_trk-05 and time intervals T4_0, T4_1, T4_2, - - - and T4_n−1 between synch marks of the base patterns (4)_k and (5)_k are measured. In the measurement of the time intervals T4_0, T4_1, T4_2, - - - and T4_n−1 between synch marks of the base patterns (4)_k and (5)_k, the base pattern (5)_k is detected earlier than the base pattern (4)_k. Thereafter, this processing is repeated in the same way for the remaining servo tracks till time intervals T15_0, T15_1, T15_2, - - - and T15_n−1 between synch marks of the base patterns (15)_k and (16)_k are measured. FIG. 12 is a diagram showing a table summarizing results of measurements of time intervals between base patterns.

Figure 13:
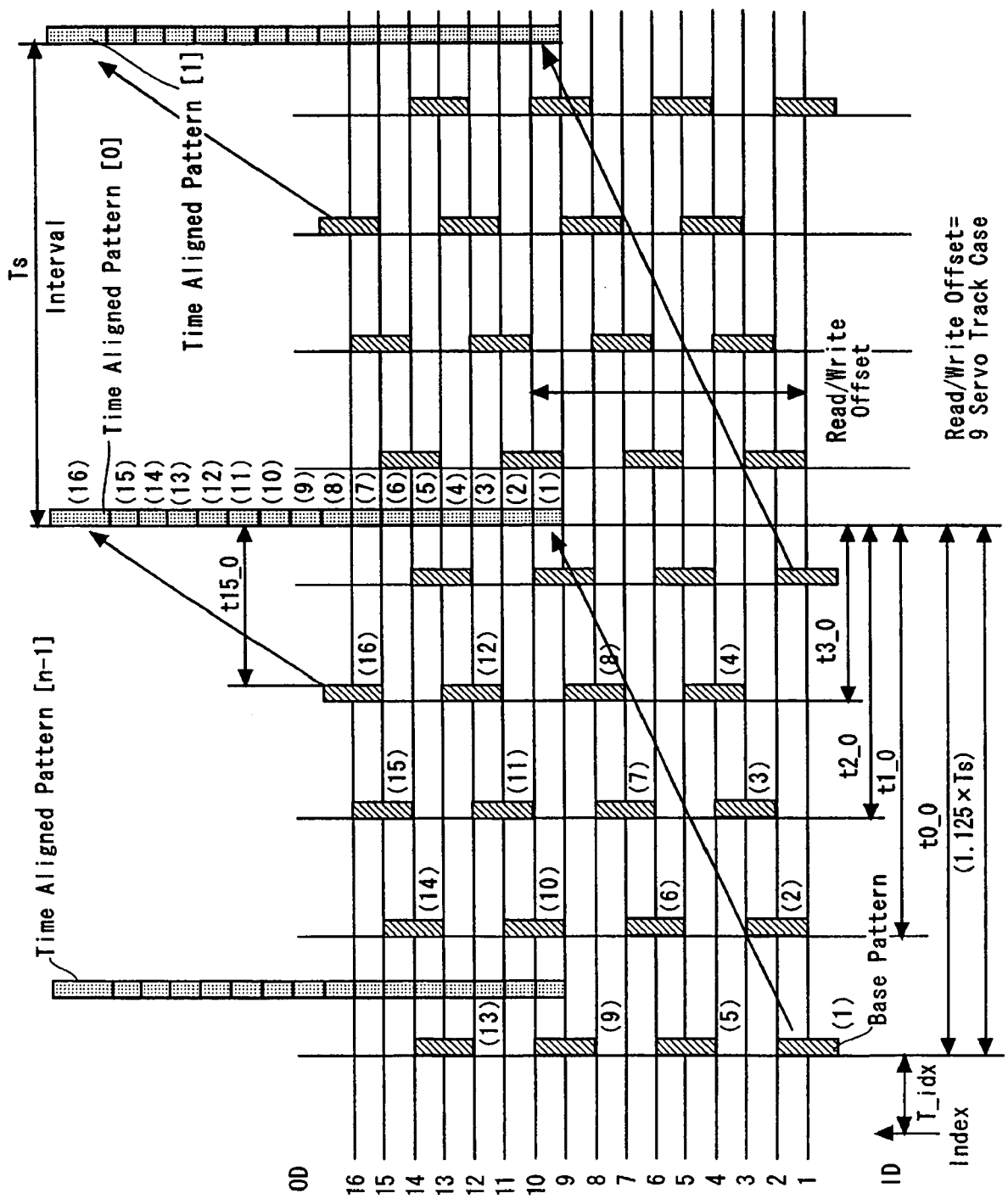
FIG. 13 is a diagram showing a state in which time aligned patterns provided by the embodiment are recorded on a magnetic disk.

Next, processing to write time aligned patterns onto the magnetic disk 13 is explained. This sequence is executed on the basis of base patterns written in a previous process and on the basis of time intervals actually measured in the preceding process as time intervals of the base patterns. The time intervals are used in writing time align patterns onto the magnetic disk 13 as patterns with time-base timings aligned to each other throughout all tracks. FIG. 13 is a diagram showing base patterns and time aligned patterns created on the basis of the base patterns. FIG. 13 shows a typical case in which the read/write offset of the head 16 is equal to 9 servo track pitches. In this typical case, the time aligned patterns are patterns written on the 16 servo tracks at time intervals TS with time-base timings aligned to each other throughout all the 16 servo tracks. The time aligned patterns are used as a base for writing next product servo patterns onto the magnetic disk 13. A method of creating the product servo patterns will be described later.

An array of time aligned patterns comprises time aligned patterns written on the 16 servo tracks with time-base timings aligned to each other in the radial axis direction, that is, with circumferential-direction positions aligned to each other in the radial axis direction. Since a time aligned pattern is written on each of the tracks at time intervals Ts in the circumferential direction, such arrays are created also at time intervals Ts in the circumferential direction. That is to say, a time aligned pattern is created on each of the servo tracks in n sectors separated away from each other in the circumferential direction by the time interval Ts. Since such a time aligned pattern is created on the 16 servo tracks, groups each consisting of 16 time aligned patterns laid out in the radial direction are created in the n sectors throughout the 16 servo tracks. Each of the groups consists of 16 time aligned patterns laid out in the radial direction with timings aligned to each other, that is, with a uniform angle of deviation in the circumferential direction.

The radial-direction position of a time aligned pattern is determined in accordance with the offset between the read element 161 and the write element 162, which are employed in the head 16. That is to say, the shift of the time aligned pattern from the corresponding base pattern in the OD direction is equal to the read/write offset. However, this shift does not have any effect on the next process of the In-Drive SSW (TSSW) processing. That is to say, time aligned patterns may be written onto the magnetic disk 13 by adoption of the same method for all products or for different read/write offsets of the head 16 in the same product. A time aligned pattern is actually written onto the magnetic disk 13 right after timings of base patterns written on servo tracks are measured. The process to write time aligned patterns onto the magnetic disk 13 is described as follows.

(i) Writing a Time Aligned Pattern (1)

As described above, first of all, the HDD 1 moves the read element 161 to the center of the servo track s_trk-01 and time intervals T0_0, T0_1, T0_2, - - - and T0_n−1 between synch marks of the base patterns (1)_k on the servo track s_trk-01 are measured in a rotation of the magnetic disk 13. Then, timings to write the time aligned pattern onto the servo track s_trk-01 are computed with the base pattern (1) taken as a reference. From the standpoint of the speed of the processing to write the time aligned pattern, it is desirable to complete this computation in the same rotation as the measurement of the time intervals of the base pattern (1). However, it may take time corresponding to several rotations to compute these timings to write the time aligned pattern onto a servo track. To put it concretely, timing is determined as a period of time between the timing to detect the base pattern (1)_k and the start of an operation to write the time aligned pattern (1)_k onto a servo track. The suffix (1) appended to the notation (1)_k denoting the time aligned pattern (1)_k indicates that the servo track onto which the time aligned pattern (1)_k is to be written is the first track corresponding to the servo track s_trk-01 cited earlier or indicates the track order number starting from the inner side. On the other hand, the suffix _k indicates that the time aligned pattern (1)_k is written into the kth sector of the servo track, or indicates the sector order number in the servo track.

Equations given below are formulas each expressing a time period t0_k corresponding to the base pattern (1)_k as a time period t0_k between the timing to detect the sync mark of the base pattern (1)_k and the start of an operation to write the time aligned pattern (1)_k onto a servo track. Notation Tsd in each of the formulas denotes a theoretical period of time between the start of the sync field of the base pattern and the end of the sync mark of the base pattern. It is to be noted that an initial value of 1.125*Ts is determined so as to create the time aligned pattern at a location not overlapping the base pattern. However, the initial value does not have to be 1.125*Ts. For example, the initial value may be 2.25*Ts.

$$t0\_0 = 1.125*Ts - Tsd$$

$$t0\_1 = 1.125*Ts - (T0\_0 - Ts) - Tsd$$

$$t0\_2 = 1.125*Ts - (T0\_0 + T0\_1 - 2*Ts) - Tsd$$

$$t0\_3 = 1.125*Ts - (T0\_0 + T0\_1 + T0\_2 - 3*Ts) - Tsd$$

$$t0\_n-1 = 1.125*Ts - (T0\_0 + T0\_1 + \text{- - -} + T\_n-1 - n*Ts) - Tsd$$

As indicated by the formulas described above, prior to an operation to write the time aligned pattern (1) into a sector in the first track, a write time t0_k to write the time aligned pattern (1) into a sector in the first track has been determined. The write time t0_k of the time aligned pattern (1)_k, which is a period of time between detection of the base pattern (1)_k and the start of an operation to write the time aligned pattern (1)_k into a sector, is determined from the time intervals T0_k between adjacent base patterns (1). As described above, the write time of the time aligned pattern (1)_k is a time period relative to the base pattern (1)_k. The difference in write time between adjacent time aligned patterns (1) is equal to a difference between a value determined in advance and the time interval between adjacent base patterns (1). The value determined in advance is the time interval Ts between adjacent sectors. For example, the difference between the write time t0_0 relative to the base pattern (1)_0 and the write time t0_1 relative to the base pattern (1)_1 is (T0_0−Ts). As another example, the difference between the write time t0_1 relative to the base pattern (1)_1 and the write time t0_2 relative to the base pattern (1)_2 is (T0_1−Ts). Since T0_0 is the time interval between the adjacent base pattern (1)_0 and the base pattern (1)_1 whereas T0_1 is the time interval between the adjacent base pattern (1)_1 and the base pattern (1)_2, time aligned patterns (1) separated away from each other by the inter-sector time interval Ts may be written onto the track. It is to be noted that, even though a time period equal to an integral multiple of the rotation time of the magnetic disk 13 may be added to the inter-sector time interval Ts, it is desirable to follow the above example in order to avoid errors caused by the rotation of the magnetic disk 13.

It is to be noted that Tsd may be set at a fixed value such as 0. With Tsd set at a fixed value, the circumferential-direction position of the time aligned pattern is shifted a little bit at a time toward the preceding base pattern. In the next rotation of the magnetic disk 13, on the basis of the timings t0_0 to t0_n−1 relative to the base patterns (1)_0 to (1)_n−1 respectively, the time aligned patterns (1)_0 to (1)_n−1 are written onto a track. To put it in detail, when the read element 161 detects the sync mark of the base pattern (1)_k, at a time t0_k after the detection timing, the HDD 1 drives the write element 162 to write the time aligned pattern (1)_k onto the track by execution of processing to record the time aligned pattern (1)_k into a sector in the track.

(ii) Writing a Time Aligned Pattern (2)

At the next step, a time aligned pattern (2)_k is written into sectors of an outer-circumferential track adjacent to the track for the time aligned pattern (1)_k. First of all, as explained earlier in the description of the measurement of base-pattern time intervals, the HDD 1 moves the read element 161 to the center of the servo track s_trk-02 and time intervals T1_k between the synch mark of the base pattern (1)_k on the servo track s_trk-01 and the synch mark of the base pattern (2)_k on the servo track s_trk-02 are measured in a rotation of the magnetic disk 13 where k=0, 1, - - - and (n−1). Then, timings to write the time aligned pattern (2) onto the servo track s_trk-02 are computed with the base pattern (2) taken as a reference. Much like the base pattern (1)_k, a time period t1_k between the timing to detect the base pattern (2)_k and the start of and operation to write the time aligned pattern (2)_k into a sector is computed for k=0, 1, - - - and (n−1).

Equations given below are formulas each expressing a time period t1_k between the timing to detect the sync mark of the base pattern (2)_k and the start of an operation to write the time aligned pattern (2)_k onto a servo track.

$$t1\_0 = t0\_0 - T1\_0$$

$$t1\_1 = t0\_1 - T1\_1$$

$$t1\_2 = t0\_2 - T1\_2$$

$$t1\_3 = t0\_3 - T1\_3$$

$$t1\_n-1 = t0\_n-1 - T1\_n-1$$

In the next rotation of the magnetic disk 13, on the basis of the timings t1_0 to t1_n−1 relative to the base patterns (1)_0 to (1)_n−1 respectively, the HDD 1 writes the time aligned patterns (2)_0 to (2)_n−1 onto a track. The method of writing the time aligned patterns (2)_0 to (2)_n−1 onto a track is the same as the method for the time aligned patterns (1)_0 to (1)_n−1.

(iii) Writing a Time Aligned Pattern (3)

At the next step, a time aligned pattern (3)_k is written into sectors of an outer-circumferential track adjacent to the track for the time aligned pattern (2)_k. First of all, the HDD 1 moves the read element 161 to the center of the servo track s_trk-03 and a time interval T2_k between the synch mark of the base pattern (2)_k on the servo track s_trk-02 and the synch mark of the base pattern (3)_k on the servo track s_trk-03 are measured in a rotation of the magnetic disk 13 where k=0, 1, - - - and (n−1). Then, timings to write the time aligned pattern (3) onto the servo track s_trk-02 are computed with the base pattern (3) taken as a reference. Much like the base pattern (1)_k, a time period t2_k between the timing to detect the base pattern (3)_k and the start of and operation to write the time aligned pattern (3)_k into a sector is computed for k=0, 1, - - - and (n−1).

Equations given below are formulas each expressing a time period t2_k between the timing to detect the sync mark of the base pattern (3)_k and the start of an operation to write the time aligned pattern (3)_k onto a servo track.

$$t2\_0 = t1\_0 - T2\_0$$

$$t2\_1 = t1\_1 - T2\_1$$

$$t2\_2 = t1\_2 - T2\_2$$

$$t2\_3 = t1\_3 - T2\_3$$

$$t2\_n-1 = t1\_n-1 - T2\_n-1$$

In the next rotation of the magnetic disk 13, on the basis of the timings t2_0 to t2_n−1 relative to the base patterns (2)_0 to (2)_n−1 respectively, the HDD 1 writes the time aligned patterns (3)_0 to (3)_n−1 onto a track. The method of writing the time aligned patterns (3)_0 to (3)_n−1 onto a track is the same as the method for the time aligned patterns (1)_0 to (1)_n−1.

Thereafter, the same process is carried out repeatedly to write the time aligned patterns (4) to (16) onto the magnetic disk 13. FIG. 14 is a diagram showing a table summarizing pieces of data, which each represent a time period between the detection of a base pattern and the start of an operation to write a time aligned pattern corresponding to the base pattern into a sector, for all sectors on a servo track and for all servo tracks on the magnetic disk 13.

As described above, first of all, a time aligned pattern is written into sectors of a first track and, then, a time aligned pattern is written into sectors of each target track following the first track on the basis of the write times of the time aligned pattern already written on a preceding track adjacent to the target track and on the basis of the write times of the base pattern already created on the target track. The write element 162 writes every time aligned pattern (k) onto a track as a computed period of time lapses since the read element 161 detects a corresponding base pattern (k) on the same track. A difference in write time between time aligned patterns written on servo tracks adjacent to each other is determined by the time interval between the base patterns corresponding to the time aligned patterns and, as a matter of fact, equal to the time interval. For example, as shown in the table of FIG. 14, the difference (t0_k−t1_k) in write time between the time aligned pattern (1) and the time aligned pattern (2) is equal to the time interval T1_k between the base pattern (1) and the base pattern (2). By the same token, the difference (t1_k−t2_k) in write time between the time aligned pattern (2) and the time aligned pattern (3) is equal to the time interval T2_k between the base pattern (2) and the base pattern (3).

The write time is set relative to detection of a base pattern at the time interval between base patterns as described above. It is possible to write time aligned patterns with the circumferential-direction positions coinciding with each other onto the magnetic disk. In particular, by setting the difference in write time between time aligned patterns written on servo tracks adjacent to each other at the time interval between the base patterns corresponding to the time aligned patterns as described above, the positions of the time aligned patterns on an adjacent track may be made accurately coincident with the positions of the time aligned patterns on a track preceding the adjacent track so that data read errors may be effectively eliminated. It is to be noted that, even though an integral multiple of the rotation time of the magnetic disk 13 may be added to the time interval between base patterns to give a difference in write time, it is desirable to write a time aligned pattern after detection of a base pattern corresponding to the time aligned pattern in one rotation of the magnetic disk 13 in order to avoid errors caused by the rotation of the magnetic disk 13.

Figure 15:
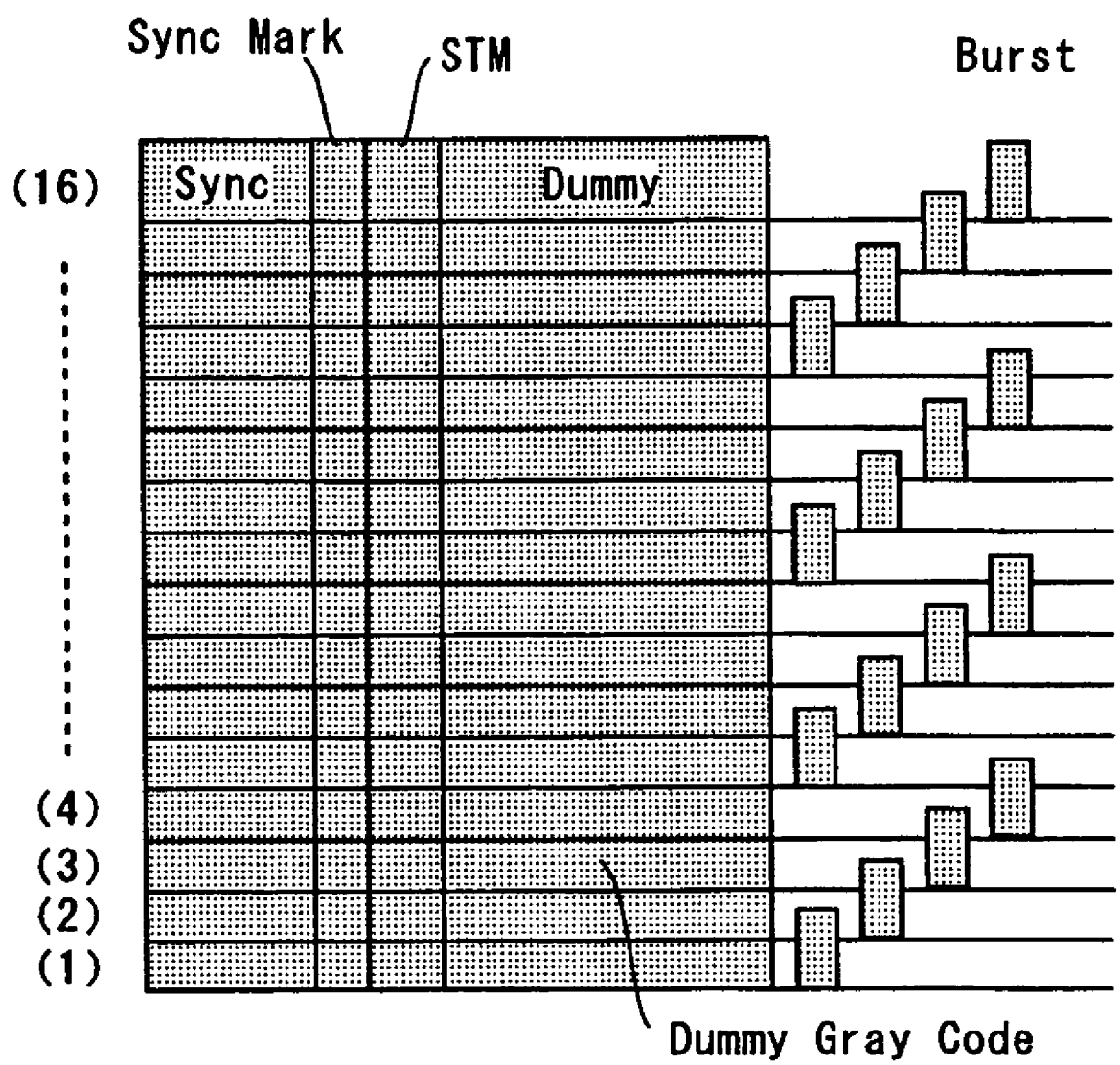
FIG. 15 is a diagram showing the data format of the time aligned pattern provided by the embodiment.

FIG. 15 is a diagram showing details of the data format of the time aligned pattern. As shown in the figure, the time aligned pattern comprises a sync field, a sync mark, an STM, a dummy gray code (or a track number) and a burst. The sync field and the sync mark are used in measurement of a time interval between time aligned patterns. The measurement of a time interval between time aligned patterns is determined by timings to detect sync marks. The STM and the subsequent items are the same format as a product servo pattern used in an access to user data except that there is a difference in burst portion between the patterns. These patterns are used in detection of the radial-direction position of the read element 161 employed in the head 16. The STM is used in detection of a servo pattern. The dummy gray code has the same format as the product servo pattern. In order to distinguish the time aligned pattern from the product servo pattern, however, a unique number for distinguishing the time aligned pattern from the product servo pattern is used as the dummy gray code.

The dummy gray code and the amplitude of the burst are used in the detection of the radial-direction position of the read element 161. A function incorporated in a control circuit employed in the HDD 1 is used as a function intended originally as the product servo pattern. A hardware portion may be eliminated for a cost reduction purpose. The timing to write the burst onto any specific track is shifted a little bit in the circumferential direction from the timing to write it onto a track adjacent to the specific track so as to prevent the burst on the specific track from overlapping the burst on the adjacent track as shown in FIG. 15. The burst is required for measuring an inter-track distance in the radial direction with the read/write element width of the head 16 used as a reference. Since the burst is not trimmed, it is referred to as a second burst in order to distinguish it from a trimmed burst existing in the product servo pattern.

(4) Measuring Head Read/write Separations

Finally, a method for measuring head read/write separation times of the head 16 on the basis of time aligned patterns is explained. In this sequence, head read/write separation times of the head 16 are measured on the basis of time aligned patterns. As shown in FIG. 3, a head read/write separation time is a time difference in the circumferential direction of the magnetic disk 13 between the read element 161 and write element 162 of the head 16. As will be described later, in the In-Drive SSW (TSSW) process, the head read/write separation time is monitored and always taken into consideration as a delay in the next processing to write a product servo pattern onto the magnetic disk 13.

Figure 16:
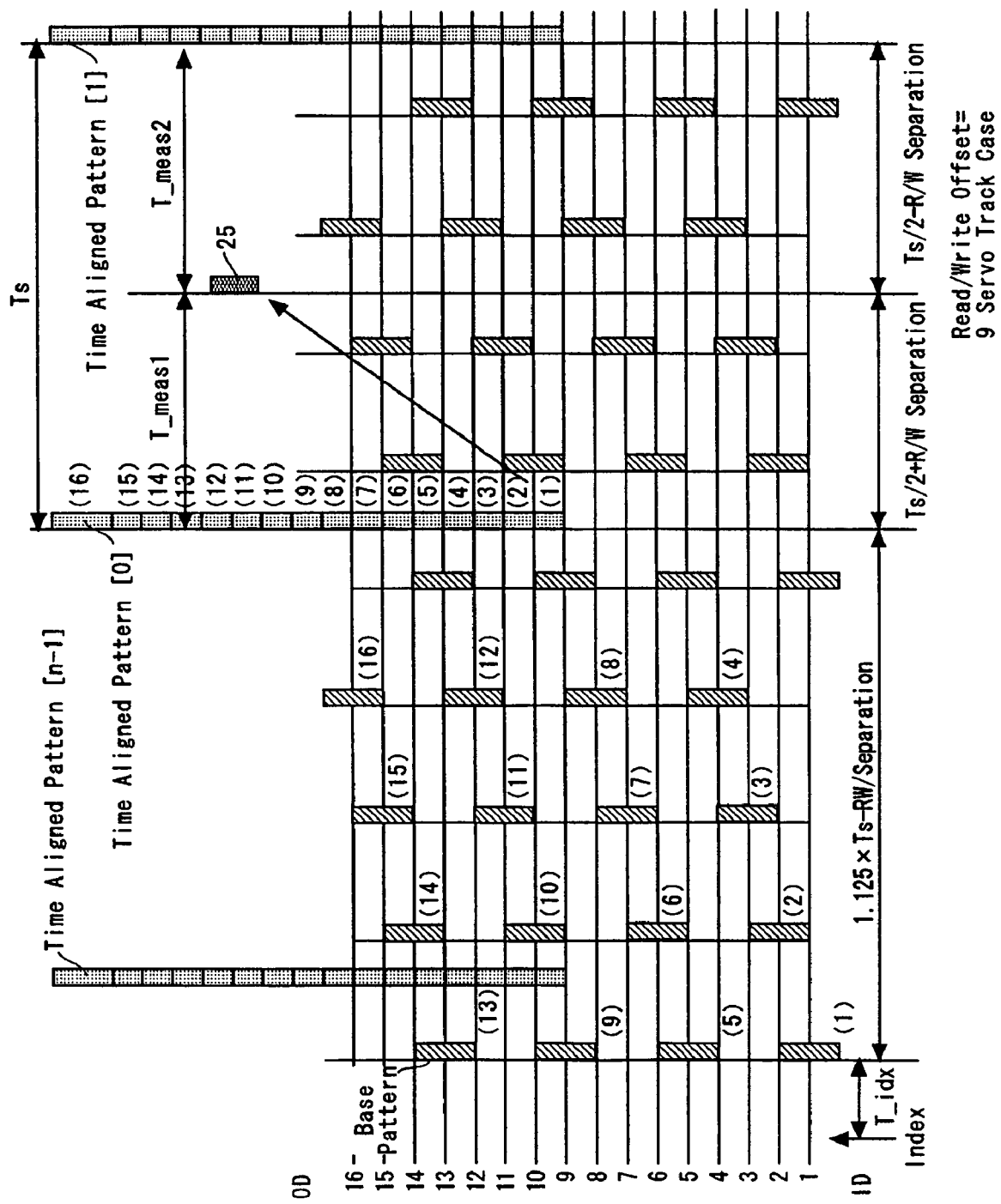
FIG. 16 is an explanatory diagram referred to in describing processes provided by the embodiment as processing to measure a head read/write separation time on the basis of time aligned patterns.

FIG. 16 is a diagram showing the method referred to in measuring head read/write separation times. After writing time aligned patterns onto the magnetic disk 13, the HDD 1 moves the read element 161 to the position of the time aligned pattern (2). During the movement of the read element 161 to the position at which the time aligned pattern (2) is to be written, the HDD 1 changes the VCM current a little bit at a time from the magnitude i0 corresponding to the innermost track in order to move the head 16 in the OD direction in an attempt to search for the dummy gray code of the time aligned pattern (2). Since the width of the read element 161 is not greater than the width of the second burst, the track center of the time aligned pattern (2) is assumed to be a position at which the width of the second burst of the time aligned pattern (1) is equal to the width of the second burst of the time aligned pattern (3). The VCM current at that time is sustained at a fixed magnitude and the head 16 is positioned with the elasticity of the inner crush stop 18 put in a state of equilibrium with a force applied by the VCM 17 to press the actuator 14 against the inner crush stop 18.

Right after a time period of Ts/2 lapses since the read element 161 detects the sync mark of the time aligned pattern (2) at this position coinciding with the track center of the time aligned pattern (2), the write element 162 writes a pattern (25) comprising a sync field and a sync mark onto a servo track. This operation is carried out for every time aligned pattern (2) to write the pattern (25) onto a circumference of the magnetic disk 13. The method of writing the pattern (25) onto the circumference is the same as the method of writing a time aligned pattern onto a servo track.

Next, the HDD 1 moves the read element 161 in the OD direction to the vicinity of the center of the pattern (25) written earlier. To put it concretely, the read element 161 is positioned in the vicinity of the radial-direction center of the pattern (25). The center of the pattern (25) is determined on the basis of the amplitude of the sync field. At this radial-direction position, a time period T_meas1 is measured. The time period T_meas1 is a period of time between detection of the sync mark of a time aligned pattern (k)_0 shown as a time aligned pattern [0] in the figure and detection of the sync mark of the pattern (25) created at an adjacent location separated away in the circumferential direction from the time aligned pattern (k)_0. Then, a time period T_meas2 is measured. The time period T_meas2 is a period of time between a timing to detect the sync mark of the pattern (25) and a timing to detect the sync mark of a time aligned pattern (k)_1 shown as a time aligned pattern [1] in the figure at an adjacent location separated away from the pattern (25) in the circumferential direction.

That is to say, for a pattern (25) created between a time aligned pattern (k)_0 and a time aligned pattern (k)_1, a period of time between the time aligned pattern (k)_0 and the pattern (25) as well as a period of time between the pattern (25) and the time aligned pattern (k)_1 are measured. Since the pattern (25) is written into a position separated away from the middle between the time aligned pattern (k)_0 and the time aligned pattern (k)_1 by a distance corresponding to the head read/write separation time in the circumferential direction, the head read/write separation time may expressed by the following equation:

$$\text{Head read/write separation time} = (T\_meas1 - T\_meas2)/2$$

where, as described earlier, notation T_meas1 denotes the period of time between the time aligned pattern (k)_0 and the pattern (25) whereas notation T_meas2 denotes the period of time between the pattern (25) and the time aligned pattern (k)_1.

In this method, a delay time of an electric circuit until write operation is carried after sync mark is detected is included as a time to be measured. In the following expression, read/write separation time includes this delay time of an electric circuit.

Processing to Write Product Servo Patterns

As initial sequences of the In-Drive SSW (TSSW) process, a sequence of writing product servo patterns onto the magnetic disk 13 and sequences associated with and/or related to the sequence of writing product servo patterns are explained below. In the sequence S30 of the In-Drive SSW (TSSW) process (see FIG. 1), product servo patterns are written onto a plurality of tracks with time aligned patterns taken as a reference. Then, in the following sequence S40, other product servo patterns are written onto the outer-circumferential side of the magnetic disk 13 with the previously written product servo patterns used as a reference. The following description separately explains the sequence of writing product servo patterns onto a plurality of tracks with time aligned patterns taken as a reference and the sequence of writing other product servo patterns onto the outer-circumferential side of the magnetic disk 13 with the previously written product servo patterns used as a reference.

(1) Sequence S30 of Writing Product Servo Patterns with Time Aligned Patterns Taken as a Reference The following description explains a method of writing product servo patterns at half time intervals of final servo patterns of the product on the basis of time aligned patterns written on tracks at the same time intervals as those of the final servo patterns. Thus, as many product servo patterns as twice the number of eventually required final product servo patterns are written onto the magnetic disk 13 as will be described later.

This sequence, which is an initial sequence of the In-Drive SSW (TSSW) process, is executed by operating all operations of the sequence with the actuator 14 pressed against the inner crush stop 18. The position of the head 16 is adjusted in the radial direction by putting a force generated by a constant current flowing through the VCM 17 to push the actuator 14 against the inner crush stop 18 in a state of equilibrium with a repulsive force generated by elasticity of the inner crush stop 18. That is to say, control to adjust the position of the head 16 in the radial direction is open-loop control. The radial-direction position of the read element 161 is detected on the basis of the amplitude of a second burst of the time aligned pattern. That is to say, the head 16 is moved to a desired position by finely changing the VCM current while a force generated by a constant current flowing through the VCM 17 to push the actuator 14 against the inner crush stop 18 is being put in a state of equilibrium with a repulsive force generated by elasticity of the inner crush stop 18.

Figure 17:
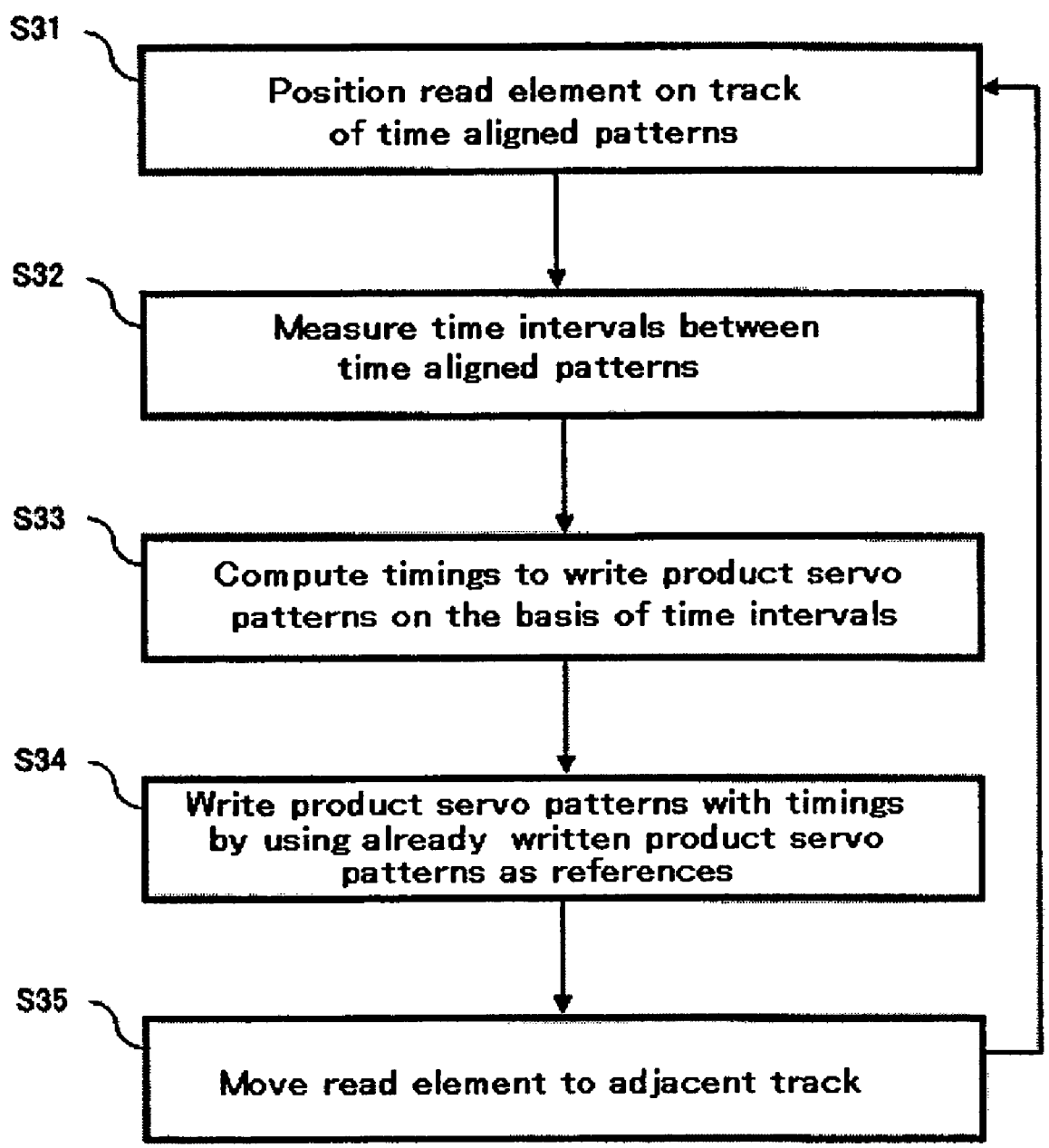
FIG. 17 shows an explanatory flowchart referred to in describing processes provided by the embodiment as processing to write product servo patterns onto a magnetic disk on the basis of time aligned patterns.

As shown in FIG. 17, this sequence begins with a sequence S31 in which the read element 161 is positioned at the center of a track onto which time aligned patterns have been written. Then, in the next sequence S32, the time interval of the time aligned patterns is measured. Subsequently, in the next sequence S33, timings to write product servo patterns onto a track are computed on the basis of the measured time interval. Then, in the next sequence S34, product servo patterns are written onto the track with the computed timings. As the operation to write the product servo patterns onto the track is completed, the read element 161 is moved to an adjacent track on the outer-circumferential side in the next sequence S35. Then, the processing described above is carried out to write product servo patterns onto the adjacent track.

The above processing is further explained in the following paragraphs (i) to (v).

Figure 18:
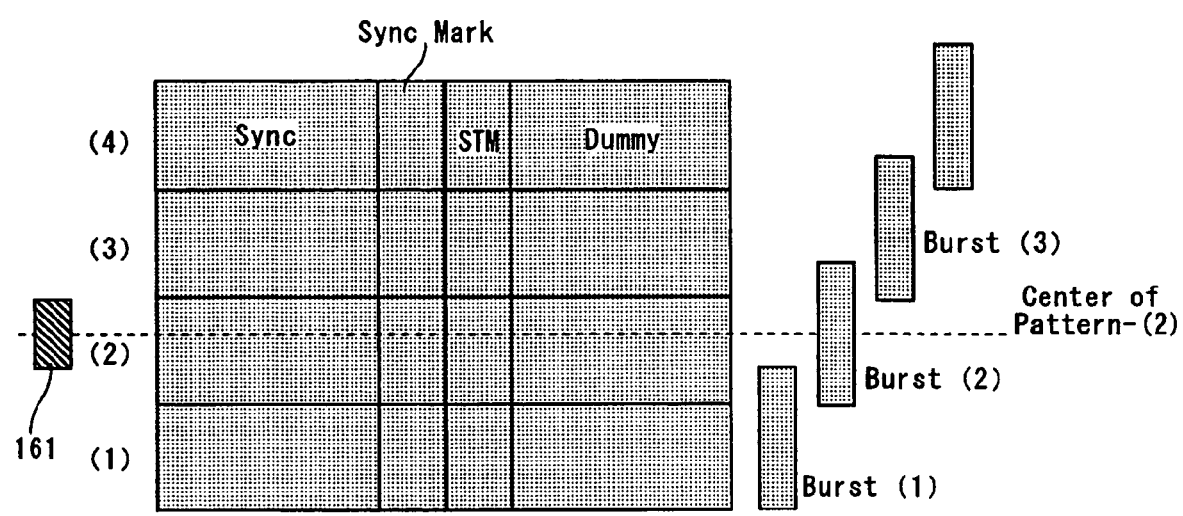
FIG. 18 is a diagram showing a relation between positions of time aligned patterns provided by the embodiment and the position of a read element.

(i) Detection of the radial-direction position of the read element 161 on the basis of second bursts (ii) Measurement of pattern time intervals of the time aligned patterns on the basis of sync marks (iii) Method of computing timings to write product servo patterns from the pattern time intervals (iv) Technique for writing product servo patterns (v) Format of the product servo pattern (i) Detection of the Radial-direction Position of the Read Element 161 on the Basis of Second Bursts First of all, the read element 161 is moved to a time aligned pattern (2). Since the radial-direction position of the read element 161 is detected on the basis of second bursts on two tracks sandwiching a middle track, a product servo pattern is written at locations not starting from a position corresponding to the time aligned pattern (1), but from a position, at which the write element 162 is located when the read element 161 arrives at the radial-direction center point of the time aligned pattern (2). That is to say, the position of the write element 162 at that time is separated away from that of the read element 161 in the radial direction toward the OD side. FIG. 18 shows the position of the read element 161 at that time.

In a method to move the read element 161 to the center of the time aligned pattern (2), the VCM current is once returned to a value for writing the time aligned pattern (1) and, while the VCM current is being reduced from the value a little bit at a time, the amplitudes of the second bursts of the time aligned patterns are observed. The VCM current is sustained at a magnitude for which the observed amplitude B1 of the second burst (1) of the time aligned pattern (1) becomes equal to the observed amplitude B3 of the second burst (3) of the time aligned pattern (3).

Figure 19:
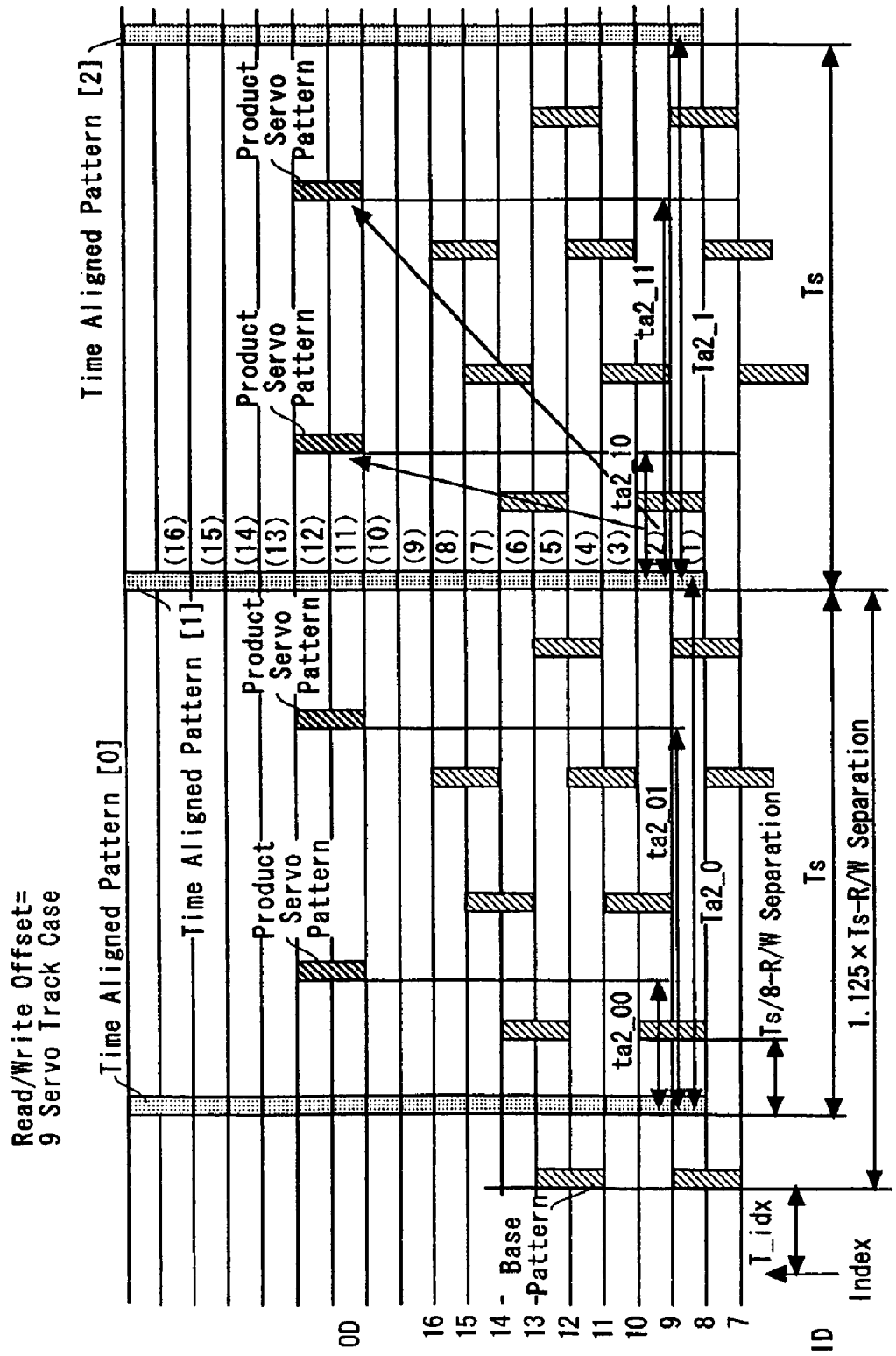
FIG. 19 is an explanatory diagram referred to in describing processes provided by the embodiment as processing to write product servo patterns onto a magnetic disk on the basis of time aligned patterns.

(ii) Measurement of Pattern Time Intervals of the Time Aligned Patterns on the Basis of Sync Marks At the next step, with the read element 161 positioned at the center point of the time aligned pattern (2), the time interval between time aligned patterns (2) is measured. FIG. 19 is a diagram showing an outline of the measurement. Referred to as time intervals $Ta2\_0$, $Ta2\_1$, $Ta2\_2$ - - - and $Ta2\_n-1$, the measured time intervals are each a time interval between adjacent time aligned patterns. To be more specific, the time interval $Ta2\_0$ is a time interval between sync marks of the first time aligned pattern immediately following the index signal and the second time aligned pattern immediately succeeding the first time aligned pattern, the time interval $Ta2\_1$ is a time interval between sync marks of the second time aligned pattern and the third time aligned pattern immediately succeeding second time aligned pattern and so on. The suffix of 2 appended to symbol Ta2 indicates that the time aligned pattern is the time aligned pattern (2) and the suffix of m appended to the suffix of 2 indicates a sector number where m is 0, 1, 2 - - - and n−1. The time intervals of the time aligned patterns are measured for each particular time aligned pattern prior to a process for writing a product pattern for the particular time aligned pattern.

(iii) Method of Computing Timings to Write Product Servo Patterns from the Pattern Time Intervals Next, timings to write product servo patterns onto the magnetic disk 13 are computed from the measured pattern time intervals. For each time aligned pattern, two product servo patterns are written onto the magnetic disk 13 on the basis of the time aligned pattern. Thus, two timings to write product servo patterns need to be computed. With the first time aligned pattern used as a reference, timings to write product servo patterns into a sector are expressed a follows:

$$ta2\_00 = 1/4 \times Ta2\_0 - Tsd$$

$$ta2\_01 = 3/4 \times Ta2\_0 - Tsd$$

where notation Tsd denotes a theoretical time period between the start of the sync field of a time aligned pattern and the end of the sync mark of the time aligned pattern. It is to be noted that the time period Tsd may be set at a fixed value such as 0. In this case, the circumferential-direction position of the time aligned pattern is shifted a little bit in a direction toward the preceding time aligned pattern.

By the same token, two timings to write product servo patterns into the next sector are expressed a follows:

$$ta2\_10 = 1/4 \times Ta2\_1 - Tsd$$

$$ta2\_11 = 3/4 \times Ta2\_1 - Tsd$$

Thereafter, in the same way, timings to write product servo patterns onto a sector are computed on the basis of time intervals measured for the sector as time intervals between time aligned patterns.

(iv) Technique for Writing Product Servo Patterns

Then, product servo patterns are written into a sector with the computed timings by using a time aligned pattern as a reference. FIG. 19 is a diagram showing product servo patterns written on sectors by using the time aligned patterns (2) written in the above sequence on the sectors as references. FIG. 19 shows a typical case in which the read/write offset is equal to 9 servo tracks. The sequence described above is executed also for states in which the read element 161 is positioned at the centers of the time aligned patterns (3) to (15). Since the radial-direction position of the read element 161 is detected on the basis of second bursts of two tracks sandwiching a middle track, the sequence described above is not executed in a state in which the read element 161 is positioned at the center of the time aligned pattern (16).

A method to move the read element 161 from the center of the time aligned pattern (2) to the center of the time aligned pattern (3) is executed by observation of the amplitudes of the second bursts while reducing the VCM current a little bit at a time in the same way as the method to move the read element 161 from the center of the time aligned pattern (1) to the center of the time aligned pattern (2). The VCM current is sustained at a magnitude for which the observed amplitude B2 of the second bursts of the time aligned pattern (2) becomes equal to the observed amplitude B4 of the second bursts of the time aligned pattern (4). Thereafter, the read element 161 is positioned at the center of the next time aligned pattern (m) by comparing the observed amplitude of the second bursts of the time aligned pattern (m−1) with the observed amplitude of the second bursts of the time aligned pattern (m+1).

Figure 20:
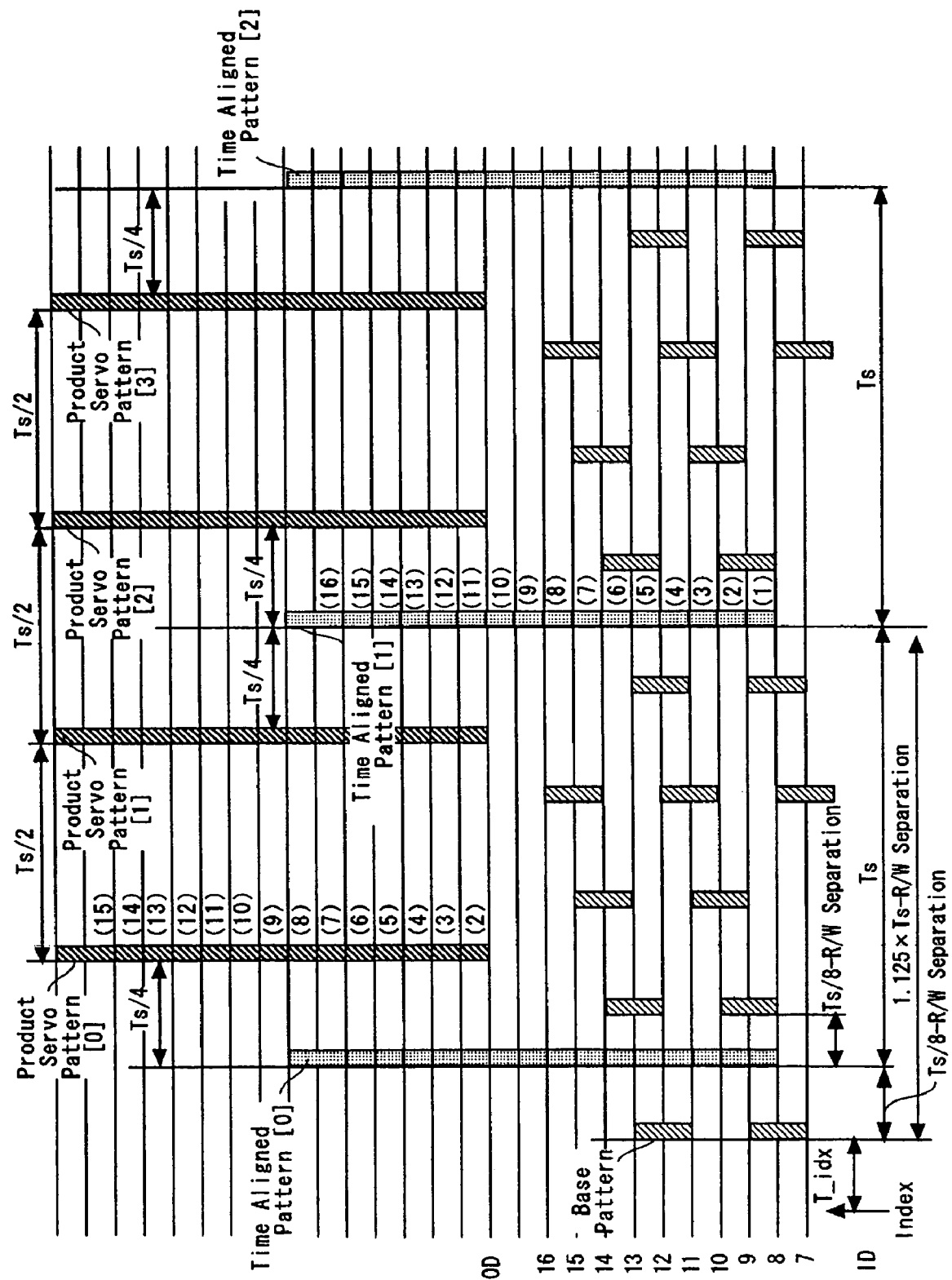
FIG. 20 is a diagram showing a state in which product servo patterns provided by the embodiment are recorded on a magnetic disk.

FIG. 20 is a diagram showing the results produced by the sequence described above. To be more specific, FIG. 20 shows product servo patterns written onto tracks on the basis of time aligned patterns. By adoption of this method, an array of product servo patterns is separated away from an adjacent array of product servo patterns in the circumferential direction by a time interval of Ts/2. That is to say, an array of product servo patterns is separated away from an adjacent array of product servo patterns in the circumferential direction by a time interval equal to half the time interval of arrays each consisting of actually required product servo patterns. As a result, as many product servo patterns as twice the number of required final product servo patterns are written onto every track. That is to say, 2*Ns (2*n) product servo patterns are written onto each track. As described above, in this embodiment, as many product servo patterns as twice the number of naturally required sectors are written onto every track. Of course, as many necessary product servo patterns as sectors, as many necessary product servo patterns as four times the number of sectors or even as many necessary product servo patterns as any even integral multiple of the number of sectors may be theoretically written onto every tracks as an implementation included in the scope of the present invention. A pattern count equal to twice the number of naturally required sectors is an empirically optimal value in an application to the actual product.

In addition, in this case, product servo patterns are written on 14 servo tracks. It is to be noted that, since the bursts of product servo patterns (15)_k on the servo track on the outermost OD side are not trimmed, the amplitudes of the bursts are greater than those of bursts on the other servo tracks. The number of servo tracks is related to the read/write offset. To put it concretely, it is necessary to set the number of product servo pattern tracks at such a value that the number of tracks for product servo patterns and the read/write offset always satisfy the following relation.

(Servo-track pitch)*(The number of tracks for product servo patterns)>Read/write offset In the case of the present invention, the number of tracks each serving as a write target in every sequence executed so far is expressed by equations as follows:

The number of tracks for product servo patterns=The number of tracks for time aligned patterns−2.

The number of tracks for time aligned patterns=The number of tracks for base patterns.

The number of tracks for base patterns=The number of tracks for pre-servo patterns.

Figure 21:
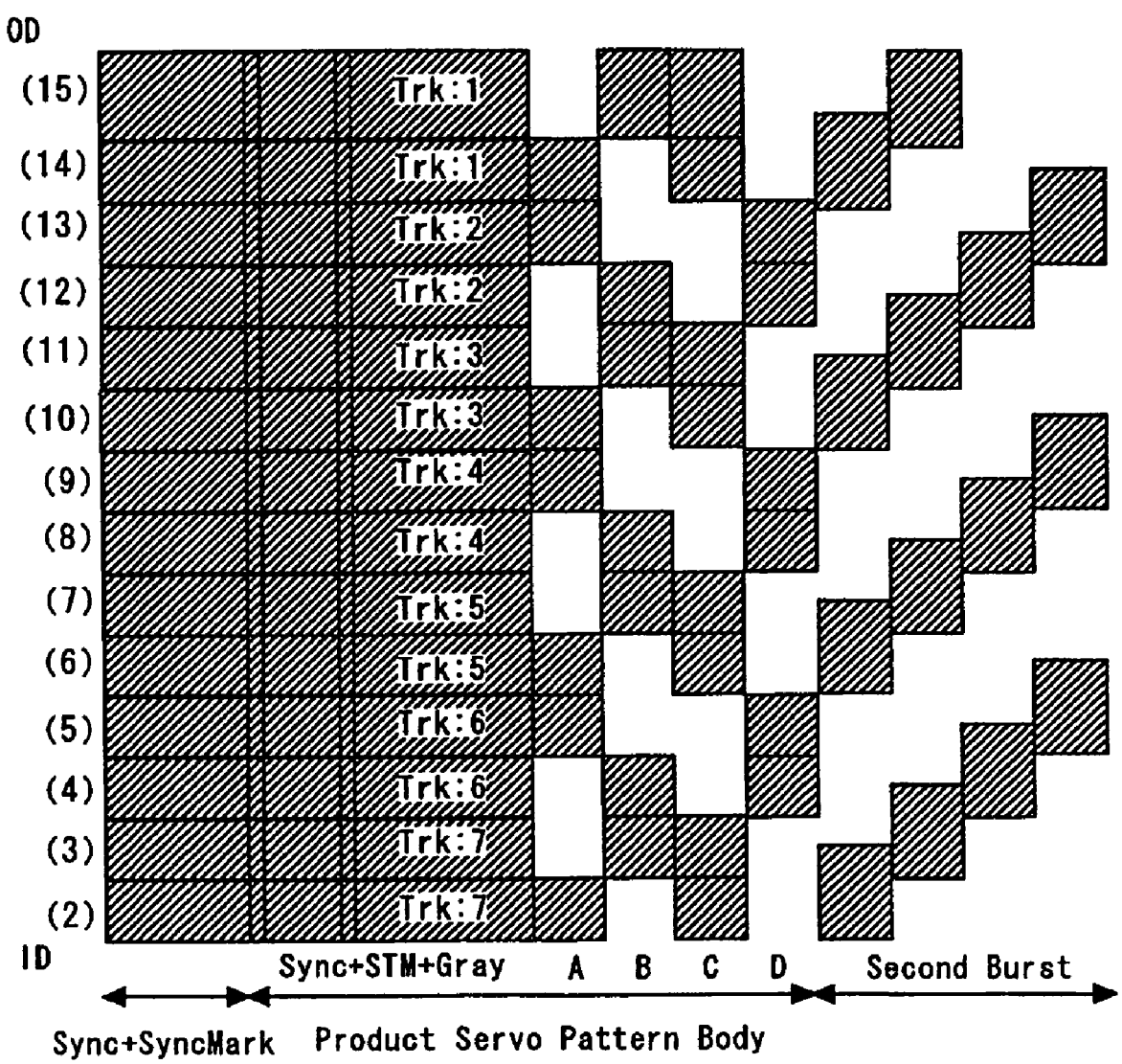
FIG. 21 is a diagram showing the data format of the product servo pattern provided by the embodiment.

Thus, in the case of a head having a large read/write offset, it is necessary to increase the number of tracks for pre-servo patterns written in an initial sequence of the In-Drive SSW (TSSW) process onto the magnetic disk 13. For more information, refer to FIG. 4. With the contemporary ordinary head, the following equation is well satisfied for 14 servo tracks:

(Servo-track pitch)*(The number of tracks for product servo patterns)>Read/write offset (v) Format of the Product Servo Pattern Next, the format of the product servo pattern written on the magnetic disk 13 in a sequence of the present invention is explained. FIG. 21 is a diagram showing the format. As shown in the figure, the product servo pattern comprises three portions described as follows.

1. Sync field+sync mark: This portion is used in measurement of time intervals between product servo patterns.

2. Sync field+STM+Gray (Cylinder ID)+Burst_A+Burst_B+Burst_C+Burst_D: This portion is the original main body of the product servo pattern. Only this portion is used when the magnetic disk is actually used as a product. In the typical format shown in FIG. 21, track numbers Trk: 1 to Trk: 7 are each an assumed number. That is to say, in this embodiment, in addition to the main body of the product servo pattern used in accesses to user data, portions each including additional parameters required for writing servo patterns onto the magnetic disk 13 is also called a product servo pattern. In the following description, by the product servo pattern, such parameters are implied.

3. Second burst: This portion is used for detecting a radial-direction displacement of the head in the In-Drive SSW (TSSW) process. The position of a second burst on any specific servo track is shifted from the position of a second burst on a servo track on the OD side adjacent to the specific servo track in the circumferential direction so that the second burst on the specific servo track does not overlap the second burst on the adjacent servo track.

It is to be noted that the sync field and the sync mark are included in the product servo pattern as a portion to allow the function of a read/write channel of the embodiment to be used. If another channel is used, the sync field and the sync mark do not have to be included in the product servo pattern.

Figure 22:
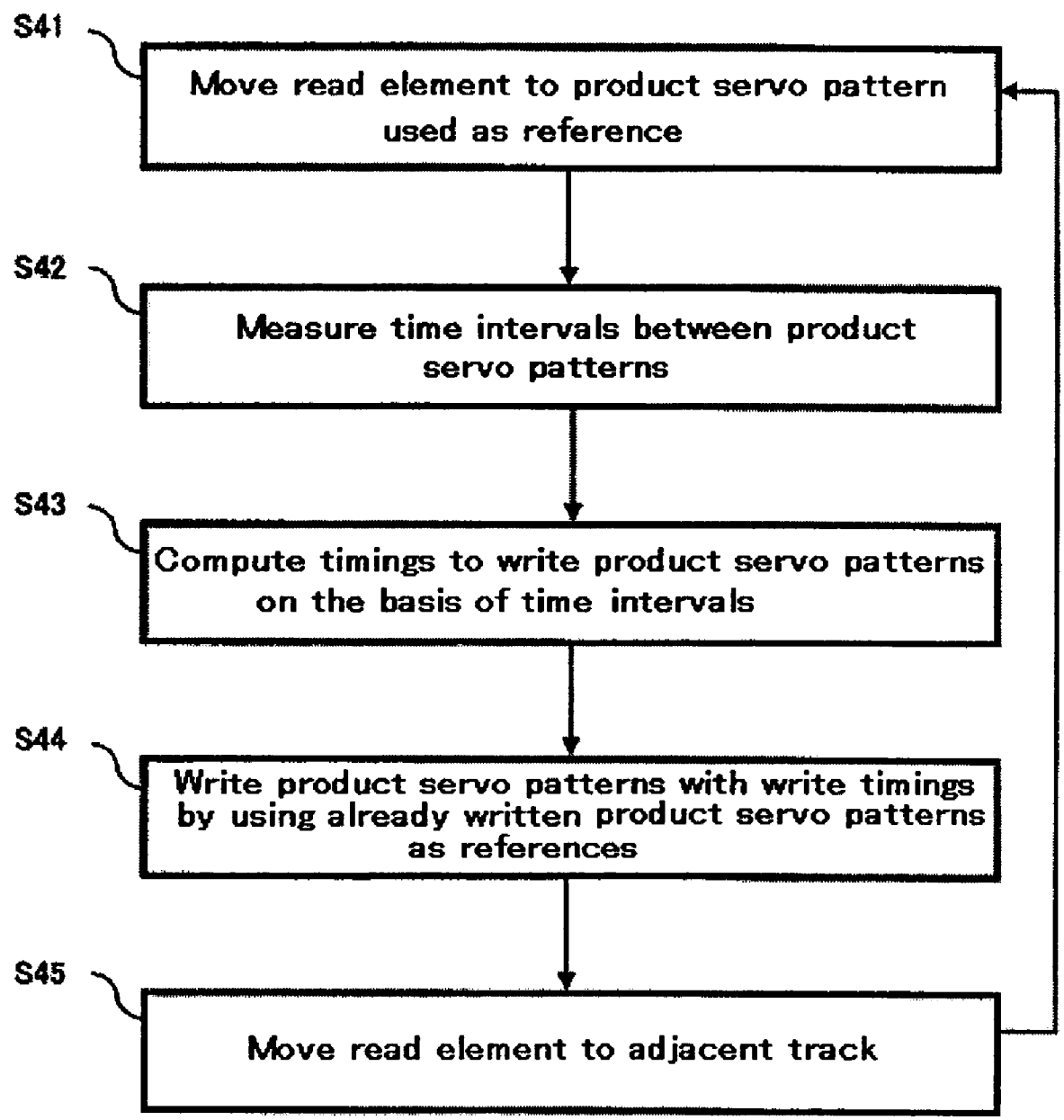
FIG. 22 shows an explanatory flowchart referred to in describing processes provided by the embodiment as processing to write product servo patterns onto a magnetic disk on the basis of already written product servo patterns.

(2) Sequence S40 of Writing Product Servo Patterns onto the Disk on the Basis of Product Servo Patterns The following description explains a method whereby, after all of as many writable product servo patterns as possible have written onto the magnetic disk 13 on the basis of time aligned patterns, this time, product servo patterns are further written into an extended area on the OD side on the basis of the written product servo patterns. As shown in FIG. 22, this sequence begins with a sequence S41 to move the read element 161 to a product servo pattern, which is used as a reference. Then, in the next sequence S42, time intervals between product servo patterns are measured. Subsequently, in the next step S43, timings to write product servo patterns onto tracks on the OD side are computed from the measured time intervals in the same rotation.

Then, in the next sequence S44, product servo patterns are written onto the tracks on the OD side with the computed write timings by using the already written product servo patterns as references. The product servo patterns are written onto the tracks in units each consisting of half the number of product servo patterns to be written onto a track. That is to say, the processing to write product servo patterns onto a track is completed in two rotations of the magnetic disk 13. As the processing to write product servo patterns onto a track is completed, the write element 162 is moved to an adjacent track on the OD side in a step S45 and the above processing is repeated.

Figure 23:
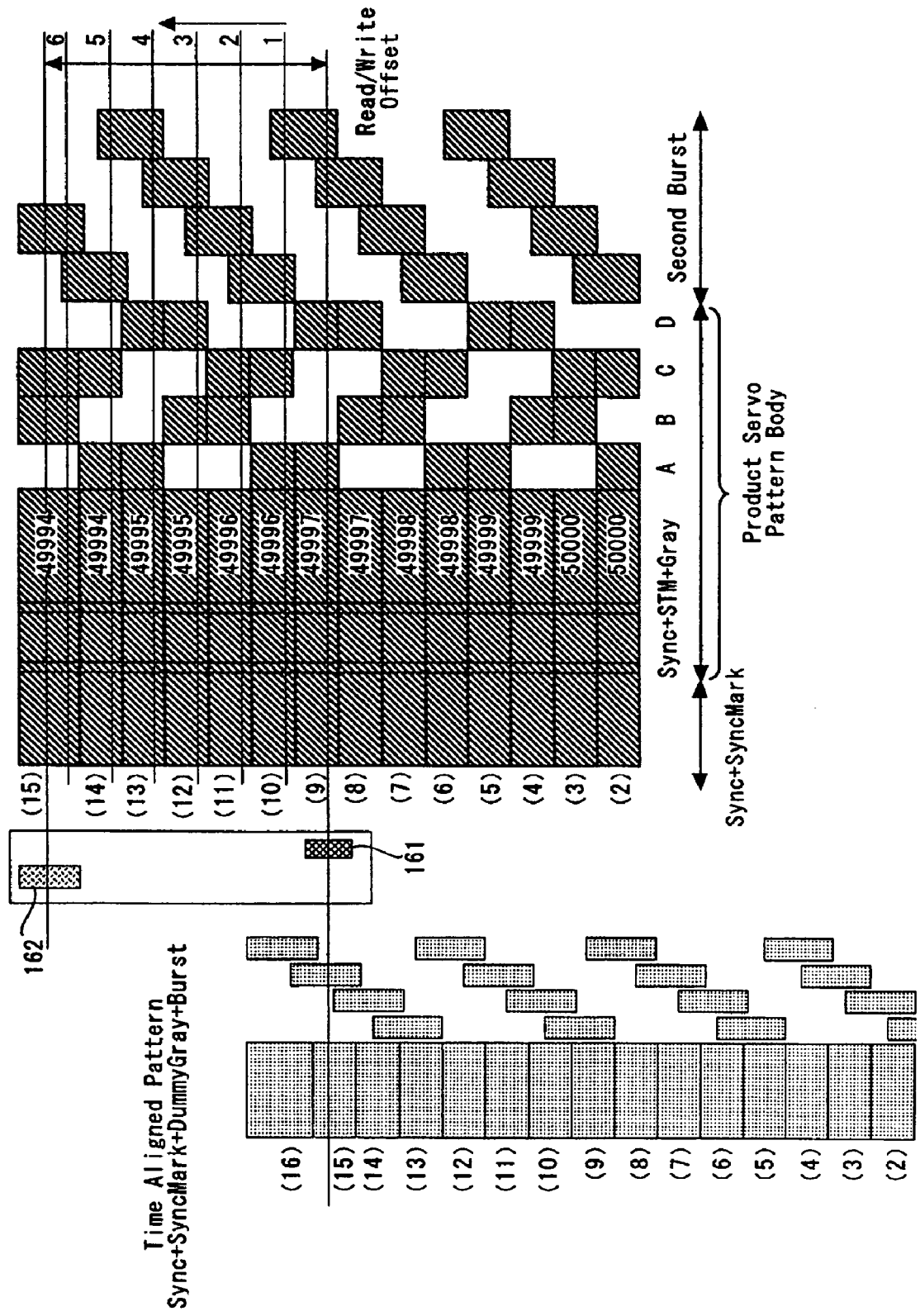
FIG. 23 is a diagram showing a relation between positions of time aligned patterns, the position of the read element, the position of a write element, and positions of product servo patterns.

The following description explains the following three paragraphs arranged in accordance with the above sequence:

(i) Detecting the radial-direction position of the read element 161 on the basis of bursts (ii) Measuring pattern intervals on the basis of sync marks of product servo patterns and method of computing write timings of product servo patterns from the pattern intervals (iii) Write method As described above, in this sequence, other product servo patterns are further written into an extended area on the OD side on the basis of the product servo patterns already written on 14 tracks on the basis of time aligned patterns. FIG. 23 is a diagram showing relations obtained right after processing to write product servo patterns onto the 14 tracks on the basis of time aligned patterns is completed as relations between radial-direction positions of the time aligned patterns, the product servo patterns and the head. From the state shown in the figure, processing to write product servo patterns into an extended area on the OD side on the basis of the already written product servo patterns themselves is started. It is to be noted that FIG. 23 shows a typical case in which the read/write offset is set at 6.4 servo tracks.

(i) Detecting the Radial-direction Position of the Read Element 161 on the Basis of Bursts First of all, the track number of a product servo pattern and a PES (Position Error Signal) are demodulated. The demodulation of the PES is a process to measure amplitudes of bursts and, from an amplitude ratio, the shift of the read element 161 from the center of the track is computed. The PES has a value proportional to the distance from the center of the track in the vicinity of the track center. Since a method of computing the value of the PES is commonly known, the method is not described here. In the demodulation of the PES, bursts A, B, C and D of the product servo pattern are used to compute a value of the PES whereas four second bursts following the bursts A, B, C and D are used to find another value of the PES. In the typical case shown in FIG. 23, the following typical values are used. Track=49,997, PES based on product bursts=100 and second PES based on second bursts=−0.4. It is to be noted that these numbers are no more than typical values.

Next, the read element 161 is moved by a distance equal to 1 servo track in a direction toward the OD side. That is to say, the target location corresponds to track=49,996, PES based on product bursts=228 and second PES based on second bursts=−0.4. If product servo patterns are written at this location, the product servo patterns are written on a track adjacent to product servo patterns (15) on the OD side of TRK=1 separated away from product servo patterns (15) by 1 servo track. (The adjacent track is track 49,993, which is not shown in the figure). By the same token, as a position for writing next patterns, the position of the read element 161 is set at track=49,996, PES based on product bursts=100 and second PES based on second bursts=−0.4. Typical radial-direction positions of the read element 161 in an operation to write product servo patterns onto the magnetic disk 13 on the basis of already written product servo patterns are shown in FIG. 24.

The read element 161 is moved in the radial direction by reducing the VCM current a little bit at a time, measuring the amplitude of the burst, computing the value of the PES and sustaining the VCM current at a constant magnitude as a target PES is achieved. It is to be noted that, as the measured amplitude of bursts, an average value of amplitudes of bursts at all sectors is computed. In this way, product servo patterns may be spread in the radial direction toward the OD side of the magnetic disk 13. Target positions of the read element 161 for spreading product servo patterns may be computed on the basis of the product bursts or the second bursts.

An application of the second bursts is correction described below as correction of the interval between servo tracks. The interval between servo tracks may be corrected by computing pattern overlaps of the second bursts. In a process to write product servo patterns onto the magnetic disk 13, the read element 161 is periodically moved to the center of one of second bursts. Let notation b1 denote this second burst. The VCM current is adjusted a little bit at a time. The read element 161 may be moved to such a position that the amplitude of second bursts on an adjacent track on the ID side becomes equal to the amplitude of second bursts on an adjacent track on the OD side. At this position, the read element 161 is stopped and the VCM current is sustained at a fixed magnitude attained at that time. Let notations b0 and b2 denote the second bursts on the adjacent tracks on the ID and OD sides respectively. Then, a ratio of the sum of the amplitudes of the second bursts on the adjacent tracks to the amplitude of the second bursts on the center track is computed. As described above, in the amplitude computation, as the amplitude of bursts on a track, an average value of amplitudes of burst patterns at all sectors spread over the track in the circumferential direction is used. Let notations B0, B11 and B2 denote the (average) amplitudes of the second bursts b0, b1 and b2 respectively. In this case, the pattern overlap is expressed by the following equation:

$$\text{Pattern overlap} = (B0 + B2)/B1$$

The above method is adopted to compute the pattern overlap periodically. For example, the pattern overlap is computed for every several tracks. A computed pattern overlap greater than a target value of typically 0.9 indicates that the track pitch or the track width is smaller than a pitch target value. In this case, the target PES value is adjusted to increase the track width. Conversely, a computed pattern overlap smaller than the target value indicates that the track pitch is greater than the pitch target value. In this case, the target PES value is finely adjusted to decrease the track pitch.

In order to carry forward the process to write product servo patterns onto the magnetic disk 13 by adoption of the above method, the head is moved in the radial direction toward the OD side. Since all the processes described so far are carried out with the actuator 14 pressed against the inner crush stop 18, the VCM current is fixed for each of the locations of the head 16 in the processes. While the head 16 is being moved in the radial direction to spread the product servo patterns, however, the actuator 14 is separated away from the inner crush stop 18 at a certain point. From a point of time a little bit prior to the separation of the actuator 14 from the inner crush stop 18, control of the position of the head 16 moving in the radial direction is switched to a closed servo loop system. A method to implement a step-by-step transition from the open-loop system to the closed servo loop system and a method to detect a separation of the actuator 14 from the inner crush stop 18 are each an already known technology so that it is not necessary to explain them.

(ii) Measuring Pattern Intervals on the Basis of Sync Marks of Product Servo Patterns and Method of Computing Write Timings of Product Servo Patterns from the Pattern Intervals Next, timings to write product servo patterns onto the magnetic disk 13 are explained. After the read element 161 employed in the head 16 has been moved to a position to write product servo patterns onto a track, time intervals between sync marks of the product servo patterns are measured. The top row of the table shown in FIG. 24 includes the first position of the read element 161. The first position of the read element 161 is represented by a track of 49,996, a PES of 228 and a second PES of −0.4. At this position, time intervals between sync marks of product servo patterns are measured.

Figure 25:
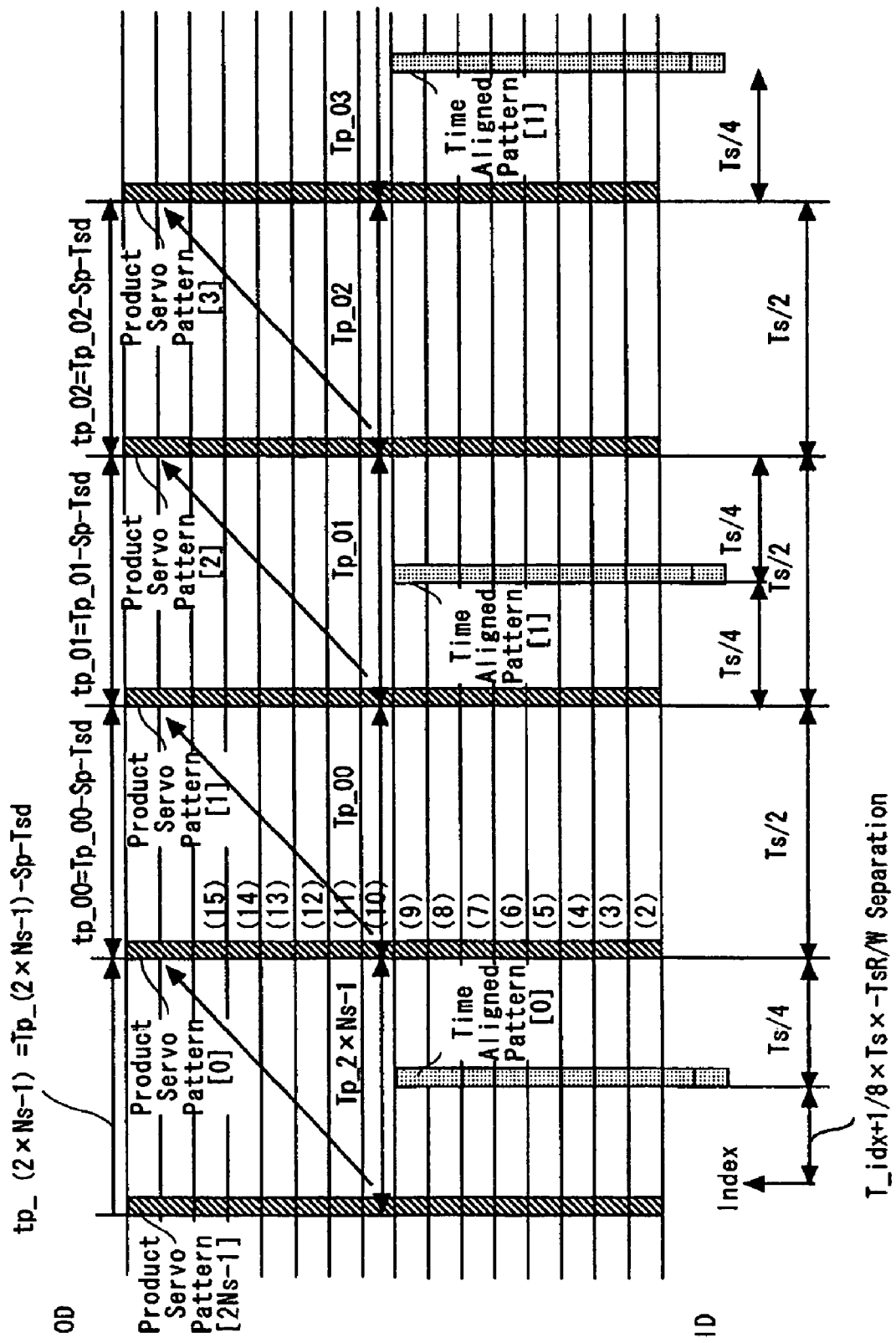
FIG. 25 is an explanatory diagram referred to in describing processes provided by the embodiment as processing to write product servo patterns onto a magnetic disk on the basis of already written product servo patterns.

Much like the method described before, time intervals between sync marks of product servo patterns are measured with the index signal taken as a reference. In this case, measurement results relative to the product servo pattern immediately following the index signal are Tp_00, Tp_01, Tp_02 and Tp_02Ns−1, where the suffixes of 00, 01, 02 and 02Ns−1 are each a sector number. The number of servo sectors indicated by the suffixes is twice the number of servo sectors per track in the product. Thus, the time interval of the product servo pattern is Ts/2. In FIG. 25, the product servo pattern immediately following the index signal is shown as a product servo pattern [0] whereas the time interval between the product servo pattern [0] and the product servo pattern [1] is defined as Tp_00.

On the basis of the measurement results Tp_00, Tp_01, Tp_02 and Tp_02Ns−1, timings tp_00, tp_01, tp_02 and tp_02Ns−1 to write product servo patterns onto a track are each computed by taking a product servo pattern in the immediately preceding sector on the track as a reference. FIG. 26 is a table summarizing the computed timings. As is obvious from the table, a timing is computed by correction of a measurement result with correction values consisting of the head read/write separation time Sp of the head 16 as well as a theoretical time period Tsd between the start of the sync field of the product servo pattern and the end of the sync mark of the product servo pattern. In a sequence to write a product servo pattern onto a track with an already written product servo pattern used as a reference, Tsd is not set at 0, instead, used in correction of a timing to write the product servo pattern onto the track. If Tsd is set at 0, a product servo pattern being written onto a track is shifted from a product servo pattern written before on a previous track on the ID side by a time period corresponding to the distance between the start of the sync field of the product servo pattern and the end of the sync mark of the product servo pattern. That is to say, the circumferential-direction timings of product servo patterns on a track do not coincide with those of product servo patterns on the adjacent track.

(iii) Write Method (for Writing Product Servo Patterns)

A product servo pattern is written onto a track with a computed timing tp_00, tp_01, tp_02 or tp_02Ns−1 relative to an immediately preceding product servo pattern written earlier on the same track. This write method is the same as the one described before. This method to write product servo patterns onto a track on the basis of previously written product servo patterns is different from the one described earlier as a method to write other patterns onto a track in that the product servo patterns are written onto a track in two rotations of the magnetic disk 13. That is to say, in the first rotation, even-numbered product servo patterns are each written onto the track with previously written odd-numbered product servo patterns [1], [3], [5], [7], and so on each used as a reference. In the second rotation, on the other hand, odd-numbered product servo patterns are each written onto the track with previously written even-numbered product servo patterns [0], [2], [4], [6], and so on each used as a reference. It is to be noted that the odd-numbered product servo patterns and the even-numbered product servo patterns may also be written conversely onto the track in the first and second rotations respectively. The two rotations are required because, normally, a head is not capable of reading data from the magnetic disk while the head is carrying out a process to write the data onto the disk. For example, the read element 161 is not capable of reading out a previously written product servo pattern [1] while the write element 162 is writing a new pattern [1] with the pattern [0] right behind the index signal taken as a reference.

The number of product servo patterns written on the magnetic disk 13 on the basis of the results described above is twice the number of actually required product servo patterns. Thus, as a product, only half the number of product servo patterns written on the magnetic disk 13 on the basis of the results is used. For example, only the odd-numbered or even-numbered product servo patterns are used. It is needless to say that only as many product servo patterns as time aligned patterns may also be written on the magnetic disk 13 on the basis of the time aligned patterns. In this case, it is necessary to write some product servo patterns into only even-numbered sectors in a rotation and the remaining product servo patterns into only odd-numbered sectors in another rotation. Product servo patterns written into the magnetic disk 13 in two rotations may raise a problem of a large shift in the radial direction between product servo patterns written onto the magnetic disk 13 in the first rotation and those written onto the magnetic disk 13 in the second rotation. By adoption of the doubled-number method to write as many product servo patterns as twice the number of actually required props onto the magnetic disk 13, however, the actually required product servo patterns may be written onto the magnetic disk 13 only in one rotation so that the problem may be in effect solved.

Functions of the HDD Control Circuit and Measurement of Head Characteristics

As described above, the servo write process provided by the embodiment is carried out by using functions of the control circuit employed in the HDD 1. The following description explains functions implemented by the control circuit of the HDD 1 as functions used in processing to the write servo patterns described before onto the magnetic disk 13. In particular, new functions required for carrying out the In-Drive SSW (TSSW) process are mainly implemented by the HDC/MPU and an R/W channel. The new functions required for carrying out the In-Drive SSW (TSSW) process in the internal circuit is implemented in this way. The function of the servo writer working as an external apparatus may be eliminated. In addition, the function implemented in the HDD 1 is used to read out and write user data from and onto the magnetic disk 13. A configuration required for the read and write operations may be made simpler. First of all, an outline of the control circuit employed in the HDD 1 is explained.

Figure 27:
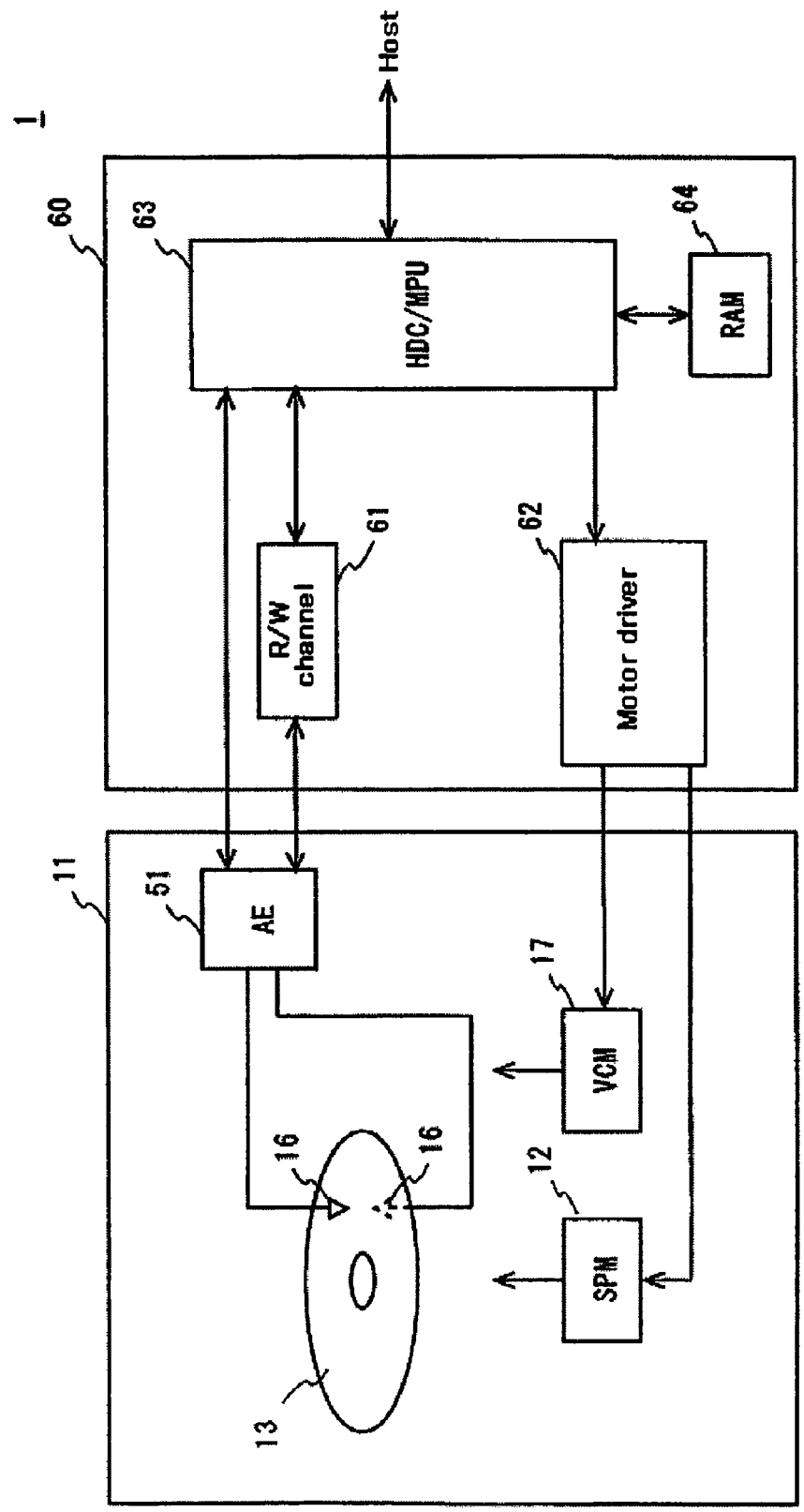
FIG. 27 is a block diagram showing a model of the entire circuit configuration of an HDD provided by the embodiment.

FIG. 27 is a block diagram showing the hardware (circuit) configuration of the HDD 1. The HDD 1 includes an arm electronic (AE) circuit 51 for amplifying and controlling a signal supplied to the head 16 and a signal originated from the head 16. The head 16 is accommodated in an enclosure. In addition, the HDD 1 also includes a circuit board (card) 60 fixed on the outer side of the enclosure. The HDD 1 also comprises a read/write channel (R/W channel) 61, a motor drive unit 62, a hard disk controller (HDC)/MPU integrated circuit 63, and a RAM 64, which are provided on the circuit board 60. In the following description, the hard disk controller/MPU integrated circuit 63 is abbreviated to an HDC/MPU 63. It is to be noted that the configuration shown in the figure is no more than a typical implementation of the HDD 1. For example, the configuration may be implemented as a single chip including all the components described above.

The HDC/MPU 63 receives data from an external host not shown in the figure as data to be written onto the magnetic disk 13 and supplies the data to the head 16 by way of the R/W channel 61 and the AE 51 to be written on the magnetic disk 13 by the head 16. On the other hand, data stored on the magnetic disk 13 is read out by the head 16 and supplied to the HDC/MPU 63 by way of the AE 51 and the R/W channel 61 to be output by the HDC/MPU 63 to the external host. In the typical configuration shown in the figure, the magnetic disk 13 has a recording surface for recording data on both sides. For each of the recording surfaces, a head 16 is provided.

The motor drive unit 62 supplies a driving current to the VCM 17 in accordance with a control signal. The motor drive unit 62 also drives the SPM 12 for rotating the magnetic disk 13 at a predetermined rotational speed. It is to be noted that the configuration may include more than one magnetic disk 13 and each magnetic disk 13 may have a recording surface on one side only or on both sides. It is also worth noting that, in general, the AE 51 has a function to drive all the heads 16 connected to the AE 51 to write data on the magnetic disks 13 at the same time. In an ordinary self servo write process, the same pattern is written onto all magnetic disks 13 at the same time by using a read signal from a selected head referred to as a propagation head. The same pattern onto all magnetic disks 13 is written at the same time. It is possible to shorten the time in order to carry out the self servo write process of a magnetic disk apparatus having a plurality of heads. For this reason, the AE 51 is provided with a function for supplying a signal received from the R/W channel 61 to all the heads 16 at the same time. This function is a special function never used in an ordinary operation but only used in the self servo write process.

The AE 51 selects a head 16 making a data access among the heads 16. The AE 51 then amplifies a reproduction signal reproduced by the selected head 16 at a fixed gain in a pre-amplification process and supplies the amplified signal to the R/W channel 61. In addition, the AE 51 supplies a recording signal received from the R/W channel 61 as a signal to be recorded onto the magnetic disk 13 and supplies the signal to a selected head 16. In a write process, the R/W channel 61 carries out code-modulation processing on write data received from the HDC/MPU 63 as data to be written onto the magnetic disk 13 to convert the data into a write signal (or a write current), which is then supplied to the AE 51. In a read process, on the other hand, the R/W channel 61 amplifies a read signal received from the AE 51, generating an amplified signal having a constant amplitude. The R/W channel 61 then extracts data from the amplified read signal and decodes the extracted data to generate reproduced data, which includes user data and servo data. The decoded read data is subsequently supplied to the HDC/MPU 63.

The HDC/MPU 63 is a circuit integrated in a single chip as a circuit comprising an MPU and an HDC. The MPU operates in accordance with micro code loaded into the RAM 64 to execute all control of the HDD 1 and carry out processes required in data processing. The control includes control to position the head 16, interface control, and defect control. When the HDD 1 is activated, the micro code for operating the MPU as well as data required in the control and the data processing are loaded onto the RAM 64 from the magnetic disk 13 or a ROM not shown in the figure.

As described above, data read out by the R/W channel 61 includes user data and servo data. The HDC/MPU 63 executes the control to position the head 16 by using the servo data. To put it concretely, the HDC/MPU 63 supplies a control signal, which is a digital signal, to the motor drive unit 62.

As is understood from the explanation of the processing to write product servo patterns onto the magnetic disk 13, functions required for carrying out the In-Drive SSW (TSSW) process include as follows.

(1) Open and close a read gate and a write gate by using a predetermined signal as a reference with timings determined with a high degree of freedom. The read gate is controlled by a read-gate signal for controlling the start and end of a read process whereas the write gate is controlled by a write-gate signal for controlling the start and end of a write process. In this embodiment, the predetermined signal is the index signal.

(2) Measure time intervals of patterns with a high degree of precision and a high degree of accuracy.

(3) Write a desired pattern onto the magnetic disk 13 after a time period determined in advance lapses since detection or an already written pattern with a high degree of accuracy and further write a plurality of different patterns onto the magnetic disk 13 at different time delays.

(4) Control the SPM 12 and the VCM 17.

Figure 28:
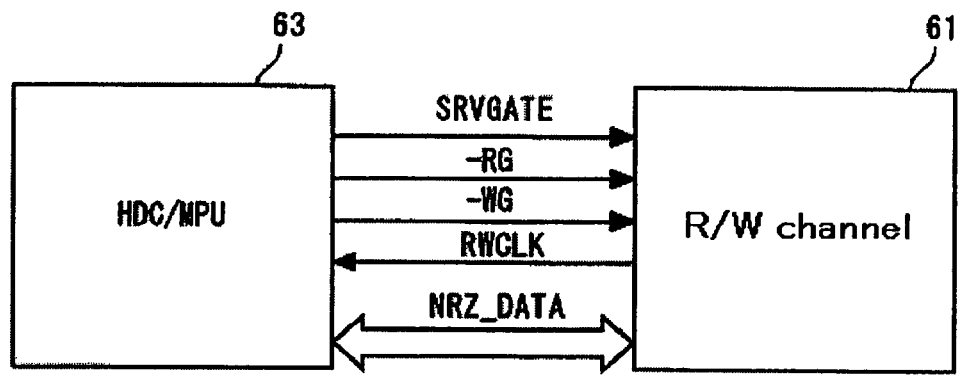
FIG. 28 is an explanatory diagram showing data communicated between an HDC/MPU and R/W channel provided by the embodiment.

In order to carry out the In-Drive SSW (TSSW) process, the HDC/MPU 63 and the R/W channel 61 are provided with predetermined functions. Signals exchanged between the HDC/MPU 63 and the R/W channel 61 are shown in FIG. 28. The HDC/MPU 63 supplies an SRVGATE signal serving as a servo pattern timing signal, a −RG signal serving as a read-operation start signal, and a −WG signal serving as a write-operation start signal to the R/W channel 61. On the other hand, the R/W channel 61 supplies a RWCLK signal synchronized to a read data byte to the HDC/MPU 63. NRZ_DATA, which is R/W data, is transmitted in both directions.

The HDC/MPU 63 carries out control operations in accordance with variables set in registers. The HDC/MPU 63 has the following functions. With a timing set as timing relative to the index signal, the write gate is opened by putting the write-gate signal in an active state for a predetermined period of time and a number of times periodically. In addition, with a timing set as a timing relative to the index signal, the write gate is opened by putting the write-gate signal in an active state and, separately, the read gate is opened by putting the read-gate signal in an active state for a predetermined period of time and a number of times periodically. Furthermore, with a timing set as timing relative to the index signal, the read gate is opened by putting the read-gate signal in an active state for a predetermined period of time and a number of times periodically. To cope with a long pattern, more bursts than the conventional bursts may be detected. Moreover, with a timing set as timing relative to the SRVGATE signal, the read gate and the write gate are opened.

The R/W channel 61 has the following functions. The R/W channel 61 measures time intervals between sync marks with a high degree of accuracy. The time intervals between sync marks are measured by using a system clock signal, that is, by counting the number of clock cycles of the system clock signal in each of the time intervals. The function of a phase mixer is used. The R/W channel 61 is capable of increasing the precision to a fraction of one-tenth. For example, the precision may be increased to 1/50. The R/W channel 61 is capable of writing a pattern onto the magnetic disk 13 with timing set as timing relative to a sync mark. The pattern-writing timing relative to detection of a sync mark may be set with a high degree of precision such as the precision described above.

In actuality, since the HDC/MPU 63 controls the write gate, in this case, the timing to write a pattern means a timing with which the R/W channel 61 outputs data to be written onto the magnetic disk 13 to the head 16. There may be a difference between the write gate and the timing to output data to be written onto the magnetic disk 13. In this case, a write gate leading ahead of the timing to output data to be written onto the magnetic disk 13 will result in a DC-erasure process. If a write gate lags behind the timing to output data to be written onto the magnetic disk 13, on the other hand, data between the timing and the operation to open the write gate will not be written onto the magnetic disk 13. The write gate is opened prior to the timing to output data to be written onto the magnetic disk 13. The pattern may be written onto the magnetic disk 13 with an accurate timing. For a detected sync mark, a plurality of data patterns independent of each other and a plurality of write timings also independent of each other may be specified.

Next, the functions of the HDC/MPU 63 are explained in detail. The HDC/MPU 63 has some modes described as follows.

(i) Indexed Write Mode

Figure 29:
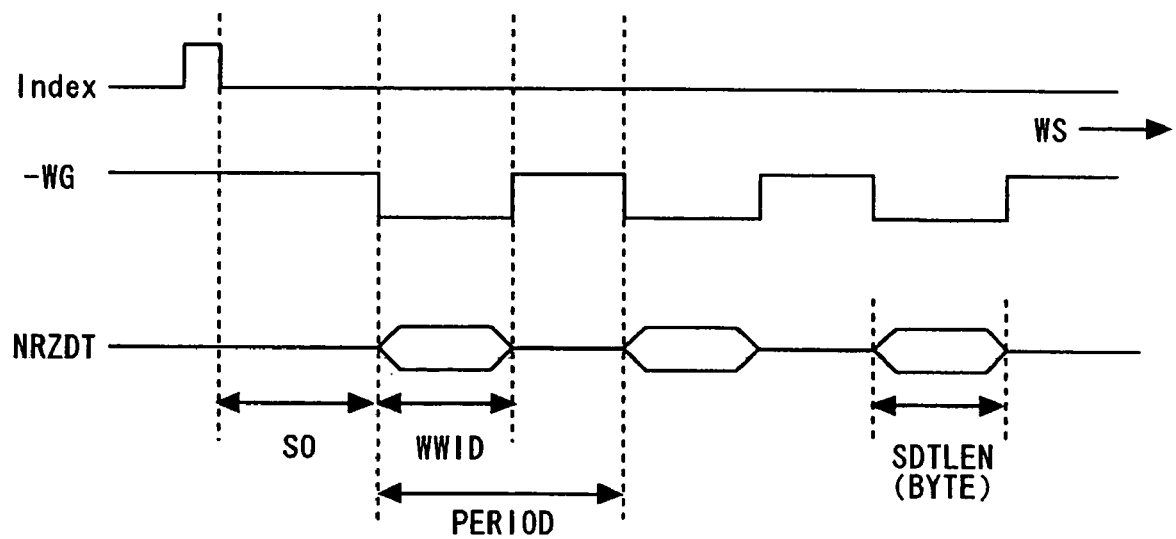
FIG. 29 shows timing charts of an indexed write mode provided by the embodiment.

FIG. 29 is a diagram showing timing charts of this indexed write mode. With the index signal taken as a reference, a gate −WG is opened after the lapse of a time period set as variable S0. A time duration in which −WG is open is determined by a variable WWID and the period to open and close −WG is determined by a variable PERIOD. These time variables S0, WWID, and PERIOD are each expressed in terms of the number of clock cycles in the system clock signal of the HDC/MPU 63. To put it concretely, the quantity of each of the time variables S0, WWID, and PERIOD is expressed as the product of the number of clock cycles and the clock period. As an alternative, the time variables S0, WWID, and PERIOD are each set with a clock signal RWCLK from the R/W channel 61 used as a reference. The number of times −WG is opened is set as a variable WS.

(ii) Indexed Phase Aligned Write Mode-1

Figure 30:
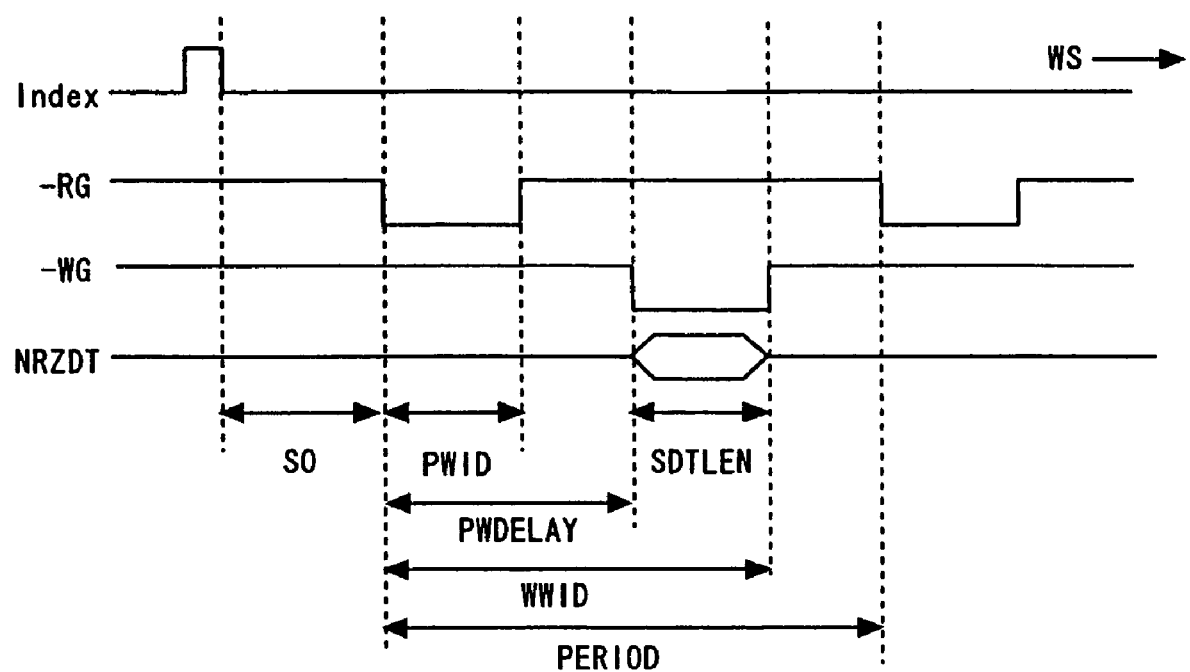
FIG. 30 shows timing charts of an indexed phased aligned mode-1 provided by the embodiment.
Figure 3:
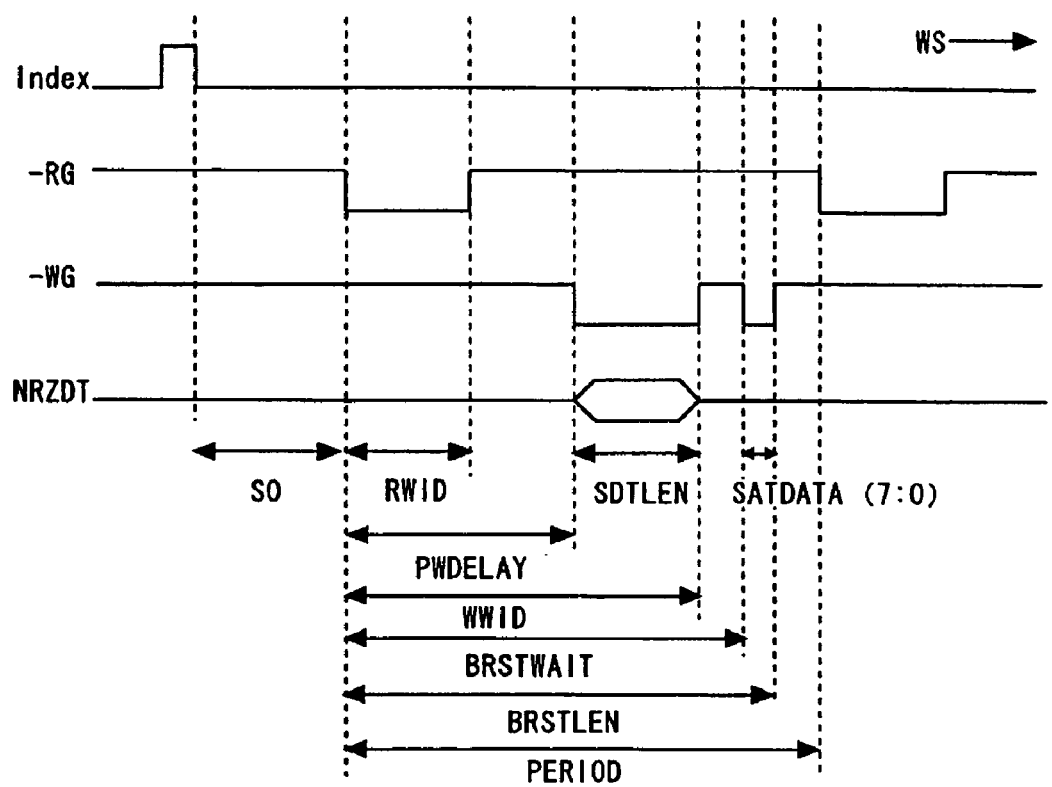
Figure 3:
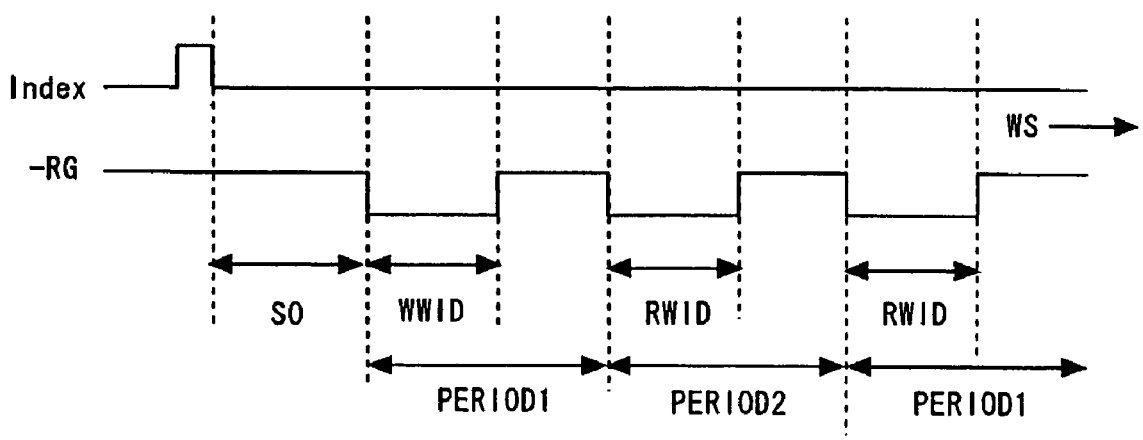

FIG. 30 is a diagram showing timing charts of this indexed phase aligned write mode-1. With the index signal taken as a reference, a gate −RG is opened after the lapse of a time period set as the variable S0 and a gate −WG is further opened after the lapse of a time period (S0+PWDELAY) where PWDELAY is a variable. −RG and −WG are both opened and closed repeatedly at the same period determined by the variable PERIOD. The number of times −RG and −WG are opened is set as the variable WS. A time duration in which −RG is open is determined by a variable RWID and a time duration in which −WG is open is determined by the difference (WWID−PWDELAY) between the variable WWID and the variable PWDELAY. The number of bytes to be written onto the magnetic disk 13 is set as a variable SDTLEN. These time variables are set with the system clock signal of the HDC/MPU 63 used as a reference. It is to be noted that the SRVGATE signal may be used as a reference in place of the index signal.

(iii) Indexed Phase Aligned Write Mode-2

FIG. 31 is a diagram showing timing charts of this indexed phase aligned write mode-2. A difference between this mode and the indexed phase aligned write mode-1 is the timings of −WG. In this indexed phase aligned write mode-2, −RG is opened once in 1 period but −WG may be opened twice with set timings.

(iv) Indexed Read Mode

FIG. 32 is a diagram showing timing charts of this indexed read mode. With the index signal taken as a reference, the gate −RG is opened after the lapse of a time period set as the variable S0. −RG repeats two types of period. These two types of period are set as variables PERIOD1 and PERIOD2 respectively. A time duration in which −RG is open is determined by the variable RWID and the number of times −RG is opened is set as the variable WS. The time variables are set with the system clock signal of the HDC/MPU 63 taken as a reference.

(v) Servo/propagation Control Mode

FIG. 33 is a diagram showing timing charts of this servo/propagation control mode. In this example, as shown in FIG. 33(*a*), a signal timing may be set during a time period starting on the rising edge of a SERVOAREA signal and ending at a point of time corresponding to a length of 1,024 clock cycles. In the case of the conventional burst sampling, the time period ends at a point of time corresponding to a length of 256 clock cycles. Thus, it is possible to cope with a pattern requiring a long In-Drive SSW (TSSW) process. Up to eight bursts may be sampled. Accordingly, in addition to the product bursts, the second bursts may also be sampled. As a second function, as shown in FIG. 33(*b*), a variation timing of a +SERVOGATE signal may be set after a time period indicated by the variable S0 stored in a register as a time period relative to the signal index signal taken as a reference. Furthermore, the period of the variation may be set by the variable PERIOD stored in another register. The +SERVOGATE signal is the same as the SERVOAREA signal.

Figure 34:
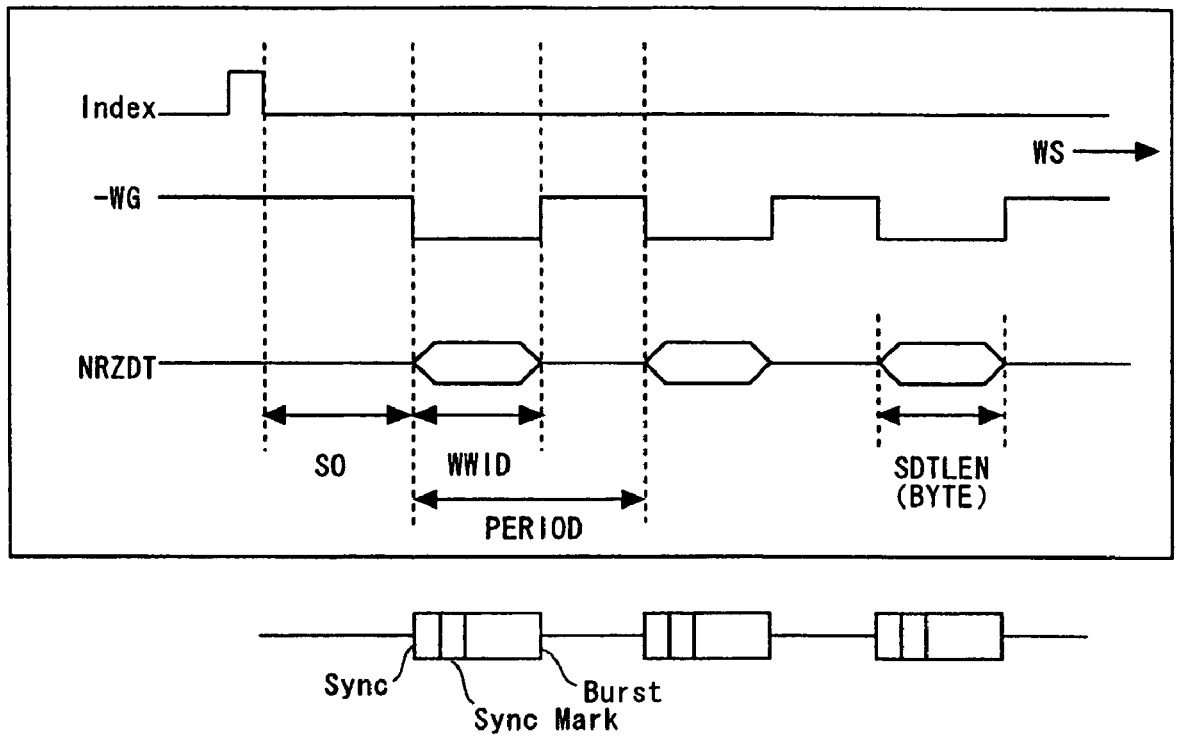
FIG. 34 shows timing charts of the indexed write mode adopted in processing to write base patterns onto a magnetic disk in the embodiment.

Next, some typical sequences of the In-Drive SSW (TSSW) process using the functions described above are explained. As described above, in an initial sequence, with the actuator 14 pushed against the inner crush stop 18, base patterns are written onto the magnetic disk 13. The base patterns are patterns used as a basis for writing time aligned patterns onto the magnetic disk 13. Base patterns written on any particular track are not synchronized with base patterns written on another track. As described earlier, as many base patterns as sectors on a track are written onto the track with the index signal taken as a reference. As shown in FIG. 34, the HDC/MPU 63 makes use of the indexed write mode described in above paragraph (i), controlling the R/W channel 61 to carry out a write operation taking the index signal as a reference. A write date is set in the sync field, the sync mark, and the bursts.

Figure 35:
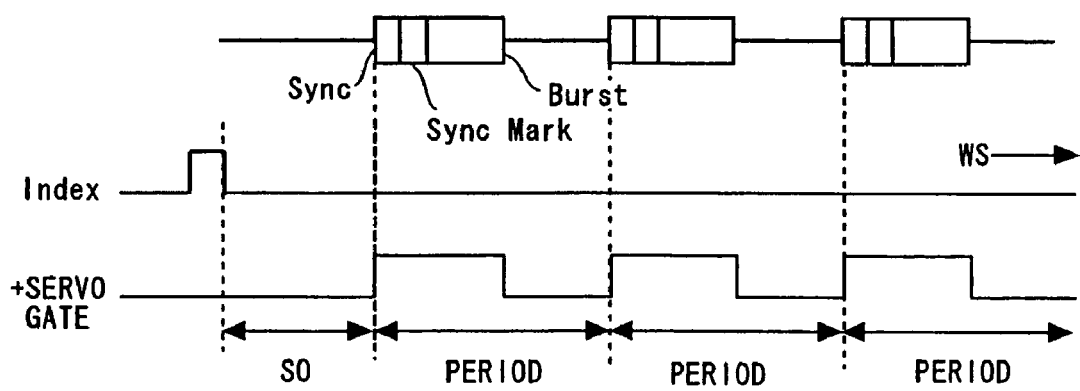
FIG. 35 shows timing charts of the servo/propagation control executed in measurement of radial-direction time intervals of base pattern in the embodiment.

It is necessary to measure amplitudes of bursts in order to recognize radial-direction distances between base patterns in the processing to write the base patterns onto the magnetic disk 13. In this case, as shown in FIG. 35, the HDC/MPU 63 makes use of the servo/propagation control mode described in above paragraph (v) to open SERVOGATE with timing relative to the index signal and measure amplitudes of bursts by execution of a servo control function of the HDC/MPU 63.

Figure 36:
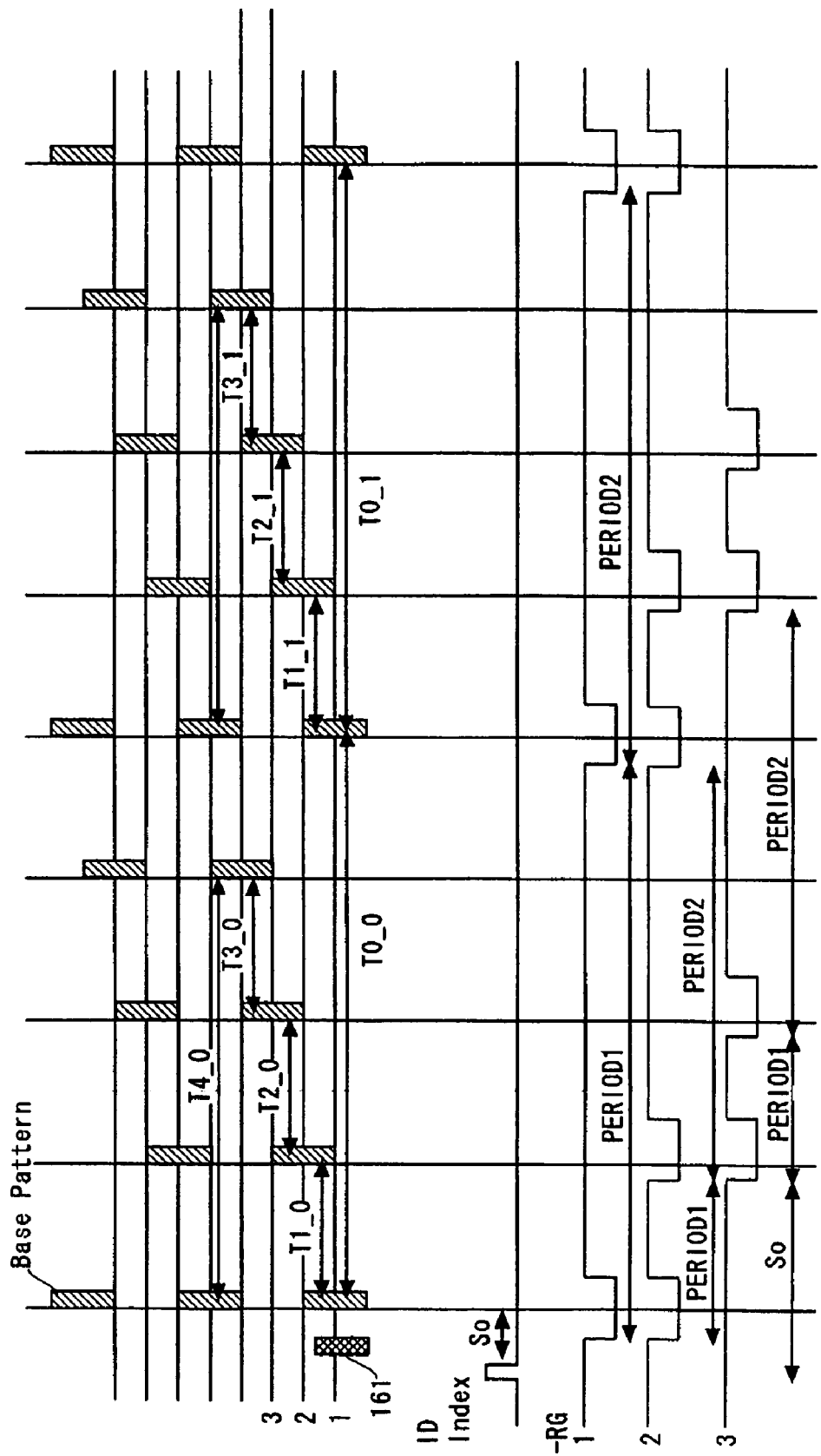
FIG. 36 shows timing charts of the indexed read mode adopted in measurement radial-direction time intervals of base pattern in the embodiment.

In order to write time aligned patterns onto the magnetic disk 13, it is necessary to measure time intervals between the base patterns. In this case, the HDC/MPU 63 makes use of the indexed read mode described in above paragraph (iv) to measure time intervals between the base patterns. In order to measure time intervals between the base patterns shown in FIG. 36, in the indexed read mode, the variables S0, PERIOD1, and PERIOD2 are changed in dependence on the position of the read element 161. For example, when the read element 161 is located on track 1, a time interval T0_0 between two sync marks is measured as shown in the figure.

At that time, −RG is opened by setting the low-active signal at a low level with a timing shown in the figure as timing for −RG1. When −RG is opened, the read/write channel 61 starts an operation to search for a sync mark and stores a sync-mark detection time in a register. Then, the operation is continued to search for the next sync mark and a time at which the next sync mark is detected is stored in another register. The HDC/MPU 63 computes the difference between the two detection times as a measured time interval T0_0. When the read element 161 is located on track 2, a time interval T1_0 between two sync marks is measured. In this case, a timing to open −RG is changed to a timing of −RG2 shown in the figure. Time intervals between sync marks for track 2 and other tracks may then be measured in the same way.

Figure 37:
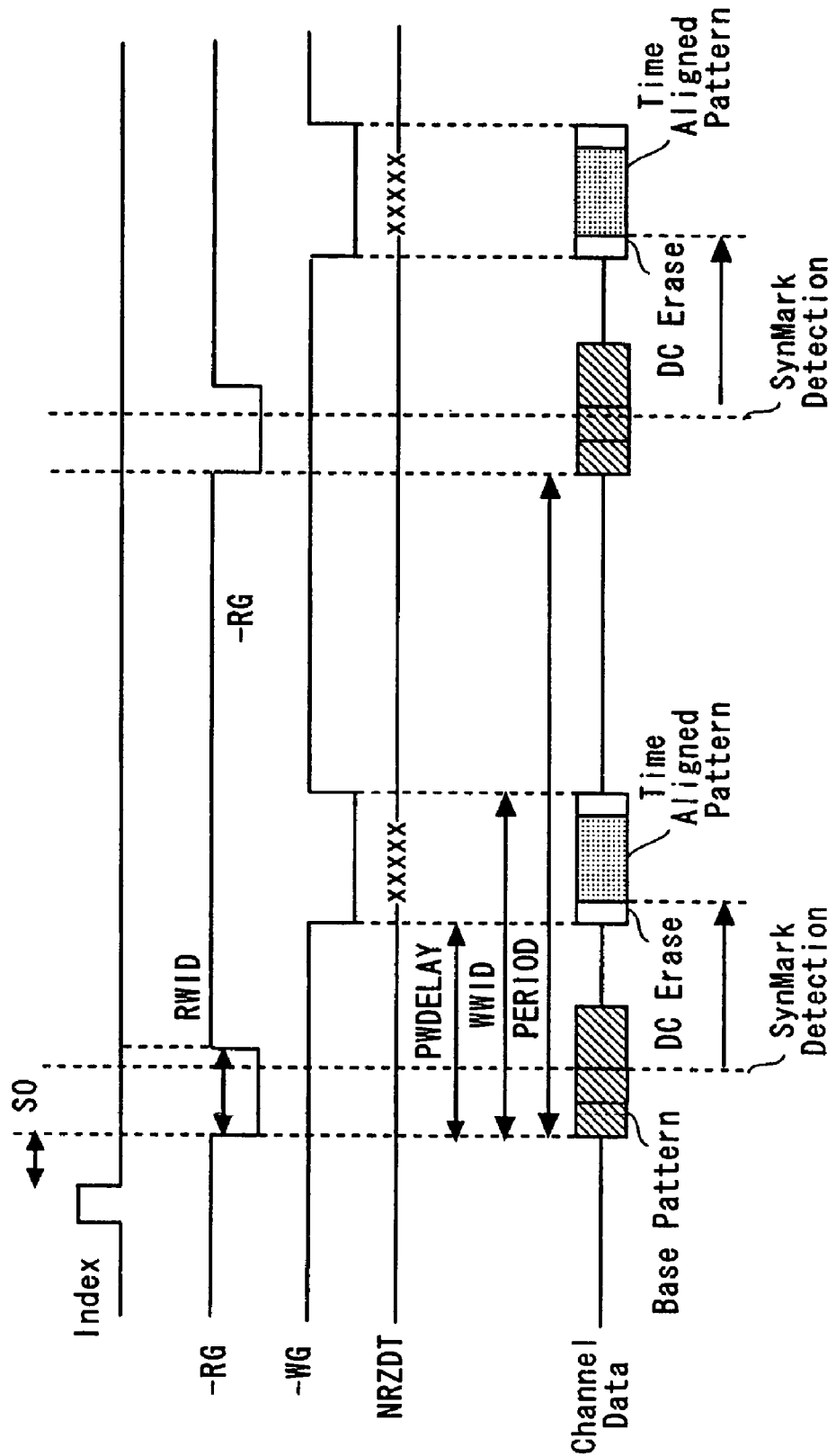
FIG. 37 shows timing charts of the indexed phase aligned write mode adopted in processing to write time aligned patterns onto a magnetic disk in the embodiment.

Finally, on the basis of the time intervals between base patterns, the HDC/MPU 63 writes time aligned patterns at positions synchronized in the circumferential direction throughout all tracks. That is to say, the time aligned patterns are written at uniform positions aligned to each other in the circumferential direction with respect to the tracks. The HDC/MPU 63 writes the time aligned patterns at such positions by making use of the indexed phase aligned write mode-1 described in paragraph (ii). As shown in FIG. 37, the index signal is taken as a reference. The HDC/MPU 63 opens −RG and −WG. The precision of the timings to open −RG and −WG is determined by the frequency of the clock signal of the HDC/MPU 63. A write operation is carried out after a delay time set in advance in the R/W channel 61 lapses since the R/W channel 61 detects a sync mark. The start of this write operation may be regarded as a timing, with which the R/W channel 61 outputs data to be written onto the magnetic disk 13.

The delay time cited above is set on the basis of time intervals measured in a previous sequence as time intervals between base patterns. The precision of the timing with which the HDC/MPU 63 opens −WG is not high. However, the timing with which the R/W channel 61 outputs data to be written onto the magnetic disk 13 is controlled by the R/W channel 61 with a high degree of accuracy as described above. Thus, the time aligned patterns may be written at positions synchronized in the circumferential direction throughout all tracks. It is to be noted that a time period between a falling edge of −WG and the start of an operation carried out by the R/W channel 61 to actually output the data to be written onto the magnetic disk 13 as well as a time period between the end of the operation carried out by the R/W channel 61 to actually output the data to be written onto the magnetic disk 13 and the rising edge of −WG are each a period in a DC erasure state.

Figure 38:
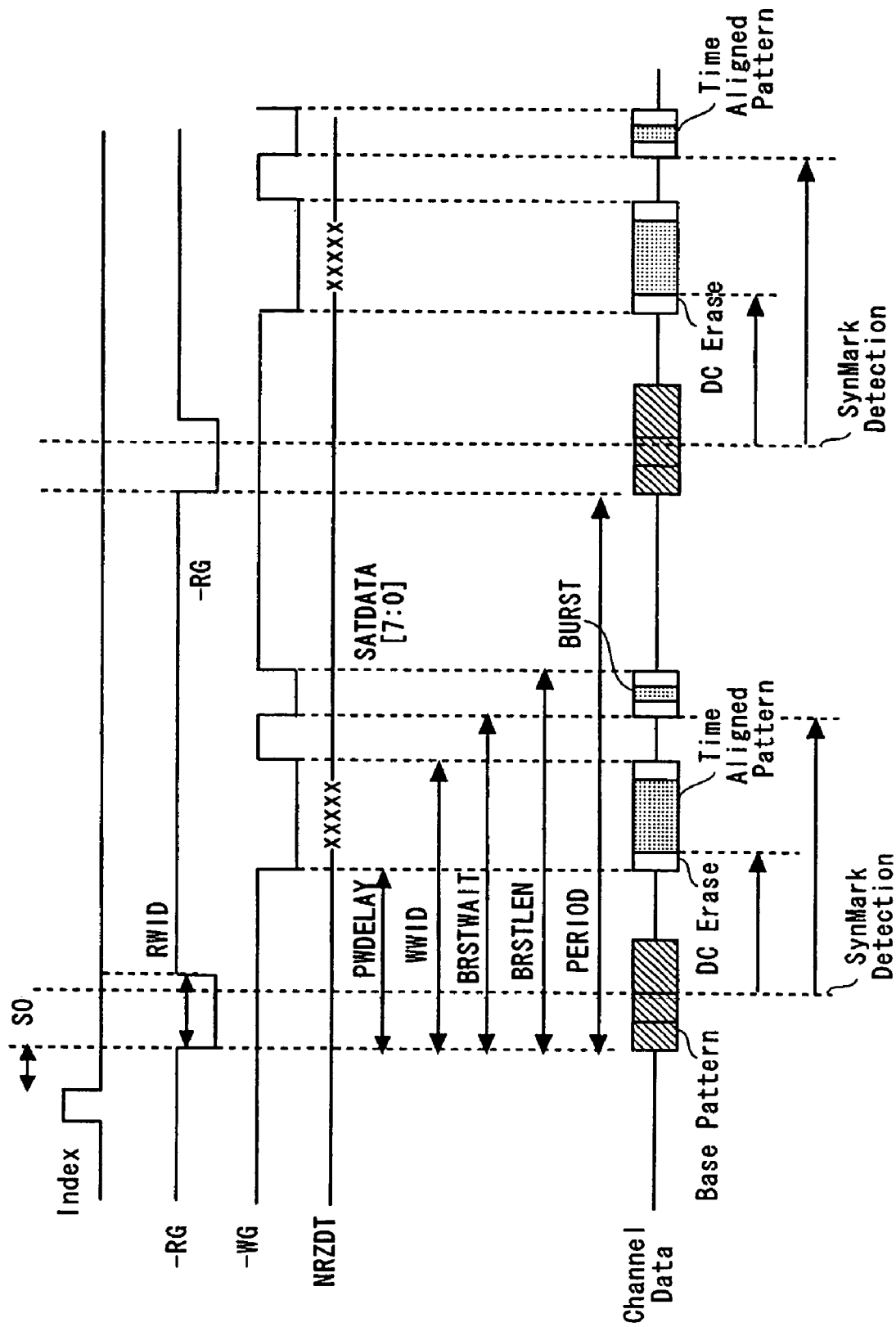
FIG. 38 shows timing charts of the indexed phase aligned write mode-2 adopted for writing second bursts into a magnetic disk in processing to write time aligned patterns onto the magnetic disk in the embodiment.

A time aligned pattern comprises a sync field, a sync mark, an STM, a gray code, and bursts A, B, C, and D as well as second bursts. In order to write the second bursts onto the magnetic disk 13, the write gate is once opened whereas information such as the sync field and the sync mark are written onto the magnetic disk 13. Then, the write gate is once closed before being opened again to write the second bursts onto the magnetic disk 13. As shown in FIG. 38, the HDC/MPU 63 is capable of writing the second bursts onto the magnetic disk 13 by making use of the indexed phase aligned write mode-2 for opening the write gate twice in a period as described in paragraph (iii). In this mode, for an operation carried out once on −RG, −WG may be opened twice with set timings. Thus, when −WG is opened for the first time, a second burst is written onto each servo track without regard to a trimming but, −WG is opened for the second time with a timing shifted a little bit at a time for every servo track.

Finally, measurement carried out in the initial sequence of the In-Drive SSW (TSSW) process to measure characteristics of the head 16 is explained. The measurement of the head characteristics is carried out for all heads 16 employed in the HDD 1. Results of the measurement are used as reference values in determination of whether or not all the heads 16 have performance for carrying out the servo track write process, selection of a propagation head, and a next process. The determination of whether or not all the heads 16 have performance for carrying out the servo track write process is referred to as a pass/fail determination of the heads 16. Characteristic items to be measured include a read check characteristic, the read/write offset, and a write width corresponding to the width of the write element 162. A method adopted in the measurement comprises the following sequences.

(1) Burst-pattern write (2) Burst-pattern read (3) Measurement of head-characteristics (4) Selection of a propagation head A signal observed in the burst-pattern read sequence to read out burst patterns written onto the magnetic disk 13 in the burst-pattern write sequence is used for identifying the position of the head 16 or, strictly speaking, the position of the read element 161. VCM currents represent the characteristics of the head 16. The sequences listed above are carried out under control executed by the HDC/MPU 63 as explained in detail in the following description.

(1) Burst-pattern Write

With the actuator 14 pushed against the inner crush stop 18, burst patterns are written onto the magnetic disk 13. At that time, the VCM current is set at a constant magnitude I_mid. Normally, with the repulsive force of elasticity of the inner crush stop 18 put in a state of equilibrium with a force pressing the actuator 14 against the inner crush stop 18, the magnitude of a current flowing through the VCM 17 as a current for generating the pressing force to position the head 16 on the innermost ID side is used as the constant magnitude. The HDC/MPU 63 writes the burst patterns onto the magnetic disk 13 by making use of the indexed write mode. To put it in detail, the HDC/MPU 63 writes a plurality of burst patterns, which have a constant frequency and each have a fixed length, onto the circle of a track with the index signal used as a reference.

(2) Burst-pattern Read

Then, the gain of a VGA (Variable-Gain Amplifier) of the R/W channel 61 is read out while the position of the head 16 is gradually moved in a radial direction toward the OD side. An AGC (Automatic Gain Controller) employed in the R/W channel 61 changes the gain of the VGA in order to control the degree of amplification of an input signal. In this sequence, the HDC/MPU 63 makes use of the indexed read mode. A timing to open −RG is determined with the index signal taken as a reference. The length of a time duration in which −RG is open is made smaller than the length of a time duration in which –RG was open in the preceding sequence so that –RG may be opened on a burst pattern with a high degree of reliability along the time axis.

Every time –RG is opened, the R/W channel 61 measures the gain of the VGA and stores the gain into a register. The gain of the VGA is inversely proportional to the amplitude of the burst pattern even though the inverse proportionality is not linear. Thus, the amplitude of the burst pattern may be derived from the measured gain of the VGA. In order to gradually move the position of the head 16 in a radial direction toward the OD side, it is necessary to change the VCM current a little bit at a time from I_mid. At every point of measurement, however, the VCM current is sustained at a fixed magnitude. The VCM current is changed. The position of the head 16 may be adjusted with the repulsive force of elasticity of the inner crush stop 18 put in a state of equilibrium with a force generated by the VCM current as a force for pressing the actuator 14 against the inner crush stop 18.

(3) Measurement of Head-characteristics

Figure 39:
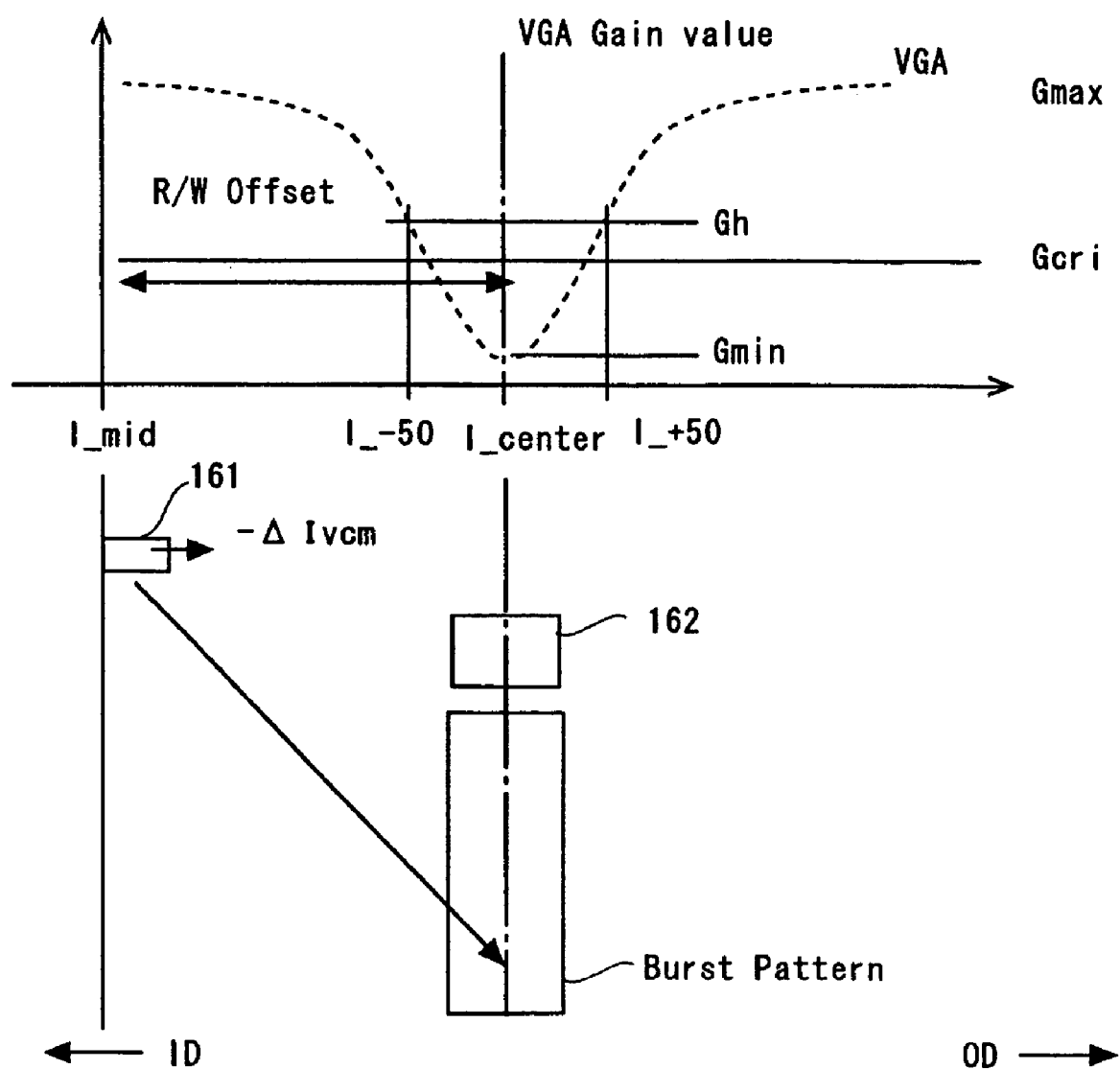
FIG. 39 is a diagram showing a relation between the position of the head and the gain of a VGA in processing to measure characteristics of the head in accordance with the embodiment.

After burst patterns are written onto the magnetic disk 13, the characteristics of the head 16 are measured by measuring the gain of the VGA while changing the position of the head 16 gradually. To put it concretely, the read-check characteristic, the read/write offset, and the write width are measured. First of all, as shown in FIG. 39, burst patterns are written onto the magnetic disk 13 with the head 16 positioned on the innermost ID side, that is, with the VCM current sustained at the magnitude I_mid as shown in FIG. 39. At this stage, the VGA gain, which is the gain of a typical read signal, attains a maximum value Gmax. Thereafter, the gain of the VGA is measured while the VCM current is being changed gradually. As the read element 161 moves in the direction in a radial direction toward the OD side, approaching a burst pattern, the amplitude of the detected burst pattern increases while the gain of the VGA decreases. When the read element 161 is positioned right above the burst pattern, the magnitude of the VCM current decreases to I_center. At that time, the gain of the VGA becomes equal to a minimum value Gmin. When the read element 161 is further moved in a radial direction toward the OD side, the gain of the VGA increases, attaining eventually the maximum value Gmax.

The read/write offset, which is defined as the radial-direction offset between the read element 161 and the write element 162, may be represented by a VCM current. As described earlier, the VCM current is a typical driving signal. That is to say, the gain of the VGA is a difference between the VCM current I_center and the VCM current I_mid, which corresponds to the minimum value Gmin of the VGA gain. In other words, the following equation holds true:

Read/write offset=$I\_center-I\_mid$

Thus, if the gain of the VGA does not become smaller than a value Gric set in advance in the course of this sequence, the gain of the VGA indicates that a signal output by the read element 161 is not sufficiently large. In this case, the existence of a problem in the read system is confirmed.

By the same token, the write width may be represented by the VCM current. A burst amplitude V1 corresponding to Gmin and a burst amplitude V2 corresponding to Gmax are computed as amplitudes of a signal supplied to the R/W channel 61. Then, a middle gain Gh between Gmin and Gmax is computed as a VGA gain that results in a middle amplitude Vh where the middle amplitude Vh is an amplitude equal to half the sum of V1 and V2 as expressed by the following equation:

$Vh=(V1+V2)/2$

In the course of the process to move the read element 161 from the ID side to the OD side, the gain of the VGA attains Gh twice. With the two timings to attain the middle gain Gh, the VCM current becomes equal to $I\_-50$ and $I\_+50$ respectively. The write width may be defined as the difference between the VCM currents $I\_-50$ and $I\_+50$. That is to say, the write width is defined as follows:

Write width=$I\_+50-I\_-50$

As described above, in this embodiment, the characteristics of the head 16 are measured directly in terms of values of the VGA gain. It is to be noted, however, that a processed VGA gain or another signal may also be utilized each as measurement values of the characteristics of the head 16. If the magnitude of the input signal is utilized as a measurement value of the characteristics of the head 16, for example, the variation of the magnitude is opposite to that of the VGA gain. That is to say, after becoming equal to a minimum value, the magnitude attains a maximum value before decreasing again. In addition, the write width may also be found by carrying out a predetermined process on the value of the VCM current.

(4) Selection of a Propagation Head

The head-characteristic measurement described above is carried out for all heads 16 employed in the HDD 1. Then, a propagation head is selected on the basis of results of the measurements. To put it concretely, since results of detections of sync marks each included in a servo pattern, results of measurements of timings, and results of measurements of burst amplitudes in the In-Drive SSW (TSSW) process are used in detecting the position of a head 16, it is necessary to select a best head 16 having fewest noises as the propagation head. Conditions for selecting a propagation head include a VGA gain closest to a design value and a largest write width.

It is to be noted that the processing provided by the embodiment as a process to write product servo patterns onto the magnetic disk 13 is not processing with applications limited to magnetic disks 13. That is to say, the processing to write product servo patterns onto the magnetic disk 13 may also be carried out in a disk drive having another configuration for writing data onto a rotary recording medium. The embodiment has been described by explaining the In-Drive SSW (TSSW) process as a desirable function. However, every sequence of writing product servo patterns onto the magnetic disk 13 may also be executed in an ordinary SSW process. In the embodiment, time aligned patterns are written onto the magnetic disk 13 on the basis of base patterns. Also on the basis of base patterns, however, product servo patterns may be written onto the magnetic disk 13.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for measuring characteristics of a head adopted by a data storage device which comprises a recording disk used for recording data, the head having a read element and a write element separated from each other at positions in the radial direction of the recording disk, a movement mechanism to move the head; and a stop unit to prescribe a movement range of the movement mechanism in a state of being in contact with the movement mechanism comprising:

writing patterns onto the rotating recording disk with the movement mechanism pushed against the stop unit;

measuring a read signal representing the magnitude of a signal read out by the read element from the recording disk and a driving signal for driving the movement mechanism with the movement mechanism pushed against the stop unit while the read element is being moved in a direction toward the patterns; and determining the driving signal representing a characteristic of the head according to the measured read signal calculating a read/write offset of the head and write width of the head based on the measured read signal and the driving signal.

2. The method according to claim 1 wherein the gain of a VGA for amplifying a signal read out by the read element is used as the read signal.

3. The method according to claim 1 wherein the driving signal is a signal corresponding to a current supplied to a voice coil motor for driving the movement mechanism.

4. The method according to claim 1 further comprising determining the driving signal representing a read/write offset of the head according to the basis of the read signal.

5. The method according to claim 4 wherein the read/write offset of the head is represented by using the value of a driving signal at a position to write the pattern and using the value of a driving signal at a position at which the read element coincides with the pattern.

6. The method according to claim 5 wherein an extremum value of the read signal is used to determine a position at which the read element coincides with the pattern.

7. The method according to claim 1 wherein the direction in which the read element moves toward the pattern is a direction of departing from the stop unit.

8. The method according to claim 1 further comprising determining a value of the driving signal representing a write width of the head according to the basis of the read signal.

9. The method according to claim 8 wherein the write width of the head is represented by using the value of the driving signal at a position showing half the read signal read out at a position at which the read element coincides with the pattern.

10. The method according to claim 8 wherein determining the value of the driving signal comprises:
measuring a maximum value of the read signal;
measuring a minimum value of the read signal;
determining a middle value between the minimum and maximum values;
determining a value of the driving signal as a value corresponding to the middle value; and
using the value of the driving signal.

11. The method according to claim 8 wherein determining the value of the driving signal comprises:
measuring a minimum value of the read signal;
measuring a maximum value of the read signal;
determining a middle value between the minimum and maximum values;
determining a value of the driving signal as a value corresponding to the middle value; and
using the value of the driving signal.

12. A data storage device to measure characteristics of a head, the data storage device comprising:
a recording disk for recording data;
a head having a read element and a write element separated from each other at positions in the radial direction of the recording disk;
a movement mechanism configured to move the head;
a stop unit configured to prescribe a movement range of the movement mechanism in a state of being in contact with the movement mechanism; and
a control unit configured to control movements of the movement mechanism;
wherein the write element writes patterns onto the rotating recording disk with the movement mechanism pushed against the stop unit;
wherein the control unit measures a read signal representing the magnitude of a signal read out by the read element from the recording disk as well as a driving signal for driving the movement mechanism while the movement mechanism is moving the read element in a direction toward the patterns with the movement mechanism pushed against the stop unit; and
wherein the control unit determines the magnitude of the driving signal representing a characteristic of the head on the basis of the measured read signal
wherein the control unit calculates the read/write offset of the head and the write width of the head based on the measured read signal and the driving signal.

13. The data storage device according to claim 12 wherein the control unit determines a magnitude of the driving signal representing the read/write offset of the head according to the basis of the read signal.

14. The data storage device according to claim 12 wherein the control unit determines a magnitude of the driving signal representing a write width of the head according to the basis of the read signal.

* * * * *